United States Patent
Sanson et al.

(10) Patent No.: US 12,312,450 B2
(45) Date of Patent: May 27, 2025

(54) DYNAMICALLY CROSSLINKABLE POLYMERIC COMPOSITIONS, ARTICLES, AND METHODS THEREOF

(71) Applicant: Braskem S.A., Camaçari (BR)

(72) Inventors: Murilo Lauer Sanson, São Paulo (BR); Kimberly Miller McLoughlin, Philadelphia, PA (US); Hadi Mohammadi, Philadelphia, PA (US); Nei Sebastião Domingues Junior, São Paulo (BR); Ana Paula de Azeredo, São Paulo (BR); Michelle Kay Sing, Philadelphia, PA (US); Gisele Marschner Rasia, São Paulo (BR); Cristiane Jaqueline Mauss, São Paulo (BR); Carmem Rosane Isse Gomes, São Paulo (BR); Karin Janete Stein Brito, São Paulo (BR); Patrícia Cofferri, São Paulo (BR)

(73) Assignee: Braskem S.A., Camaçari (BR)

(*) Notice: Subject to any disclaimer, the term of this patent is extended or adjusted under 35 U.S.C. 154(b) by 201 days.

(21) Appl. No.: 17/901,677

(22) Filed: Sep. 1, 2022

(65) Prior Publication Data

US 2023/0072372 A1   Mar. 9, 2023

Related U.S. Application Data

(60) Provisional application No. 63/239,805, filed on Sep. 1, 2021.

(51) Int. Cl.
C08J 3/24   (2006.01)

(52) U.S. Cl.
CPC .............. *C08J 3/243* (2013.01); *C08J 3/247* (2013.01); *C08J 2335/02* (2013.01); *C08J 2363/00* (2013.01)

(58) Field of Classification Search
CPC ........ C08J 3/243; C08J 3/247; C08J 2335/02; C08J 2363/00
USPC ....................................................... 528/271
See application file for complete search history.

(56) References Cited

U.S. PATENT DOCUMENTS

| 11,326,002 B2 | 5/2022 | Hanlon et al. |
| 2019/0352477 A1* | 11/2019 | Leenders ............... C08G 59/68 |

FOREIGN PATENT DOCUMENTS

| CN | 108342013 A * | 7/2018 |
| CN | 111218054 A | 6/2020 |

OTHER PUBLICATIONS

Weng, CN 108342013 A machine translation in English, Jul. 31, 2018. (Year: 2018).*
International Search Report issued in corresponding International Application No. PCT/IB2022/020064; mailed Jan. 3, 2023 (5 pages).

(Continued)

*Primary Examiner* — David T Karst
(74) *Attorney, Agent, or Firm* — Osha Bergman Watanabe & Burton LLP

(57) ABSTRACT

A polymeric composition may include a thermoplastic polymer including: at least one monomer selected from the group consisting of vinyl esters, C2-C12 olefins, and combinations thereof; and a dynamic crosslinking group; and a dynamic crosslinking system to dynamically crosslink the thermoplastic polymer.

21 Claims, 29 Drawing Sheets

(56) References Cited

OTHER PUBLICATIONS

Written Opinion of the International Searching Authority issued in corresponding International Application No. PCT/IB2022/020064; dated Jan. 3, 2023 (6 pages).
Cheng, L., et al, "Recyclable ethylene-vinyl acetate copolymer vitrimer foams", Polymer, 2021, vol. 222, pp. 1-12, 123662 (12 pages).

* cited by examiner

FIG. 12

| Sample | Crosslinking thermal cycle | Result | |
|---|---|---|---|
| Boron 3 | Laminated + Oven cure (200°C, 2 hours) | No Tack (Rate = 10)<br><br>Darkening (possibly oxidation/degradation) of the sample because of the long exposure time to a high temperature. | 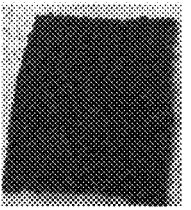 |
| Boron 4 | Laminated + Oven cure (200°C, 2 hours) | Rate = 0<br><br>Sample did not present sufficient crosslinking degree, presenting significant melting, and therefore, tackiness. | 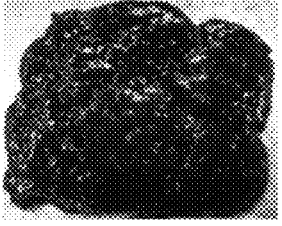 |
| Boron 5 | Laminated + Oven cure (200°C, 1 hour) | No Tack (Rate = 10) | 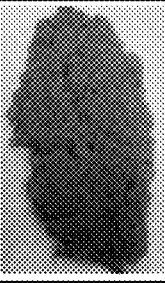 |
| Boron 5 | Laminated + Oven cure (200°C, 2 hour) | No Tack (Rate = 10)<br><br>Browning/yellowing (possibly oxidation/degradation) of the sample because of the long exposure time to a high temperature. | 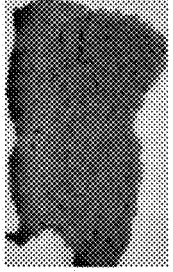 |

FIG. 46A

| Sample | Crosslinking thermal cycle | Result | |
|---|---|---|---|
| Epoxy 2 | Laminated + Oven cure (180°C, 1 hour) | No tack (Rate = 10) | 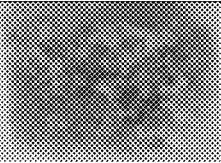 |
| Epoxy 2 | Laminated + Compression molding (180°C, 5 min – only for flating it) + Oven cure (200°C, 1 hour) | No tack (Rate = 10) Intense browning (possibly oxidation/degradation) of the sample because of the long exposure time to a high temperature. | 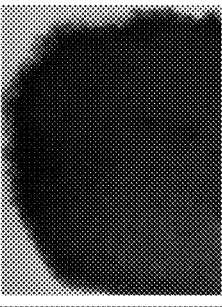 |
| Epoxy 3 | Laminated + Oven cure (200°C, 1 hour) | No tack (Rate = 10) Intense browning (possibly oxidation/degradation) of the sample because of the long exposure time to a high temperature. | 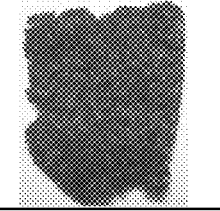 |
| Epoxy 6 | Laminated + Compression molding (110°C, 2 min – only for flating it) + Oven cure (200°C, 5 min) | No tack (Rate = 10) | 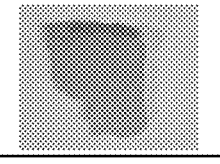 |
| Epoxy 6 | Laminated + Compression molding (110°C, 2 min – only for flating it) + Oven cure (200°C, 15 min) | No tack (Rate = 10) Yellowing (possibly oxidation/degradation) of the sample because of the long exposure time to a high temperature. | 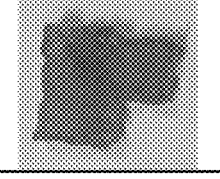 |
| Epoxy 6 | Laminated + Compression molding (110°C, 2 min – only for flating it) + Oven cure (200°C, 30 min) | No tack (Rate = 10) Yellowing/browning (possibly oxidation/degradation) of the sample because of the long exposure time to a high temperature. | 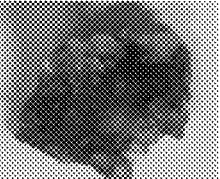 |
| Epoxy 6 | Laminated + Compression molding (110°C, 2 min – only for flating it) + Oven cure (200°C, 1 hour) | No tack (Rate = 10) Even more intense yellowing/browning (possibly oxidation/degradation) of the sample because of the long exposure time to a high temperature. | 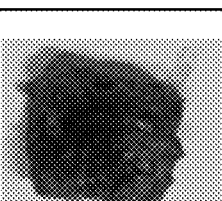 |

*FIG. 46B*

| | | | |
|---|---|---|---|
| Epoxy 7 | Laminated + Compression molding (110°C, 2 min – only for flating it) + Oven cure (200°C, 5 min) | No tack (Rate = 10) | 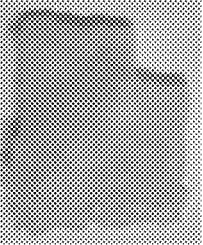 |
| | Laminated + Compression molding (110°C, 2 min – only for flating it) + Oven cure (200°C, 15 min) | No tack (Rate = 10) Initial yellowing (possibly oxidation/degradation) of the sample because of the long exposure time to a high temperature. | 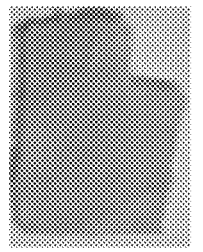 |
| | Laminated + Compression molding (110°C, 2 min – only for flating it) + Oven cure (200°C, 30 min) | No tack (Rate = 10) Yellowing (possibly oxidation/degradation) of the sample because of the long exposure time to a high temperature. | 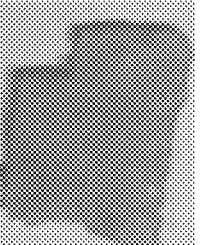 |
| | Laminated + Compression molding (110°C, 2 min – only for flating it) + Oven cure (200°C, 1 hour) | No tack (Rate = 10) Further yellowing (possibly oxidation/degradation) of the sample because of the long exposure time to a high temperature. | 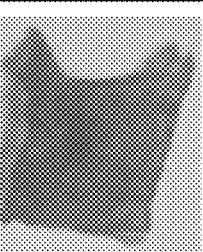 |

DYNAMICALLY CROSSLINKABLE POLYMERIC COMPOSITIONS, ARTICLES, AND METHODS THEREOF

BACKGROUND

Ethylene vinyl acetate (EVA) is widely used to produce foams with light weight and very high toughness and resilience. EVA foams find application in demanding applications such as running shoe midsoles as well as automotive and construction applications such as interior padding, carpet underlay, gaskets, etc. The polymer architecture that is required for EVA foams and other compact elastomeric applications that require high thermal resistance is a three-dimensional network, produced by crosslinking neighboring polymer molecules.

Covalently bonded polymer networks provide a balance of performance, properties, and durability. However, the same characteristics that make permanent networks excellent candidates in materials selection for high performance foams represent a difficult environmental challenge. Once formed, these network structures do not melt, flow, or dissolve to enable the use of conventional reprocessing or recycling methods.

The molding processes to produce footwear midsoles generate scraps. Scrap produced during processing of permanent networks is difficult to process and therefore cannot be fully reintroduced to the manufacturing process as a secondary feedstock. Only a small fraction of waste scrap from crosslinked polymers is ground and reintroduced as filler. Likewise, end-of-life parts produced from permanently crosslinked polymers have limited recycling options such as energy intensive grinding operations that generate only low value materials. As a result, a significant proportion of scrap and end-of-life parts accumulates as environmental waste.

In addition to a significant environmental impact, the fact that covalent, crosslinked EVA foams cannot be reprocessed by melting represents a significant cost for manufacturers. The high amount of waste limits the utilization rate of primary materials and generates cost to handle waste.

There is a need for technology that enables re-processing of crosslinked polymers, especially crosslinked foam EVA.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a polymeric composition that includes a thermoplastic polymer, the thermoplastic polymer including at least one monomer selected from a vinyl ester, a C2-C12 olefin, and combinations thereof, and a dynamic crosslinking group. The polymeric composition further includes a dynamic crosslinking system to dynamically crosslink the thermoplastic polymer.

In another aspect, embodiments disclosed herein relate to a polymeric composition that includes a thermoplastic polymer, the thermoplastic polymer including at least one monomer selected from a vinyl ester, a C2-C12 olefin, and combinations thereof, and a dynamic crosslinking group; and a dynamic crosslinking system to crosslink the thermoplastic polymer; wherein the crosslinking is relatively insensitive to the presence of molecular oxygen.

In another aspect, embodiments disclosed herein relate to a method for producing a polymeric composition, the method comprising processing a crosslinking system with a thermoplastic polymer to form a polymeric composition that includes the thermoplastic polymer including at least one monomer selected from a vinyl ester, a C2-C12 olefin, and combinations thereof, and a dynamic crosslinking group, where the polymeric composition further includes a dynamic crosslinking system to dynamically crosslink the thermoplastic polymer. The processing is at a first temperature which is less than a second temperature sufficient to form crosslinks in the polymeric composition.

In another aspect, embodiments disclosed herein relate to a method for producing a polymeric composition, the method comprising processing a crosslinking system with a thermoplastic polymer to form a polymeric composition that includes a thermoplastic polymer, the thermoplastic polymer including at least one monomer selected from a vinyl ester, a C2-C12 olefin, and combinations thereof, and a dynamic crosslinking group; a dynamic crosslinking system to dynamically crosslink the thermoplastic polymer; wherein the crosslinking is relatively insensitive to the presence of molecular oxygen. The processing is at a first temperature which is less than a second temperature sufficient to form crosslinks in the polymeric composition.

In another aspect, embodiments disclosed herein relate to a method of producing a polymeric composition which includes processing a polymeric composition above its melting or softening temperature and crosslinking the polymeric composition in the presence of molecular oxygen. The polymeric composition includes a thermoplastic polymer, the thermoplastic polymer including at least one monomer selected from a vinyl ester, a C2-C12 olefin, and combinations thereof, and a dynamic crosslinking group. The polymeric composition further includes a crosslinking system to dynamically crosslink the thermoplastic polymer.

In another aspect, embodiments disclosed herein relate to a method of producing a polymeric composition which includes processing a polymeric composition above its melting or softening temperature and crosslinking the polymeric composition in the presence of molecular oxygen. The polymeric composition that includes a thermoplastic polymer, the thermoplastic polymer including at least one monomer selected from a vinyl ester, a C2-C12 olefin, and combinations thereof, and a dynamic crosslinking group; and a dynamic crosslinking system to dynamically crosslink the thermoplastic polymer; wherein the crosslinking is relatively insensitive to the presence of molecular oxygen.

In yet another aspect, embodiments disclosed herein relate to a method of reprocessing a polymer composition that includes reprocessing a polymer composition above a melting or softening temperature of the thermoplastic polymer, wherein after the reprocessing, the polymer composition maintains at least 50% of its initial storage modulus plateau above its melting temperature, as measured by dynamic mechanical analysis, as compared to the polymer composition before the reprocessing. The polymer composition includes a thermoplastic polymer comprising at least one monomer selected from a vinyl ester, a C2-C12 olefin, and combinations thereof and a dynamic crosslinking group; a dynamic crosslinking system that has dynamically crosslinked the thermoplastic polymer.

In yet another aspect, embodiments disclosed herein relate to a method of reprocessing a polymer composition that includes reprocessing a polymer composition above a melting or softening temperature of the thermoplastic polymer, wherein after repeating the processing at least 4 additional times, the polymer composition maintains at least 50% of its initial storage modulus plateau above its melting temperature, as measured by dynamic mechanical analysis, as compared to the polymer composition before the reprocessing. The polymer composition includes polymeric composition that includes a thermoplastic polymer comprising at least one monomer selected from a vinyl ester, a C2-C12 olefin, and combinations thereof, and a dynamic crosslinking system that has crosslinked the thermoplastic polymer, wherein the crosslinking is relatively insensitive to the presence of molecular oxygen.

In yet another aspect, embodiments disclosed herein relate to an article comprising a polymeric composition that includes a thermoplastic polymer comprising at least one monomer selected from a vinyl ester, a C2-C12 olefin, and combinations thereof and a dynamic crosslinking group; a dynamic crosslinking system that dynamically crosslink the thermoplastic polymer.

In yet another aspect, embodiments disclosed herein relate to an article comprising a polymeric composition that includes a thermoplastic polymer comprising at least one monomer selected from a vinyl ester, a C2-C12 olefin, and combinations thereof, a dynamic crosslinking system that crosslinks the thermoplastic polymer, wherein the crosslinking is relatively insensitive to the presence of molecular oxygen.

Other aspects and advantages of the claimed subject matter will be apparent from the following description and the appended claims.

BRIEF DESCRIPTION OF DRAWINGS

FIG. 12 shows the results of crosslinking of samples in presence of atmospheric oxygen (oven with forced convection).

FIGS. 46A and 46B shows the results of crosslinking of samples in presence of atmospheric oxygen (oven with forced convection).

DETAILED DESCRIPTION

Figure 1:
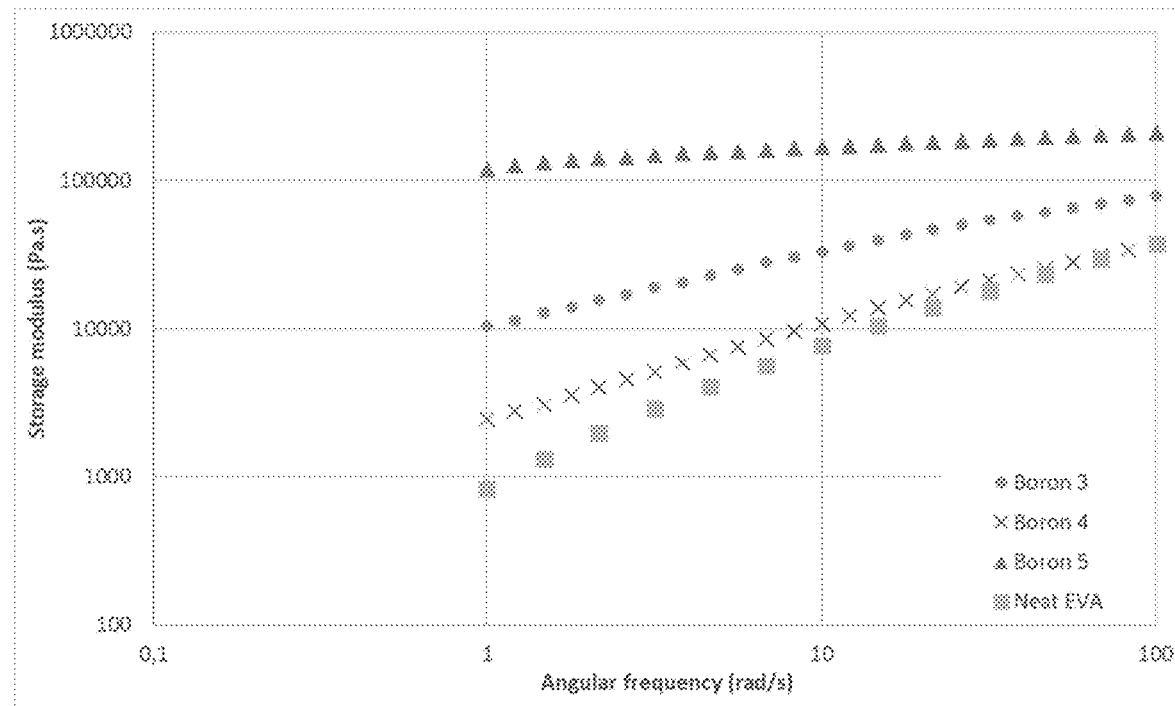
FIGS. 1-3 show a comparison of tested samples for frequency sweep in parallel plate shear rheometry.

Embodiments disclosed herein relate to polymeric compositions, methods of forming and reprocessing such polymeric compositions, and articles formed from such polymeric compositions. The polymeric compositions may be thermoplastic polymers comprising at least one monomer selected from the group consisting of vinyl esters, C2-C12 olefins, and combinations thereof that are dynamically crosslinked. In accordance with embodiments of the present disclosure, the dynamic crosslinking reaction is relatively insensitive to the presence of molecular oxygen. As used herein the term "relatively insensitive" means a polymeric composition having a tackiness number above 5.

Associative covalent adaptive networks (CANs) are a class of chemically crosslinked polymers, in which an external-stimulus (temperature, stress, pH, etc.) triggers bond-exchange reactions, thereby permitting the change of the network topology. The dynamic covalent bonds present can undergo associative exchange reactions, such that the network topology is able to change, the material relaxes stresses and flows, while keeping the crosslinking density constant. Dynamically crosslinked systems exhibit the characteristics of crosslinked materials at ambient temperatures (high chemical resistance, exceptional mechanical properties), while they can be processed or reprocessed in a similar fashion as thermoplastic materials at elevated temperatures.

In accordance with one or more embodiments, a polymeric composition may be prepared by mixing the thermoplastic polymer and a crosslinking system. The crosslinking system may comprise a crosslinking agent and a catalyst. The thermoplastic polymer may comprise a dynamic crosslinking group and/or a dynamic crosslinking group may be grafted thereto. Crosslinkable polymeric compositions may be prepared via a method comprising processing a crosslinking system with a thermoplastic polymer. Crosslinking of the polymeric composition may include processing that is conducted above the melting or softening temperature of the composition to trigger crosslinking of the polymeric composition. Moreover, because the crosslinked polymeric compositions are dynamically crosslinked, the previously crosslinked polymeric composition may be reprocessed in subsequent steps at elevated temperatures.

Thermoplastic Polymer

In one or more embodiments, the thermoplastic polymer includes at least one monomer selected from C2-C12 olefins, a vinyl ester, and combinations thereof. The olefins may comprise one or more of ethylene, 1-propene, 1-butene, 1-pentene, 1-hexene, 1-heptene, 1-octene, 1-nonene, 1-decene, 1-undecene, 1-dodecene and combinations thereof. Thus, for example, it is envisioned that the thermoplastic polymer may include polymers such as polyolefins, including ethylene homopolymers, copolymer of ethylene and one or more C3-C12 alpha olefins, propylene homopolymer, copolymers of propylene and one or more comonomers selected from ethylene, C4-C12 alpha-olefins and combinations thereof, ethylene vinyl acetate, poly(vinyl acetate), and combinations thereof. In copolymers of an olefin and vinyl ester(s), it is envisioned that the vinyl ester(s) may be present as comonomers in an amount ranging from a lower limit of 1, 5, 10, 15, 18, or 20 wt %, to an upper limit of any of 25, 40, 60, or 80 wt % of the total mass of the copolymer. In one or more particular embodiments, vinyl acetate may be used as monomer or comonomer. In one or more even more particular embodiments, the thermoplastic polymer may be a biobased polymer, especially ethylene vinyl acetate and polyethylene, where, for example, ethylene might be derived from biobased ethanol.

It is also envisioned that the thermoplastic polymer may include a branched vinyl ester comonomer (in combination with ethylene alone to form a copolymer or in combination with ethylene and vinyl acetate to form a terpolymer). Such copolymer and terpolymers are described in U.S. patent application Ser. No. 17/063,488, which is herein incorporated by reference in its entirety. For example, such branched vinyl ester monomers may include monomers having general structure (I):

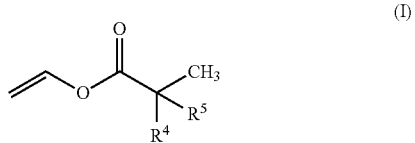

wherein $R^4$ and $R^5$ have a combined carbon number of 6 or 7. However, it is also envisioned that the other branched vinyl esters described in U.S. patent application Ser. No. 17/063,488 may be used.

In one or more embodiments, the thermoplastic polymer forms at least 1 wt %, at least 5 wt %, 10 wt %, 15 wt %, at least 20 wt %, at least 25 wt %, at least 50 wt %, at least 70 wt %, at least 80 wt %, at least 90 wt %, or at least 99 wt % of the polymeric composition. The amount of thermoplastic polymer may depend, for example, on the presence of other components such as but not limited to crosslinking agents, catalysts, fillers, additives, oils, and/or plasticizers.

In referring to a thermoplastic polymer that forms the polymer composition described herein, it is intended that the polymer is dynamically crosslinked via a dynamic crosslinking group and addition of a crosslinking system. The dynamic crosslinking group may be incorporated into the thermoplastic polymer during polymerization, for example the vinyl esters of EVA, or the dynamic crosslinking group may be added to a base polymer after the base polymer has been polymerized. The dynamic crosslinking group may be added to a base polymer via for example a grafting reaction during a reactive processing step to form the thermoplastic polymer. The grafting reaction may comprise forming at least one covalent bond between a base polymer and a molecule containing a dynamic crosslinking group. Grafting may include, for example, melt grafting, solution grafting, or solid state grafting.

Dynamic Crosslinking Group

As mentioned above, the crosslinking may be achieved via a dynamic crosslinking group or moiety present in the thermoplastic polymer. In one or more embodiments, the dynamic crosslinking group may be selected from the group consisting of esters, epoxides, organic acids, alcohols, anhydrides, amines, amides, cyanates, unsaturated hydrocarbons, and combinations thereof.

As also mentioned above, the moiety or dynamic crosslinking group may be present in the thermoplastic polymer from polymerization (such as in the case of an ester in thermoplastics containing vinyl ester monomers) or such moiety may be reacted with a base polymer via a post-polymerization reactive processing to form the thermoplastic polymer. Such reacting processing may include, for example, melt grafting, solution grafting, or solid state grafting. It is also envisioned that the dynamic crosslinking group may be the same or different chemical species as a monomer forming the thermoplastic polymer. For example, in the case of the thermoplastic polymer being polyvinyl acetate, the vinyl acetate is both a monomer and a dynamic crosslinking group.

In one or more embodiments, the dynamic crosslinking group may include vinyl esters such as vinyl acetate, vinyl propionate, vinyl 2-ethylhexanoate, vinyl decanoate, vinyl neodecanoate, vinyl neononanoate, vinyl laurate, vinyl benzoate, vinyl pivalate, vinyl butyrate, vinyl trifluoroacetate, vinyl cinnamate, vinyl 4-tert-butylbenzoate, vinyl stearate, allyl cinnamate, vinyl methacrylate, and the like, and combinations thereof.

In one or more embodiments, the dynamic crosslinking group may include unsaturated organic acids, such as itaconic acid, maleic acid, acrylic acid, crotonic acid, methacrylic acid, fumaric acid, 1-Vinyl-1H-pyrrole-2-carboxylic acid, 1,2-Benzenedicarboxylic acid, and the like, and combinations thereof.

In one or more embodiments, the dynamic crosslinking group may include unsaturated epoxides, such as glycidyl methacrylate, 4-vinyl-1-cyclohexene 1,2-epoxide, Allyl glycidyl ether, 1,2-Epoxy-5-hexene, 3,4-Epoxy-1-butene, 3,4-Epoxy-1-cyclohexene, 2-Methyl-2-vinyloxirane, 1,2-Epoxy-9-decene, and the like, and combinations thereof.

In one or more embodiments, the dynamic crosslinking group may include unsaturated alcohols, such as allyl alcohol, 3-buten-1-ol, 2-Methyl-2-propen-1-ol, 3-Methyl-3-buten-1-ol, 3-Buten-2-ol, 3-Methyl-2-buten-1-ol, 2-Methyl-3-buten-2-ol, Crotyl alcohol and the like, and combinations thereof.

In one or more embodiments, the dynamic crosslinking group may include unsaturated anhydrides, such as maleic anhydride, citraconic anhydride, itaconic anhydride, (2-Dodecen-1-yl)succinic anhydride, and the like, and combinations thereof.

In one or more embodiments, the dynamic crosslinking group may include unsaturated amines, such as trans-dimethyl-(4-(2-p-tolyl-vinyl)-benzyl)-amine, [4-((e)-2-benzothiazol-2-yl-vinyl)-phenyl]-diethyl-amine, 2-methyl-1-vinylimidazole, 4-vinylpyridine, 2-vinylpyrazine, 2-vinylpyridine, 4-vinylaniline, 3-vinylaniline, allylamine, 3-buten-1-amine, n-allylmethylamine, n-vinylformamide, 2-methyl-2-propen-1-amine, and the like, and combinations thereof.

In one or more embodiments, the dynamic crosslinking group may comprise a moiety able to react with the dynamic crosslinking system. In one or more embodiments, the dynamic crosslinking group is present in the thermoplastic polymer in amounts up to 100 wt %, 90 wt %, 70 wt %, 50 wt %, 30 wt %, 10 wt %, 5 wt %, 4 wt %, 3 wt %, 2 wt %, 1 wt %, 0.05 wt %, or 0.01 wt % of the thermoplastic polymer.

Dynamic Crosslinking System

In one or more embodiments, the dynamic crosslinking system may comprise a dynamic crosslinking agent able to react with the dynamic crosslinking group and optionally a catalyst. In one or more embodiments, the dynamic crosslinking system is present in the polymeric composition in amounts up to 40 wt %, 30 wt %, 25 wt %, 20 wt %, 15 wt %, 10 wt %, 5 wt %, 4 wt %, 3 wt %, 2 wt %, 1 wt %, 0.05 wt %, or 0.01 wt % of the polymeric composition.

Dynamic Crosslinking Agent

In one or more embodiments, the dynamic crosslinking agent may be able to react with ester, epoxide, organic acids, alcohols, anhydrides, amines, amides, cyanates and/or unsaturated hydrocarbons groups to form reversible covalent bonds. The dynamic crosslinking agent may be selected from borates, silanes, polyamines, polyalcohols, polyols, polyacids, anhydrides, and combinations thereof.

In one or more embodiments, the dynamic crosslinking agent may include borates such as triethyl borate, trimethyl borate, tributyl borate, triphenyl borate, tris(trimethylsilyl) borate, tri-tert-butyl borate, triallyl borate, trihexyl borate, trioctyl borate, tribenzyl borate, triisopropyl borate, tris(2,2,2-trifluoroethyl) borate, tris(2-ethylhexyl) borate, and the like, and combinations thereof.

In one or more embodiments, the dynamic crosslinking agent may include silanes such as tetrapropyl orthosilicate (TPOS), tetraethyl orthosilicate (TEOS), tetrabutyl orthosilicate (TBOS), tetrapentyl orthosilicate, vinyltriethoxysilane, vinyltrimethoxysilane, allyltriethoxysilane, vinyl-tri-n-butoxysilane, hexenyltri-iso-butoxysilane, allyltri-n-pentoxysilane, dodecenyltri-n-octoxysilane, heptenyltri-n-heptoxysilane, allyltri-iso-propoxysilane, pentenyltri-n-propoxysilane, secbutenyltriethoxysilane, 3-methacryloxypropyl-trimethoxysilane, 7-methacryloxypropyltrimethoxysilane and the like, and combinations thereof.

In one or more embodiments, the dynamic crosslinking agent may include polyamines—diamines triamines, or molecules containing multiple amines—such as hexamethylenediamine, 1,4-diaminobutane, ethylenediamine, 1,12-diaminododecane, 1,10-diaminodecane, tris(2-aminoethyl)amine, bis(hexamethylene)triamine, triethylenetetramine, tetraethylenepentamine, and the like, and combinations thereof.

In one or more embodiments, the dynamic crosslinking agent may include polyols—diols, triols, or molecules containing multiple alcohols—such as polycaprolactone diol, 1,6-hexanediol, 1,5-pentanediol, 1,4-butanediol, 1,10-decanediol, 1,2,6-hexanetriol, 1,2,3-hexanetriol, 1,4-heptanediol, 1,2,10-decanetriol, ethylenediamine tetrakis(ethoxylate-block-propoxylate) tetrol, 5-pregnene-3-beta,11-beta,17-alpha,20-beta-tetrol, and the like, and combinations thereof.

In one or more embodiments, the dynamic crosslinking agent may include polyacids—diacids, triacids or molecules containing multiple acids—such as 2-aminoterephthalic acid, maleic acid, fumaric acid, itaconic acid, terephthalic acid, 2-hydroxyterephthalic acid, trimesic acid, 1,3,5-tris(4-carboxyphenyl)benzene, and the like, and combinations thereof.

In one or more embodiments, the dynamic crosslinking agent may include anhydrides, dianhydrides, or molecules containing multiple anhydrides, such as maleic anhydride, citraconic anhydride, itaconic anhydride, (2-dodecen-1-yl) succinic anhydride, pyromellitic dianhydride, 3,3',4,4'-biphenyltetracarboxylic dianhydride, and the like, and combinations thereof.

In one or more embodiments, the dynamic crosslinking agent may be present in the polymer composition from a lower limit of any of 0.01 wt %, 0.1 wt %, 0.5 wt %, 1 wt %, 2 wt %, or 3 wt %, and an upper limit of any of 4 wt %, 5 wt %, 6 wt %, 8 wt %, 10 wt %, 12 wt %, 15 wt %, 20 wt %, 25 wt % or 40 wt %, where any lower limit can be used in combination with any upper limit.

Catalyst

In one or more embodiments, the dynamic crosslinking system optionally comprises a catalyst that facilitates the formation and exchange reactions for the dynamic crosslinks in the polymeric composition described above. In one or more embodiments, the catalyst may be a transesterification catalyst. In one or more embodiments, the catalyst is selected from o-nucleophiles, n-nucleophiles, metal oxides, metal hydroxides, acid/alkaline catalysts such as NaOH or KOH, organic metal salts selected from the group consisting of acetylacetonates, diacrylates, carbonates, acetates and combinations thereof and wherein the metal is selected from the group consisting of Zinc, Molybdenum, Copper, Magnesium, Sodium, Potassium, Calcium, Nickel, Tin, Lithium, Titanium, Zirconium, Aluminum, Lead, Iron, Vanadium, and combinations thereof.

In one or more embodiments, the catalyst may be selected from Bis(acetylacetonato)dioxomolybdenum(VI), dibutyltin oxide (DBTO), Triazabicyclodecene (TBD), 1,8-Diazabicyclo[5.4.0]undec-7-ene, 7-methyl-1,5,7-triazabicyclo[4.4.0]dec-5-ene (MTBD), Triphenylphosphine, 4-Dimethylaminopyridine (DMAP), double metal cyanaide (DMC), diphenyl carbonate (DPC), methyl phenyl carbonate (MPC), or combinations thereof, or other similar catalysts known in the art.

In one or more embodiments, the catalyst may be present in an amount greater than 0.1 mol %, 0.5 mol %, 1 mol %, 2 mol %, 5 mol %, 10 mol %, 25 mol % or 50 mol % relative to the dynamic crosslinking system. It is envisioned that it may be desirable to add catalyst in an amount sufficient to create dynamic crosslinks within the thermoplastic polymer in suitable processing conditions of time, temperature, shear rates, etc.

Optional Permanent Crosslinking System

It is also envisioned that the polymeric compositions (whether the thermoplastic polymer or other polymers optionally added to the composition) of the present disclosure may optionally be partially crosslinked by a permanent crosslinking system. Permanent crosslinking systems may include chemical crosslinkers such as organic peroxides, azo/azide compounds, silanes, elemental sulfur and cyanates, optionally combined with crosslinking accelerators/activators; radiation curable systems, or other traditional crosslinking methods, in order to tailor specific properties, such as creep, stress relaxation, compression set, etc, to the polymer composition. This can be desirable/relevant if processability of the polymer composition is not severely harmed. In particular embodiments, permanent crosslinking systems may comprise a permanent crosslinking agent and optionally a crosslinking co-agent.

Permanent Crosslinking Agents

When a partial permanent crosslinking is envisioned, the polymer compositions in accordance with the present disclosure may include permanent crosslinking agents selected from the group consisting of organic peroxides, azo/azide compounds, sulfur crosslinking system, cyanates and combinations thereof.

Organic peroxides according to the present disclosure are capable of generating free radicals during polymer processing. In one or more embodiments, peroxides may include bifunctional peroxides such as benzoyl peroxide; dicumyl peroxide; di-tert-butyl peroxide; 00-Tert-amyl-0-2-ethyl-hexyl monoperoxycarbonate; tert-butyl cumyl peroxide; tert-butyl 3,5,5-trimethylhexanoate peroxide; tert-butyl peroxybenzoate; 2-ethylhexyl carbonate tert-butyl peroxide; 2,5-dimethyl-2,5-di(tert-butylperoxide) hexane; 1,1-di(tert-butylperoxide)-3,3,5-trimethylcyclohexane; 2,5-dimethyl-2,5-di(tert-butylperoxide) hexyne-3; 3,3,5,7,7-pentamethyl-1,2,4-trioxepane; butyl 4,4-di(tert-butylperoxide) valerate; di(2,4-dichlorobenzoyl) peroxide; di(4-methylbenzoyl) peroxide; peroxide di(tert-butylperoxyisopropyl)benzene; and the like.

Peroxides may also include benzoyl peroxide, 2,5-di(cumylperoxy)-2,5-dimethyl hexane, 2,5-di(cumylperoxy)-2,5-dimethyl hexyne-3,4-methyl-4-(t-butylperoxy)-2-pentanol, butyl-peroxy-2-ethyl-hexanoate, tert-butyl peroxypivalate, tertiary butyl peroxyneodecanoate, t-butyl-peroxy-benzoate, t-butyl-peroxy-2-ethyl-hexanoate, 4-methyl-4-(t-amylperoxy)-2-pentanol,4-methyl-4-(cumylperoxy)-2-pentanol, 4-methyl-4-(t-butylperoxy)-2-pentanone, 4-methyl-4-(t-amylperoxy)-2-pentanone, 4-methyl-4-(cumylperoxy)-2-pentanone, 2,5-dimethyl-2,5-di(t-butylperoxy)hexane, 2,5-dimethyl-2,5-di(t-amylperoxy)hexane, 2,5-dimethyl-2,5-di(t-butylperoxy)hexyne-3,2,5-dimethyl-2,5-di(t-amylperoxy)hexyne-3,2,5-dimethyl-2-t-butylperoxy-5-hydroperoxyhexane, 2,5-dimethyl-2-cumylperoxy-5-hydroperoxyhexane, 2,5-dimethyl-2-t-amylperoxy-5-hydroperoxyhexane, m/p-alpha, alpha-di[(t-butylperoxy)isopropyl]benzene, 1,3,5-tris(t-butylperoxyisopropyl)benzene, 1,3,5-tris(t-amylperoxyisopropyl)benzene, 1,3,5-tris(cumylperoxyisopropyl)benzene, di[1,3-dimethyl-3-(t-butylperoxy)butyl]carbonate, di[1,3-dimethyl-3-(t-amylperoxy)butyl]carbonate, di[1,3-dimethyl-3-(cumylperoxy)butyl]carbonate, di-t-amyl peroxide, t-amyl cumyl peroxide, t-butyl-isopropenylcumyl peroxide, 2,4,6-tri (butylperoxy)-s-triazine, 1,3,5-tri[1-(t-butylperoxy)-1-methylethyl]benzene, 1,3,5-tri-[(t-butylperoxy)-isopropyl]benzene, 1,3-dimethyl-3-(t-butylperoxy)butanol, 1,3-dimethyl-3-(t-amylperoxy)butanol, di(2-phenoxyethyl) peroxydicarbonate, di(4-t-butylcyclohexyl) peroxydicarbonate, dimyristyl peroxydicarbonate, dibenzyl peroxydicarbonate, di(isobornyl)peroxydicarbonate, 3-cumylperoxy-1,3-dimethylbutyl methacrylate, 3-t-butylperoxy-1,3-dimethylbutyl methacrylate, 3-t-amylperoxy-1,3-dimethylbutyl methacrylate, tri (1,3-dimethyl-3-t-butylperoxy butyloxy)vinyl silane, 1,3-dimethyl-3-(t-butylperoxy)butyl N-[1-13-(1-methylethenyl)-phenyl) 1-methylethyl]carbamate, 1,3-dimethyl-3-(t-amylperoxy)butyl N-[1-13 (1-methylethenyl)-phenyl}-1-methylethyl]carbamate, 1,3-dimethyl-3-(cumylperoxy))butyl N-[1-3-(1-methylethenyl)-phenyl 1-1-methylethyl]carbamate, 1,1-di(t-butylperoxy)-3,3,5-trimethylcyclohexane, 1,1-di(t-butylperoxy)cyclohexane, n-butyl 4,4-di(t-butylperoxy)valerate, ethyl 3,3-di(t-butylperoxy)butyrate, 2,2-di(t-amylperoxy)propane, 3,6,6,9,9-pentamethyl-3-ethoxycabonylmethyl-1,2,4,5-tetraoxacyclononane, n-buty 1-4,4-bis(t-butylperoxy)valerate, ethyl-3,3-di(t-amylperoxy)butyrate, benzoyl peroxide, OO-t-butyl-O-hydrogen-monoperoxy-succinate, OO-t-amyl-O-hydrogen-monoperoxy-succinate, 3,6,9, triethyl-3,6,9-trimethyl-1,4,7-triperoxynonane (or methylethyl ketone peroxide cyclic trimer), methyl ethyl ketone peroxide cyclic dimer, 3,3,6,6,9,9-hexamethyl-1,2,4,5-tetraoxacyclononane, 2,5-dimethyl-2,5-di(benzoylperoxy)hexane, t-butyl perbenzoate, t-butylperoxy acetate,t-butylperoxy-2-ethyl hexanoate, t-amyl perbenzoate, t-amyl peroxy acetate, t-butyl peroxy isobutyrate, 3-hydroxy-1,1-dimethyl t-butyl peroxy-2-ethyl hexanoate, OO-t-amyl-O-hydrogen-monoperoxy succinate, OO-t-butyl-O-hydrogen-monoperoxy succinate, di-t-butyl diperoxyphthalate, t-butylperoxy (3,3,5-trimethylhexanoate), 1,4-bis(t-butylperoxycarbo)cyclohexane, t-butylperoxy-3,5,5-trimethylhexanoate, t-butyl-peroxy-(cis-3-carboxy)propionate, allyl 3-methyl-3-t-butylperoxy butyrate, OO-t-butyl-O-isopropylmonoperoxy carbonate, OO-t-butyl-O-(2-ethyl hexyl)monoperoxy carbonate, 1,1,1-tris[2-(t-butylperoxy-carbonyloxy)ethoxymethyl]propane, 1,1,1-tris [2-(t-amylperoxy-carbonyloxy)ethoxymethyl]propane, 1,1,1-tris[2-(cumylperoxy-cabonyloxy)ethoxymethyl]propane, OO-t-amyl-O-isopropylmonoperoxy carbonate, di(4-methylbenzoyl)peroxide, di(3-methylbenzoyl)peroxide, di(2-methylbenzoyl)peroxide, didecanoyl peroxide, dilauroyl peroxide, 2,4-dibromo-benzoyl peroxide, succinic acid peroxide, dibenzoyl peroxide, di(2,4-dichloro-benzoyl)peroxide, and the like, and combinations thereof.

Other permanent crosslinking agents may be selected components capable of reacting with specific functional groups of the polymer composition, including, but not limited to, polyisocyanates, silanes, sulfur, sulfur donors and accelerators, cyanates, etc. Sulfur crosslinking systems may include elemental sulfur, sulfur donors, accelerators, activators, among other components commonly used for crosslinking systems. Sulfur activators may be selected from stearic acid, zinc oxide, magnesium oxide, and the like, and combinations thereof. Sulfur donors and/or accelerators may be selected from, n-cyclohexyl-2-benzothiazole sulfenamide (CBS), diphenyl guanidine (DPG), tetramethylthiuram disulfide (TMTD), dipentamethylenethiuram tetrasulfide (DPTT), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio)benzothiazole (MBS or MOR), Zinc(II) Dibenzyldithiocarbamate (ZBEC), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea, and the like, and combinations thereof.

Polymer compositions disclosed herein may optionally include a permanent crosslinking agent in an amount ranging from a lower limit of one of 0.001 wt %, 0.01 wt %, 0.1 wt %, 0.4 wt %, 1 wt %, 1.6 wt %, 2.2 wt %, or 2.8 wt % and an upper limit of one of 3.4 wt %, 4 wt %, 4.6 wt %, 5.2 wt %, 6 wt % or 10 wt % of the polymer composition, where any lower limit may be combined with any mathematically compatible upper limit.

Crosslinking Co-Agents

It is also envisioned that permanent crosslinking systems may optionally comprise crosslinking co-agent. Crosslinking co-agents create additional reactive sites for crosslinking, allowing the degree of polymer crosslinking to be considerably increased from that normally obtained solely by the addition of peroxides or other crosslinking agents. Generally, co-agents increase the rate of crosslinking. In one or more embodiments, the crosslinking co-agents may include Triallyl isocyanurate (TAIC), trimethylolpropanetris-methacrylate (TRIM), triallyl cyanurate (TAC), trifunctional (meth)acrylate ester (TMA), N,N'-m-phenylene dimaleimide (PDM), poly(butadiene)diacrylate (PBDDA), high vinyl poly(butadiene) (HVPBD), poly-transoctenamer rubber (TOR) (Vestenamer®), and combinations thereof.

Polymer compositions disclosed herein may optionally include a crosslinking coagent in an amount ranging from a lower limit of one of 0.001 wt %, 0.01 wt %, 0.1 wt %, 0.4 wt %, 1 wt %, 1.6 wt %, 2.2 wt %, or 2.8 wt % and an upper limit of one of 3.4 wt %, 4 wt %, 4.6 wt %, 5.2 wt %, 6 wt % or 10 wt % of the polymer composition, where any lower limit may be combined with any mathematically compatible upper limit.

Optional Additives

The polymer composition of the present disclosure may also include, in addition to the main dynamically crosslinkable polymer, dynamic crosslinking agent and optional catalyst, other optional components such as crosslinked or non-crosslinked polymers, one or more optional additives such as, but not limited to, permanent crosslinking agents and co-agents, fillers, foaming agents, foaming accelerants, elastomer, plasticizer, processing aids, mold releases, lubricants, dyes, pigments, antioxidants, light stabilizers, flame retardants, antistatic agents, antiblock additives, or other additives to modify the balance of stiffness and elasticity in the polymer composition, such as fibers, fillers, production scraps, nanoparticles, nanofibers, nanowhiskers, nanosheets, and other reinforcement elementsor nanoelements. In some embodiments, one or more of such additives may be added during the initial mixing or melt processing of the polymer, dynamic crosslinking agent and catalyst, while in one or more embodiments, one or more of such additives may be compounded in a subsequent process step, after the dynamic crosslinking has been established.

Polymer compositions in accordance with the present disclosure may include one or more foaming agents to produce expanded polymer compositions and foams. Foaming agents may include solid, liquid, or gaseous blowing agents. In embodiments utilizing chemical foaming agents, foaming agents may be combined with a polymer composition as a powder or granulate.

Foaming agents in accordance with the present disclosure may include chemical foaming agents that decompose at polymer processing temperatures, releasing the foaming gases such as $N_2$, CO, $CO_2$, and the like. Examples of chemical foaming agents may include organic foaming agents, including hydrazines such as toluenesulfonyl hydrazine, hydrazides such as oxydibenzenesulfonyl hydrazide, diphenyl oxide-4,4'-disulfonic acid hydrazide, and the like, nitrates, nitrites, azides such as calcium azide, azo compounds such as azodicarbonamide, cyanovaleric acid, azobis(isobutyronitrile), and N-nitroso compounds and other nitrogen-based materials, citric acid, and other compounds known in the art.

Inorganic chemical foaming agents may include carbonates such as sodium carbonate, sodium bicarbonate, potassium carbonate, potassium bicarbonate, zinc bicarbonate, ammonium carbonate, ammonium bicarbonate, iron bicarbonates, aluminum bicarbonates, and the like, which may be used alone or combined with weak organic acids such as citric acid, lactic acid, or acetic acid.

Foaming agents in accordance with the present disclosure may include physical foaming agents, such as direct gas injection in extruders, injection molding machines, blow molding machines, etc., whereas the gas can include nitrogen, carbon dioxide, carbon monoxide, water, air, butane, pentane, hexane, dichloroethane, Freon, other chlorofluorcarbons, argon, etc., where this process can also be carried under supercritical conditions, and also other gases and methods known in the art.

Polymer compositions disclosed herein may include a foaming agent in an amount ranging from a lower limit of one of 0.01 wt %, 0.1 wt %, 0.5 wt %, 1 wt %, 2 wt %, 3 wt %, 4 wt %, 5 wt %, 6 wt %, 7 wt %, 8 wt %, or 9 wt % and an upper limit of one of 10 wt %, 11 wt %, 12 wt %, 13 wt %, 14 wt % or 15 wt % of the polymer composition, where any lower limit may be combined with any mathematically compatible upper limit.

Polymer compositions in accordance with the present disclosure may include one or more foaming accelerators (also known as kickers) that enhance or initiate the action of a foaming agent by lowering the associated activation energy/temperature. For example, foaming agent accelerators may be used if the selected foaming agent reacts or decomposes at temperatures higher than 170° C., such as 220° C. or more, where the surrounding polymer could be degraded if heated to the activation temperature. Foaming accelerators may include any suitable foaming accelerator capable of activating the selected foaming agent. In one or more embodiments, suitable foaming accelerators may include cadmium salts, cadmium-zinc salts, lead salts, lead-zinc salts, barium salts, barium-zinc (Ba—Zn) salts, zinc oxide, titanium dioxide, triethanolamine, diphenylamine, sulfonated aromatic acids and their salts, and the like. Polymer compositions in accordance with particular embodiments of the present disclosure may include zinc oxide as one of the one or more foaming accelerators.

Polymer compositions disclosed herein may optionally include a foaming accelerator in an amount ranging from a lower limit of one of 0.01 wt %, 0.1 wt %, 0.2 wt %, 0.5 wt %, 1.0 wt %, 1.5 wt %, 2.0 wt %, or 2.5 wt % and an upper limit of one of 3.0 wt %, 3.5 wt %, 4.0 wt %, 4.5 wt %, or 5.0 wt % of the polymer composition, where any lower limit may be combined with any mathematically compatible upper limit.

Polymers compositions in accordance with one or more embodiments of the present disclosure may include one or more elastomers. Elastomers in accordance with the present disclosure may include one or more of natural rubber, poly-isoprene (IR), styrene and butadiene rubber (SBR), polybutadiene, nitrile rubber (NBR); polyolefin rubbers such as ethylene-propylene rubbers (EPDM, EPM), and the like, acrylic rubbers, halogen rubbers such as halogenated butyl rubbers including brominated butyl rubber and chlorinated butyl rubber, brominated isotubylene, polychloroprene, and the like; silicone rubbers such as methylvinyl silicone rubber, dimethyl silicone rubber, and the like, sulfur-containing rubbers such as polysulfidic rubber; fluorinated rubbers; thermoplastic rubbers such as elastomers based on styrene, butadiene, isoprene, ethylene and propylene, styrene-isoprene-styrene (SIS), styrene-ethylene-butylene-styrene (SEBS), styrene-butylene-styrene (SBS), and the like, ester-based elastomers, elastomeric polyurethane, elastomeric polyamide, and the like, and combinations thereof.

Polymer compositions in accordance with the present disclosure may optionally include other elastomers, in a range from 0 to 60 wt %. The elastomer may be present in an amount ranging from a lower limit of one of 0 wt %, 5 wt %, 10 wt %, 15 wt %, 20 wt %, 25 wt %, and 30 wt %, and an upper limit of one of 35 wt %, 40 wt %, 45 wt %, 50 wt %, 55 wt %, 60 wt %, and 70 wt % of the polymer composition, where any lower limit may be combined with any mathematically compatible upper limit.

Polymer compositions in accordance with the present disclosure may contain one or more plasticizers to adjust the physical properties and processability of the composition. In some embodiments, plasticizers in accordance with the present disclosure may include one or more of bis(2-ethylhexyl) phthalate (DEHP), di-isononyl phthalate (DINP), bis(n-butyl) phthalate (DNBP), butyl benzyl phthalate (BZP), di-isodecyl phthalate (DIDP), di-n-octyl phthalate (DOP or DNOP), di-o-octyl phthalate (DIOP), diethyl phthalate (DEP), di-isobutyl phthalate (DIBP), di-n-hexyl phthalate, trimethyl trimellitate (TMTM), tris(2-Ethylhexyl) Trimellitate (TOTM), tri-(n-octyl, n-decyl)trimellitate, tri-(heptyl, nonyl)trimellitate, n-octyl trimellitate, bis(2-ethylhexyl) adipate (DEHA), dimethyl adipate (DMD), monomethyl adipate (MMAD), dioctyl adipate (DOA)), dibutyl sebacate (DBS), polyesters of adipic acid such as VIERNOL, dibutyl maleate (DBM), di-isobutyl maleate (DIBM), benzoates, epoxidized soybean oils and derivatives, n-ethyl toluene sulfonamide, n-(2-hydroxypropyl)benzene sulfonamide, n-(n-butyl)benzene sulfonamide, tricresyl phosphate (TCP), tributyl phosphate (TBP), glycols/polyesters, triethylene glycol dihexanoate, 3gh), tetraethylene glycol diheptanoate, polybutene, acetylated monoglycerides; alkyl citrates, triethyl citrate (TEC), acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trihexyl o-butyryl citrate, trimethyl citrate, alkyl sulfonic acid phenyl ester, 2-cyclohexane dicarboxylic acid di-isononyl ester, nitroglycerin, butanetriol trinitrate, dinitrotoluene, trimethylolethane trinitrate, diethylene glycol dinitrate, triethylene glycol dinitrate, bis(2,2-dinitropropyl) formal, bis(2,2-dinitropropyl) acetal, 2,2,2-trinitroethyl 2-nitroxyethyl ether, mineral oils with a variety of chemical compositions, vegetable or biobased oils, among other oils, plasticizers, polymeric plasticizers, and the like and combinations thereof. In particular embodiments, one of the one or more plasticizers may be an ester-based oil.

Polymer compositions in accordance with the present disclosure may optionally include plasticizers in an amount ranging from 0 to 40 wt % of the polymer composition. The plasticizer may be present in an amount ranging from a lower limit of one of 0 wt %, 1.0 wt %, 2.0 wt %, and 5.0 wt %, 8.0 wt %, 10 wt % and 20.0 wt %, and an upper limit of one of 12 wt %, 15 wt %, 18 wt %, 19 wt %, 20 wt %, 30 wt % and 40 wt % of the polymer composition, where any lower limit may be combined with any mathematically compatible upper limit.

Polymer compositions in accordance with the present disclosure may include one or more organic or inorganic fillers and nanofillers such as talc, glass fibers, marble dust, cement dust, clay, carbon black, feldspar, silica or glass, fumed silica, silicates, calcium silicate, silicic acid powder, glass microspheres, mica, metal oxide particles and nanoparticles such as magnesium oxide, antimony oxide, zinc oxide, inorganic salt particles and nanoparticles such as barium sulfate, wollastonite, alumina, aluminum silicate, titanium based oxides, calcium carbonate, graphene, carbon nanotube and other carbon based nanostructures, boron nitride nanotubes, wood powder, wood derivative particles, cellulose fibers and nanofibers, crystalline nanocellulose, cellulose nanofibers and other cellulose based nanostructures, other cellulose derivatives from diverse sources, lignin based materials and other natural fibers/fillers, and other nanoparticles, nanofibers, nanowhiskers, nanosheets, polyhedral oligomeric silsesquioxane (POSS), recycled EVA, and other recycled rubbers and plastic compounds that may or may not crosslinked. As defined herein, recycled compounds may be derived from end of life, used articles, or regrind materials that have undergone at least one processing method such as molding or extrusion and the subsequent sprue, runners, flash, rejected parts, and the like, are ground or chopped. While in accordance with embodiments of the present disclosure such recycled materials are combined with a catalyst to form the polymer composition described herein which has dynamic crosslinked networks, it is also envisioned that additional recycled EVA or other polymer may be added as filler in a subsequent compounding step.

Polymer compositions disclosed herein may optionally include at least one filler or nanofiller in an amount ranging from a lower limit of one of 0.01 wt %, 0.1 wt %, 0.5 wt %, 1.0 wt %, 2.0 wt %, or 5 wt %, 10 wt %, 15, prh, 20 prh and 25 wt % and an upper limit of one of 35 wt %, 40 wt %, 45 wt %, 50 wt %, 55 wt %, 60 wt %, 65 wt %, 70 wt % or 75 wt % of the polymer composition, where any lower limit may be combined with any mathematically compatible upper limit.

Dynamically Crosslinked Polymer Compositions

In one or more embodiments, upon crosslinking, the composition exhibits a plateau elastic storage modulus within a temperature range of 20° C. up to at least 150° C.

In one or more embodiments, upon crosslinking, the composition has an elastic storage modulus that is time-dependent at temperatures above 120° C., such that it decreases by at least 50% relative to its initial value ($G_0$, plateau modulus) within 10,000 seconds at a temperature less than 230° C. The value for normalized relaxation modulus may be obtained via exponential decay fittings to the elastic storage modulus data, where the plateau modulus ($G_0$) corresponds to the fit at t=0 s. $G_0$ can also be considered the first captured point at the desired deformation in the stress relaxation experiment, especially if it is at a time close to or lower than 0.1 s.

In one or more embodiments, upon crosslinking, the composition exhibits improved solvent resistance. For example, withstanding exposure to THF at room temperature while exhibiting moderate swelling (compared to peroxide cured polymers) for over 168 hours, meanwhile uncrosslinked polymers (e.g. neat EVA), solubilize almost totally in less than 48 hours. In addition, some compositions might also present solvent resistance to boiling xylene up to 12 hours, presenting high gel content—over 70 wt %—measuring according to ASTM D2765-16.

In one or more embodiments, upon crosslinking, the composition exhibits a Hardness (measured according to ASTM D2240) ranging from 20 to 90 Asker C. In other embodiments, the composition exhibits a Hardness of 30 to 95 Shore A. In one or more embodiments, the composition exhibits a Hardness of 30 to 90 Shore D. In one or more embodiments, the composition, upon crosslinking exhibits a Shore A Hardness from 50 to 90 Shore A.

In one or more embodiments, upon crosslinking, the composition exhibits a density from 0.8 to 1.5 $g/cm^3$, preferably from 0.9-to 1.1 $g/cm^3$, as measured by ASTM D792 or ASTM D297.

In one or more embodiments, upon crosslinking, the composition exhibits a melt flow rate (MFR) from 0.01 to 100 g/10 min, preferably from 0.1 to 20 g/10 min, as measured according to ASTM D1238, measured at 190° C. under a load of 10 kg.

In one or more embodiments when the thermoplastic polymer is a crystalline polymer, upon crosslinking, the composition exhibits a melting temperature (second melting—Tm2) from 30 to 200° C., preferably from 40 to 170° C. and/or a crystallization temperature from 10 to 180° C., preferably from 20 to 160° C., and/or a glass transition temperature from −100 to 100° C., preferably from −60° C. to −40° C., as measured by DSC, according to ASTM D3418.

Crosslinked Compound

It is also envisioned that the dynamically crosslinked polymer composition may be compounded as disclosed below, In one or more embodiments, the crosslinked compound exhibits a plateau storage modulus within a temperature range of −20° C. up to at least 150° C., as measured via DMA (temperature sweep) according to ASTM D4065.

In one or more embodiments, the crosslinked compound has an elastic storage modulus that is time-dependent at temperatures above 120° C., such that it decreases by at least 50% relative to its initial value ($G_0$, plateau modulus) within 10,000 seconds at a temperature less than 230° C. The value for normalized relaxation modulus may be obtained via exponential decay fittings to the elastic storage modulus data, where the plateau modulus ($G_0$) corresponds to the fit at t=0 s. $G_0$ can also be considered the first captured point at the desired deformation in the stress relaxation experiment, especially if it is at a time close to or lower than 0.1 s.

In one or more embodiments, the crosslinked compound exhibits improved solvent resistance. For example, withstanding exposure to THF at room temperature while exhibiting moderate swelling (compared to peroxide cured polymers) for over 168 hours, meanwhile uncrosslinked polymers (e.g. neat EVA), solubilize almost totally in less than 48 hours. In addition, some compositions might also present solvent resistance to boiling xylene up to 12 hours, presenting high gel content—over 70 wt %—measuring according to ASTM D2765-16.

In one or more embodiments, the crosslinked compound exhibits a Hardness (measured according to ASTM D2240) ranging from 20 to 90 Asker C. In other embodiments, the composition exhibits a Hardness of 30 to 95 Shore A. In one or more embodiments, the composition exhibits a Hardness of 30 to 90 Shore D. In one or more embodiments, the composition, upon crosslinking exhibits a Shore A Hardness from 50 to 90 Shore A.

In one or more embodiments, the crosslinked compound exhibits a density from 0.9 to 2 g/cm³, preferably from 1 to 1.7 g/cm³, as measured by ASTM D792 or ASTM D297.

In one or more embodiments, the crosslinked compound exhibits a MFR from 0.01 to 100 g/10 min, preferably from 0.1 to 20 g/10 min, as measured according to ASTM D1238, at 190° C. and a load of 10 kg.

In one or more embodiments, the crosslinked compound exhibits a stress at break from 0.1 to 200 MPa, preferably from 5 to 30 MPa, according to ASTM D412 or ASTM 638.

In one or more embodiments, the crosslinked compound exhibits a strain at break from 50 to 2000%, preferably from 300 to 900%, according to ASTM D412 or ASTM 638.

Processing

In one or more embodiments, a crosslinkable polymeric composition which may comprise the thermoplastic polymer and the dynamic crosslinking system comprising the dynamic crosslinking agent and the catalyst are subjected to a melt-processing operation to form the dynamically crosslinkable polymer composition (i.e., not yet dynamically crosslinked). The polymeric composition may then be dynamically crosslinked as part of a multi-step process. In the first step, a polymeric composition is prepared by melt mixing a thermoplastic polymer, dynamic crosslinking agent, and optionally a catalyst at a temperature which is not sufficient to form dynamic crosslinks in the polymeric composition. In a second step, the polymeric composition formed in the first step is crosslinked, optionally in the presence of molecular oxygen, in a process using for example a hot air tunnel, oven, autoclave, or other suitable crosslinking apparatus. The step of crosslinking the polymeric composition is performed at an elevated temperature sufficient to form the dynamically crosslinked polymeric composition. The crosslinking step may be performed in the same apparatus used to form the polymeric composition upon, for example, increase in temperature, or may be performed in a separated apparatus, characterizing a reactive processing, which can in fact, remove the need for further curing steps, such as the aforementioned. The chemistries used herein for dynamic crosslinking are relatively insensitive to molecular oxygen. The crosslinking reaction to form dynamic crosslinks may be performed in environments comprising oxygen.

As previously mentioned, mixed systems with the addition of permanent crosslinking systems comprising organic peroxides or other traditional curing agents, such as sulfur, azide compounds, cyanurates, radiation, etc., that can crosslink either the matrix and/or other polymeric phases in the composition, are also envisioned if beneficial for specific properties, and might be performed in the material after or during the dynamic crosslinking process. The permanent crosslinking may occur in the thermoplastic polymer and/or other polymers in the composition to a level in which processability is not severely harmed.

In one or more embodiments, a crosslinkable polymeric composition which may comprise the thermoplastic polymer and the dynamic crosslinking system comprising the dynamic crosslinking agent and optionally the catalyst may be subjected to a melt-processing operation to form a polymer composition which is dynamically crosslinked, in a one-step or multi-step process. Specifically, the thermoplastic polymer, dynamic crosslinking agent, and catalyst, may be mixed at an elevated temperature, i.e. above the softening or melting temperature of the composition. For example, a mixture of thermoplastic polymer, dynamic crosslinking agent, and catalyst may be subjected to a processing temperature greater than a processing temperature of the non-crosslinked thermoplastic polymer to form the polymer composition. That is, the mixture may be subjected to temperatures higher than either the melting or softening point of the non-crosslinked polymers. The temperature shall be selected according to requirements for the selected processing operation, as long as it does not exceed the polymers' degradation temperature. The softening point of an amorphous non-crosslinked polymer may be determined by the Vicat softening point method according to ASTM D-1525, and the melting point of a semi-crystalline non-crosslinked polymer may be measured by differential scanning calorimetry (DSC), according to ASTM D3418.

In one or more embodiments, polymeric compositions in accordance with the present disclosure may be prepared using continuous or discontinuous extrusion or in a continuous or batch mixing. Methods may include, but are not limited to, single-, twin- or multi-screw extruders, tangential or intermeshing internal mixers, roll mill mixers, a hot-air tunnel, an oven, a hydraulic press, an injection molding machine, an additive manufacturing machine, or an autoclave, any of which may be used at temperatures ranging from 60° C. to 270° C. in some embodiments, and from 140° C. to 230° C. in some embodiments. In some embodiments, raw materials (thermoplastic polymer, dynamic crosslinking system and optionally other fillers, oils, additives, permanent crosslinking systems, etc.) are added to an extruder or other processing method, simultaneously or sequentially.

Methods of preparing polymer compositions in accordance with the present disclosure may include the general steps of combining a thermoplastic polymer, a dynamic crosslinking agent, optionally a catalyst and other fillers, oils, additives, permanent crosslinking systems, etc., in an extruder or mixer; melt extruding the composition; and forming pellets, filaments, profiles, powder, bulk compound, sheets, etc. of the polymer composition.

Polymer compositions prepared by the present methods may be in the form of granules or other configuration that are applicable to different molding processes, including processes selected from extrusion, calendaring, injection molding, foaming, compression molding, steam chest molding, super critical molding, additive manufacturing, and the like, to produce manufactured articles.

Given the dynamic crosslinking, embodiments of the present disclosure also relate to reprocessing of a crosslinked polymer composition. In one or more embodiments, because of intrinsic properties of the used chemistries, the crosslinked polymer formulation may be reprocessed or recycled using similar processing applied to the virgin polymer in the initial crosslinking process. Scrap or end-of-life parts may undergo regrinding or other required process to feed the material in the desired operation, with acceptable decrease in processability or properties, in a way that it is still useful as secondary feedstock. The intent is that, in general, the reprocessing parameters are similar to what is used for the initial manufacturing process. Advantageously, the polymer compositions may be reprocessed and the properties of the polymer composition may be substantially maintained as compared to immediately prior to the reprocessing. Specifically, in one or more embodiments, after the reprocessing, the polymer composition maintains at least 50% of its initial storage modulus plateau above its melting temperature, as measured by dynamic mechanical analysis (DMA), as compared to the polymer composition before the reprocessing.

It is also envisioned that the reprocessing occurs repeatedly (through multiple cycles). In one or more embodiments, after the repeated reprocessing (such as after 5 cycles of reprocessing), the polymer composition maintains at least 50% of its initial storage modulus plateau above its melting temperature, as measured by dynamic mechanical analysis, as compared to the polymer composition before the reprocessing.

Compounding a Crosslinked Material

Filler, oils, further crosslinking agents, antioxidants, flame retardants, foaming agents or other additives such as the aforementioned, may be compounded in a previously crosslinked material, either in the same step/mixing equipment or in a separate one. The conditions for this compounding would be to provide a minimum thermal energy and time so the crosslinked composition can flow and incorporate the other components of the formulation. The exact time and temperature necessary would depend on the exact crosslinking system characteristics, such as wt % and ratio of crosslinker and catalyst and the respective chemical composition.

Articles

In one or more embodiments, an article may be formed from the dynamically crosslinked polymeric composition or from the compounded material. The articles formed may be either foamed or non-foamed.

In one or more embodiments, the article is selected from the group consisting of a shoe sole, insole, midsole, unisole, foxing tapes or other shoe accessories/parts; a gasket, a hose, a cable, a wire, trims seals and sealing profiles or other parts of sealing systems for automotive, construction, or other industrial applications, a conveyor belt, an NVH material, acoustic insulation, roofing and flooring materials, etc., both as the main component of a formulation, or a component in formulations such as in thermoplastic vulcanizates (TPV), toughening agents for thermoplastics or thermosets, etc. In embodiments of a multilayer article, it is envisioned that at least one of the layers comprises the polymer composition of the present disclosure.

Oxygen Insensitivity During Crosslinking

The following procedure was used to evaluate the tackiness of crosslinked polymeric composition after curing (crosslinking) in an oven (not vacuum or inert atmosphere).

A sheet of the polymeric composition is prepared via calandering and/or compression molding, followed by cutting with razorblade, scissor, or other cutting device, with dimensions of 0.7-3 mm thickness, 2.5 cm width and 4 cm length (although dimensions are not the critical parameters, since it is mostly a surface phenomenon). After that, it is put in an oven for cure either being placed over some surface, such as a metallic tray, or, hung using a metal wire to the top of the oven, which was pre-heated hot air oven set to 205° C. for 15 minutes.

After 15 minutes of cure, the sheet is removed and placed immediately on an isolating surface (e.g. cured rubber), followed by the immediate coverage with a Kleenex® Facial Tissue, firm pressure by hand to the entire rubber surface, and placing a 1.8 kg weight with a flat surface over the specimen for five minutes. After cooling to room temperature, the tissue paper is carefully removed.

Upon visual evaluation, the polymeric surface should not present tissue paper fibers. If a great portion of tissue paper or its fibers adhere to the polymer, this is indicative of a poor surface crosslinking, or that a formulation has excessive surface tackiness.

The metric for this test is defined as the Tackiness Number, being the percentage of polymeric surface covered with no paper fibers÷10, ranging from 10 to 0. A tack-free surface (no paper fibers) has a rating of 10, meanwhile a poor material surface that is completely covered in tissue paper fibers has a grade of 0.

In accordance with embodiments of the present disclosure, crosslinked polymeric compositions that are relatively insensitive to the presence of molecular oxygen have a tackiness number above 5. In more specific embodiments, crosslinked polymer compositions may have a tackiness number of at least 6, 7, 8, or 9.

EXAMPLES

Example 1: Boron Centered Chemistry Crosslinking-Effect of Time of Curing in Mixer The investigation of an alternative crosslinking route to peroxide (free-radical based), with the potential of being reversible, was performed for ethylene-vinyl acetate copolymer, using triethyl borate (99%, CAS 150-46-9, supplied by Sigma Aldrich) as a dynamic crosslinking agent and Bis(acetylacetonato)dioxomolybdenum(VI) (CAS 17524-05-9, supplied by Sigma Aldrich) as a catalyst, where triethyl borate undergoes catalyzed transesterification reaction with the vinyl acetate moieties.

Prior to processing, EVA was dried in oven for approximately 16 hours at 40° C., with subsequent cooling in a dissector.

Conventional EVA (Braskem commercial grade HM728—nominal VAc content of 28 wt % and IF (190° C.

@2.16 kg)=6 g/10 min—was mixed with the components displayed in Table 1 in a mixing chamber (Haake™, roller rotors), with a fill factor of 80%, initial set temperature of 80° C., where the EVA and catalyst were first fed and mixed. After complete melt/mixing (~15 minutes), TEB was added. After ~10 minutes of mixture of TEB with the other components, set temperature was raised to the desired temperature (145-155° C.).

The TEB content displayed refers to the quantity of TEB that leads to 1 B—O bond to ⅓ of available VA sites of approximately 28 wt % VA polymer. The stoichiometry of catalyst: TEB was extracted from literature (~2 mol %) (GUO et al, 2019—http://punc.acs.org/doi/abs/10.1021/ac.macromol.9b0228). The formulation in Table 1 was used for all samples (Boron 3, 4 and 5), however, they were exposed to different thermal cycles upon different mixing times and slightly different set temperatures.

TABLE 1

| Component | phr | Wt % |
| --- | --- | --- |
| EVA HM 728 | 100.00 | 94.79 |
| TEB | 5.25 | 4.98 |
| Molybdenum catalyst | 0.24 | 0.23 |
| Total | 105.49 | 100 |

At around 150° C. of the melt temperature, a clear and intense increase in the torque of the mixing chamber was observed, indicative of crosslinking reaction, which increases viscosity and elasticity of the melt. The samples Boron 3 and 4 presented identical formulation and feeding sequence as Boron 5, however, they were submitted to other reaction protocols, with less intense thermal cycles. Boron 4 was submitted to the least intense thermal protocol, with no observable torque increase, meanwhile, Boron 3 was submitted to a more intense thermal cycle with significant torque and temperature increase, but less intense than Boron 5. A summary of processing outputs can be seen in Table 2. Samples Boron 3 and 4 were then laminated in a cylinder at 80° C., meanwhile, Boron 5 was laminated at 90° C. Samples were cut from the laminated parts in order to produce specimens for rheometry.

TABLE 2

| Formulation | Final time (min) | Final temperature (° C.) | Final Torque (N.m) |
| --- | --- | --- | --- |
| Boron 3 | 37 | 175 | 155 |
| Boron 4 | 36 | 151 | 45 |
| Boron 5 | 50 | 212 | 190 |

Characterizations to evaluate crosslinking were performed in a parallel plate shear oscillatory rheometer Anton Paar Model MCR 102 (frequency sweep: diameter of 25 mm, gap of 1-2.4 mm, 200° C., amplitude of 1%, 1 to 100 rad/s; time sweep: diameter of 25 mm, gap of 1-2.2 mm, 60 minutes, 200° C., frequency of 1.67 Hz (~10.47 rad/s), amplitude of 7%; solvent resistance (visual evaluation, exposure to THF at room temperature, up to 168 h) and dynamic mechanical analysis with a DMA 25 Metravib, in compression mode, temperature sweep from 23 to 100° C., heating rate of 5° C./min, static load of −8N, frequency of 1 Hz, deformation of 10 microns, in cut specimens shaped as parallelepiped, with the dimensions of 4×7×3 mm (width×length×thickness), being evaluated in duplicates.

In order to compare Boron 5 to neat EVA HM728, stress relaxation experiments were performed in an oscillatory shear rheometer Ares G2, with a parallel plate accessory, diameter of 25 mm, gap of ~1-1.5 mm, axial force of 10 N, soak time of 10 minutes, deformation of 1%, and temperatures of 180, 160, 140, 120° C. The samples were prepared via compression molding, at 180° C., for 20 minutes.

Figure 2:
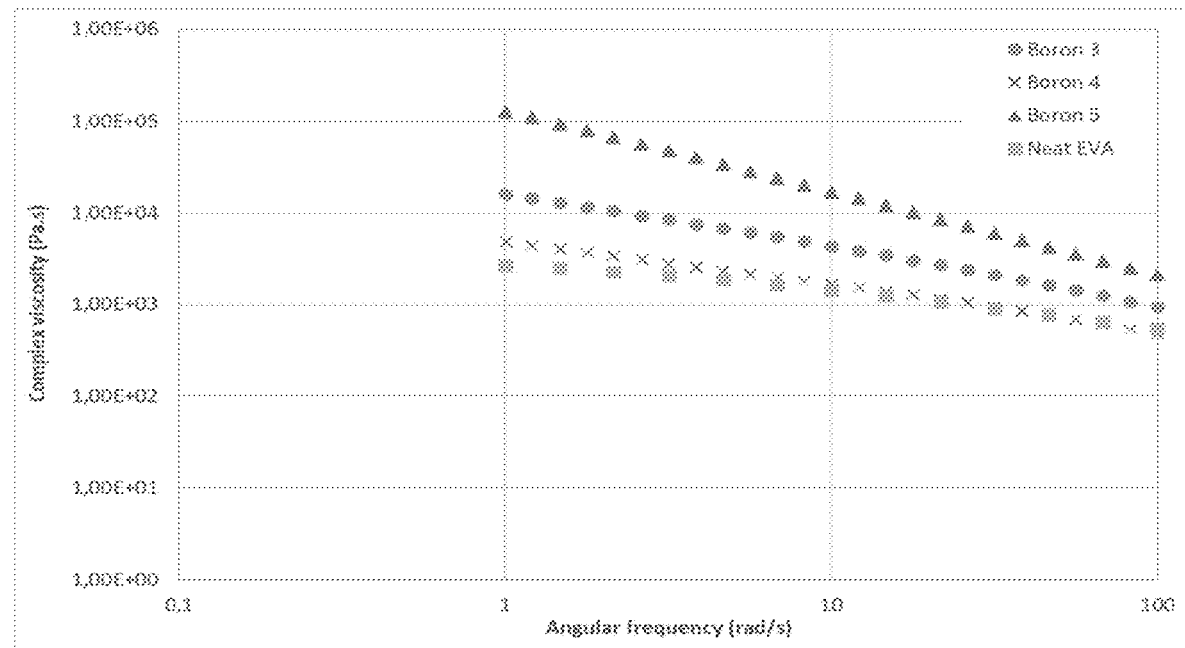
Figure 3:
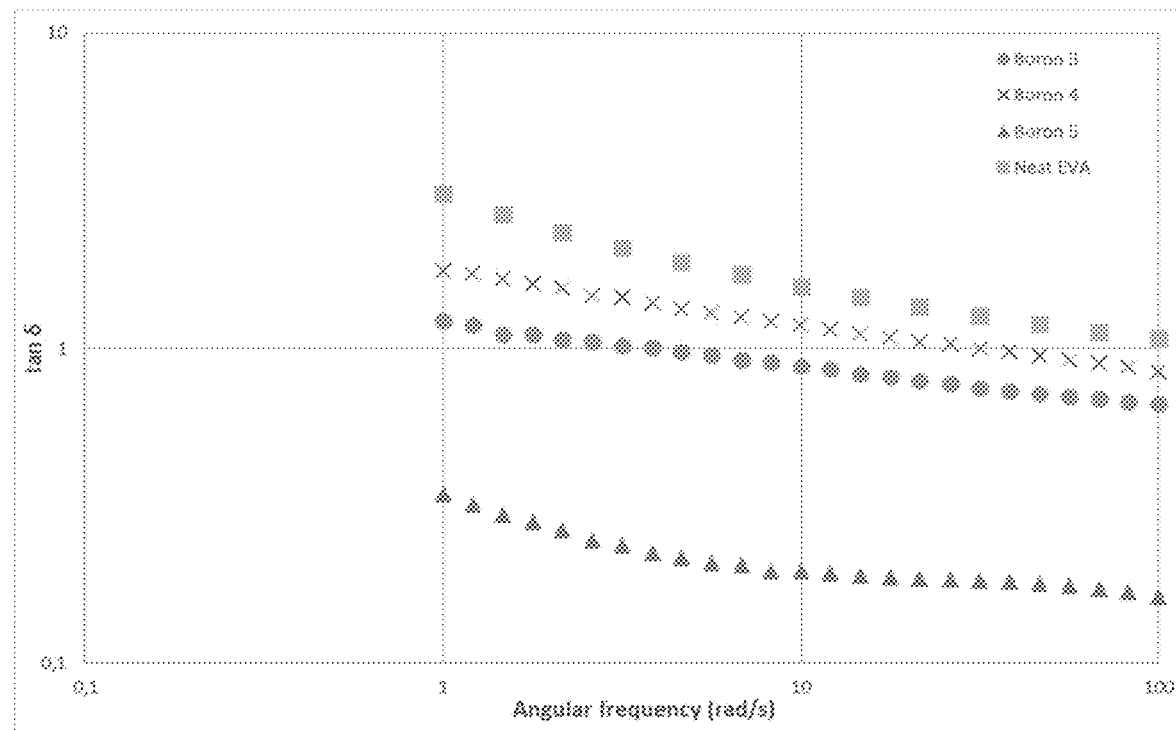
Figure 4:
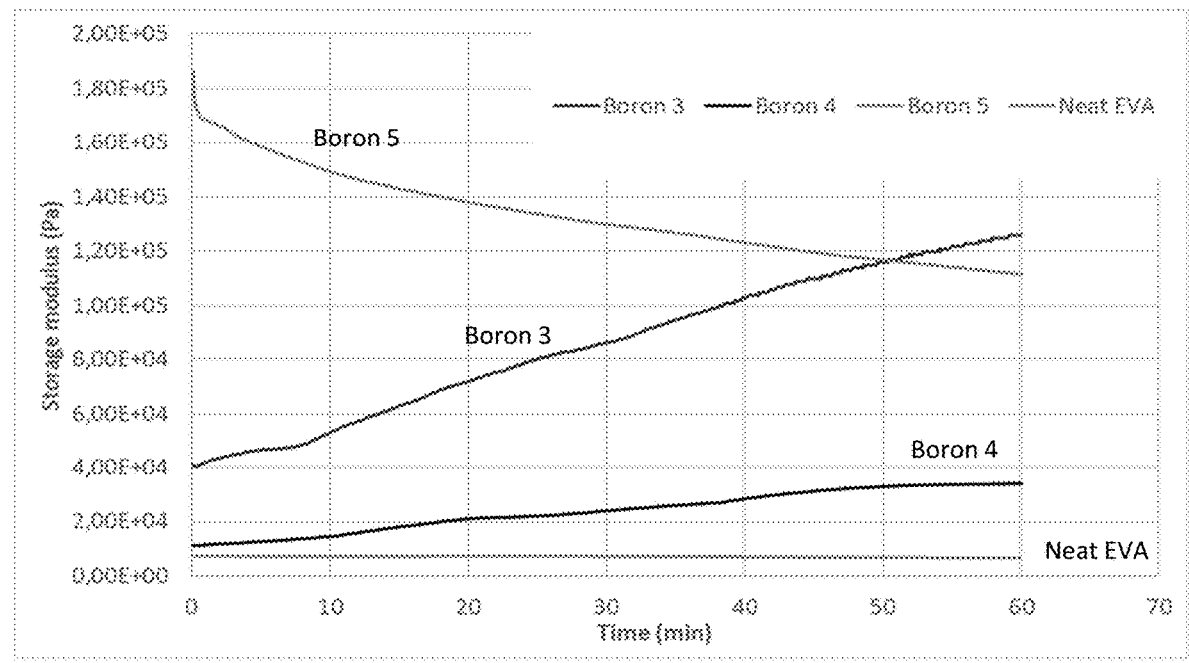
FIGS. 4-7 show a comparison of tested samples for time sweep in parallel plate shear rheometry.
Figure 5:
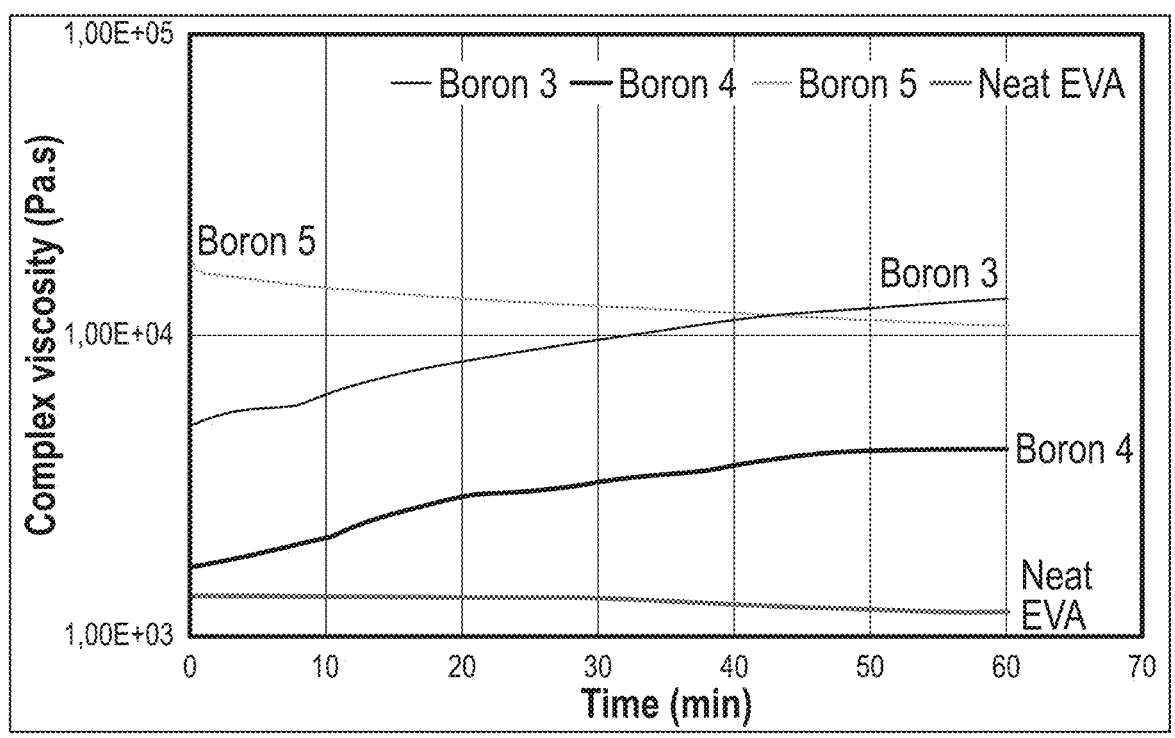
Figure 6:
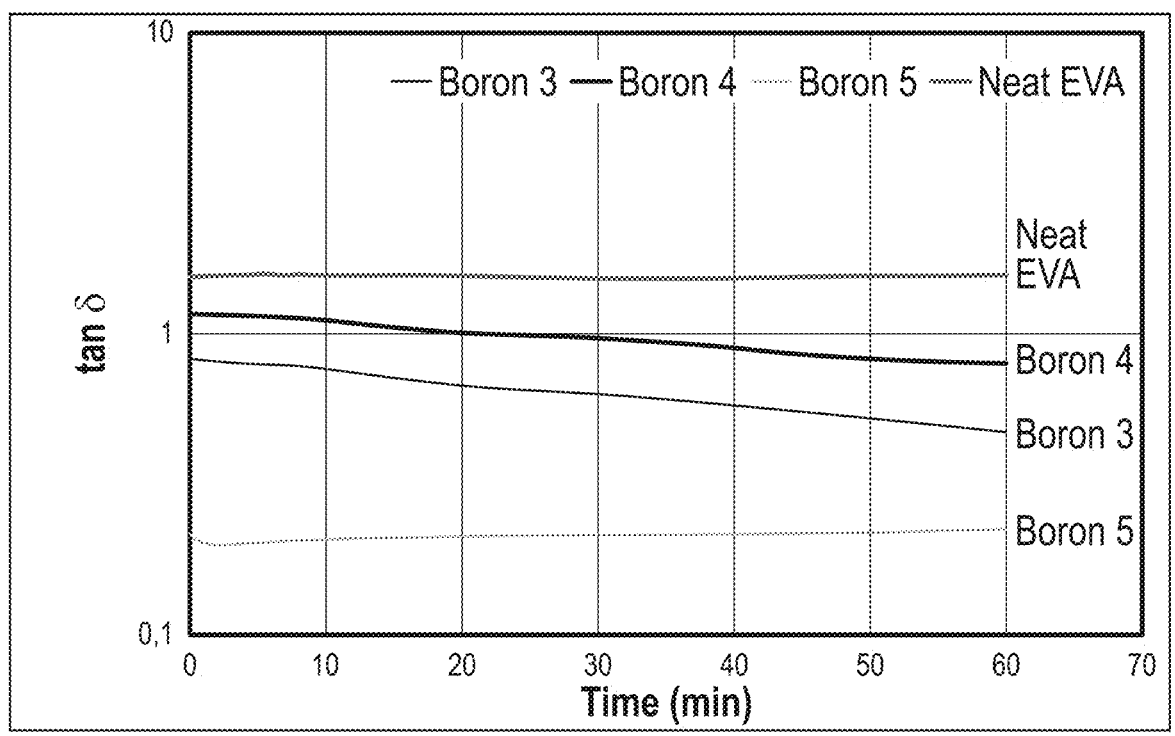
Figure 7:
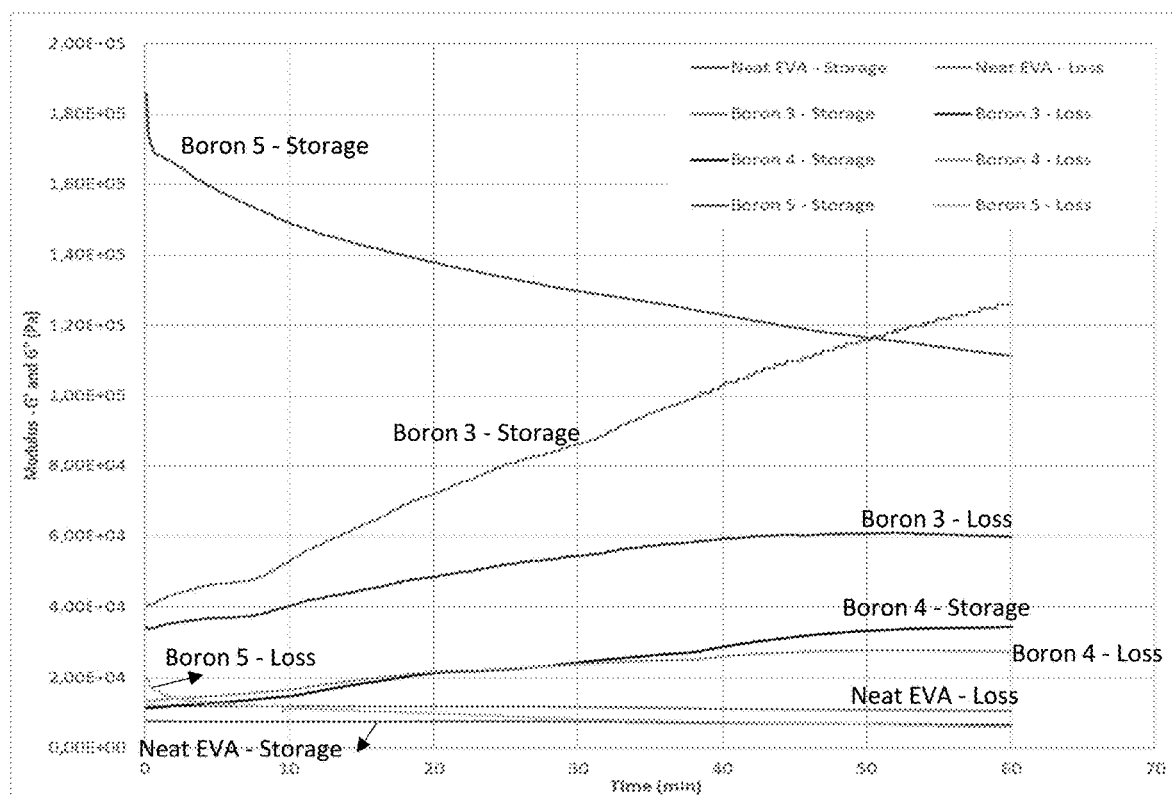

It is possible to notice a significant increase in storage modulus, viscosity and decrease in tan δ when comparing neat EVA and Borate cured samples, both at time and frequency sweep, demonstrating the large extension of the crosslinking reaction. The difference in torque behavior and in thermal cycle was translated in rheological properties, with lower viscosity and elasticity for Boron 3 and even lower for Boron 4 compared to Boron 5, as shown in FIGS. 1, 2 and 3 for frequency sweep and FIGS. 4, 5, 6 and 7 for time sweep. Samples Boron 4 and 5 started the time sweep test after the "gel point" (i.e. storage modulus>loss modulus, tan δ<1) after more intense thermal cycle in the mixing chamber. Boron 4, on the other hand, started the experiment with loss>storage modulus, however, the crossover is seen during the experiment (~28 min) shown in FIG. 7.

Figure 8A:
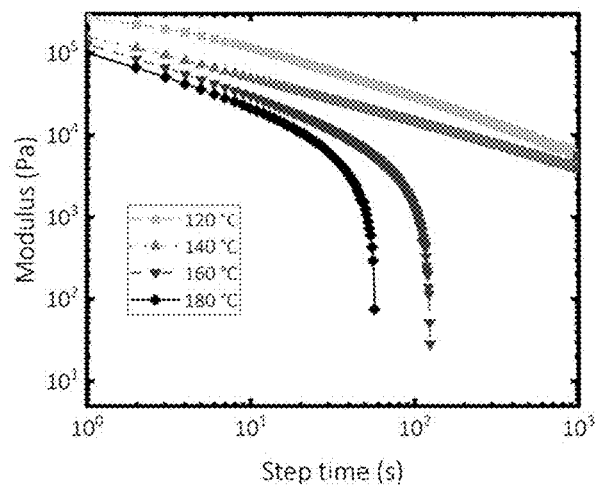
FIGS. 8A-B and 9A-B show the results of stress relaxation experiments for neat EVA and the sample Boron 5.
Figure 8B:
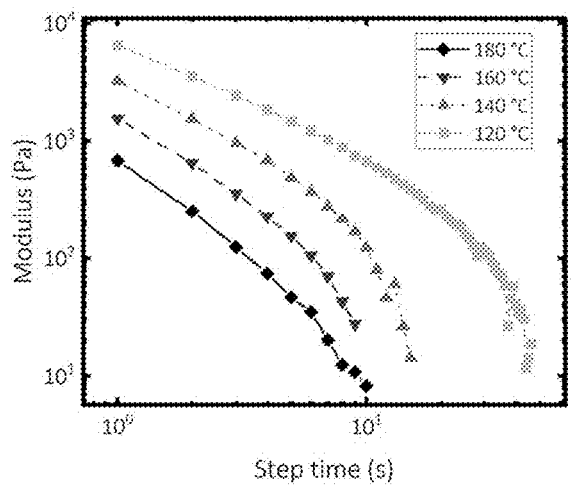
Figure 9A:
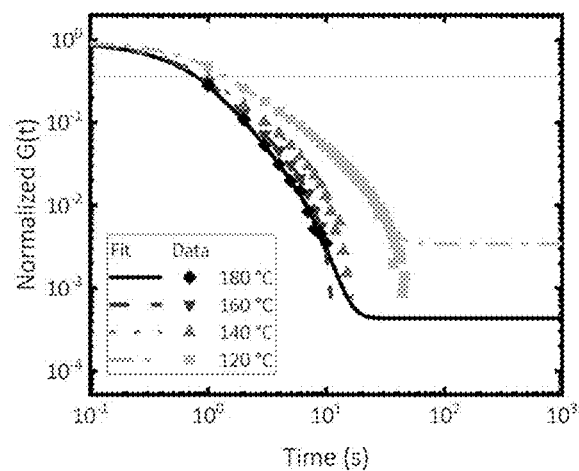
Figure 9B:
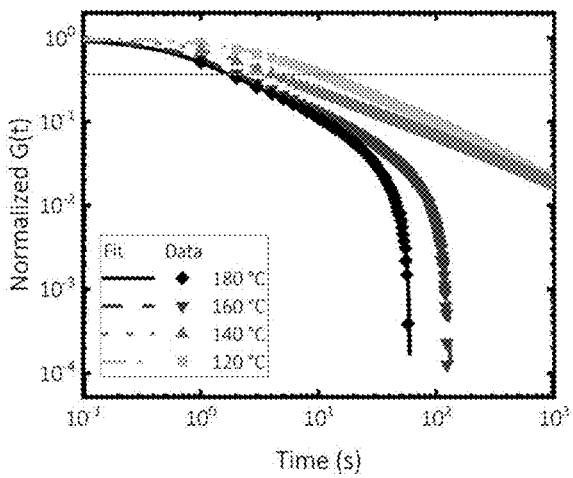

Stress relaxation results are shown in FIGS. 8 and 9. The difference in behavior is clear, where for relaxation modulus was overall much higher for Boron 5 at all temperatures than neat EVA (HM728, as described above), for which relaxation essentially fully happens in all the studied range (180-120° C.) within 50 seconds. On the other hand, when crosslinked with borate, significant relaxation is observed for 160 and 180° C. (almost total relaxation within 100 s), however, for 120 and 140° C., full relaxation was not observed until 10000 s (however, greater than 50% was obtained before 8 seconds). The value for calculating normalized relaxation modulus was obtained via exponential decay fittings to the data. The relaxation plateau modulus corresponds to the fit at t=0 s, which is also referred to as $G_0$.

Figure 10A:
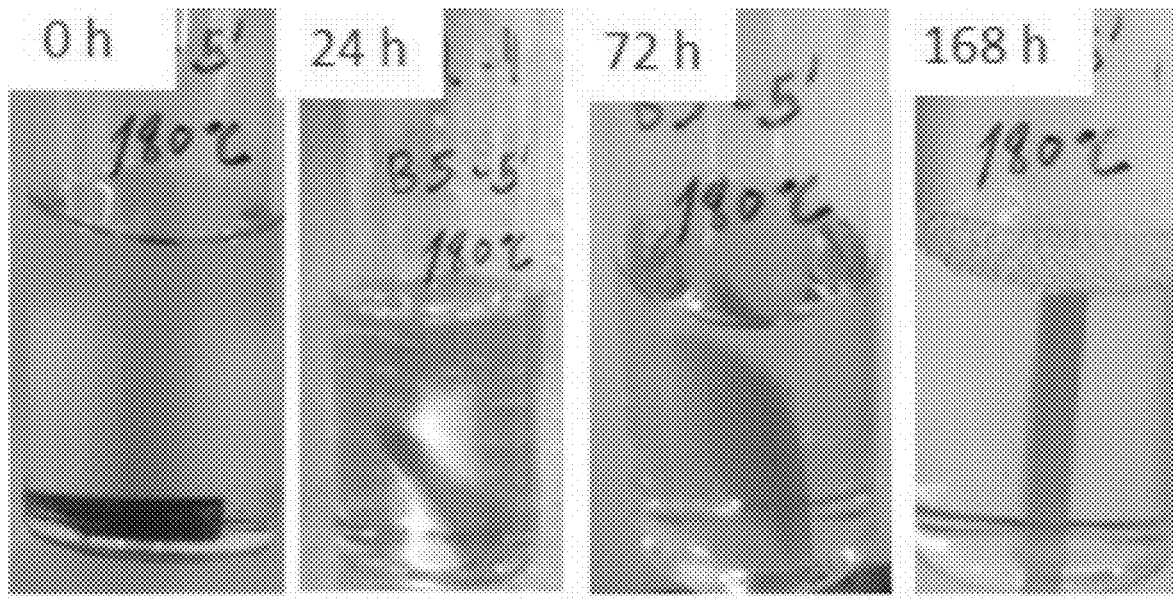
FIGS. 10A and B show solvent resistance of samples Boron 5 and EVA crosslinked with peroxide when exposed to THF for 168 hours.
Figure 10B:
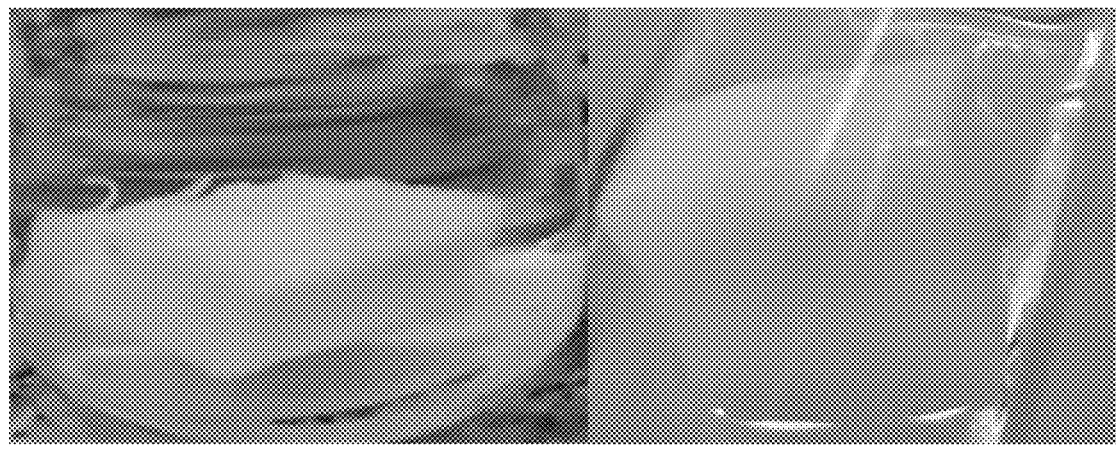

In addition, for Boron 5 it is possible to notice a significantly improved solvent resistance (compression molded for 5 minutes at 180° C. for making the shape appropriate for the test, and the same was observed when further cured), where it only swelled when exposed to THF for 168 h at room temperature, shown in FIG. 10A, similar to what happens with a peroxide-cured EVA (FIG. 10B—EVA with 1.5 phr of DCP and 20 phr of calcium carbonate, cured in oven for 15 min, 205° C.). On the other hand, uncrosslinked EVA will solubilize in less than 48 hours.

Figure 11:
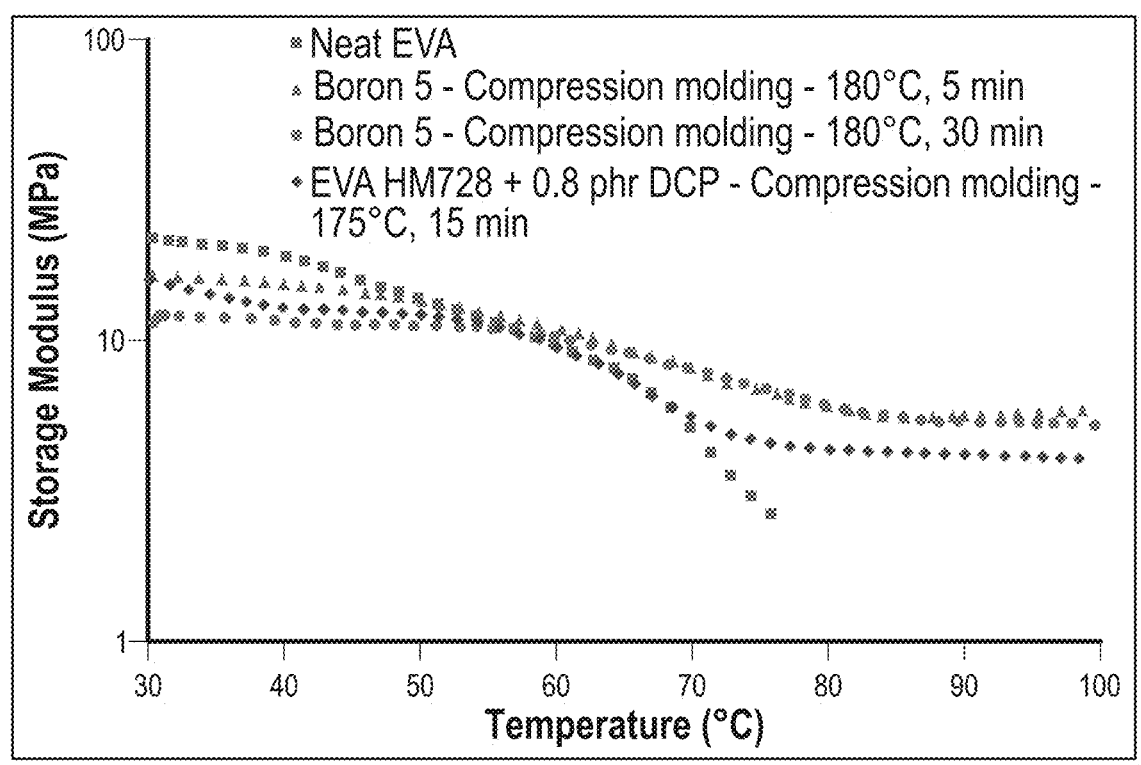
FIG. 11 shows DMA testing results.

For Boron 5, DMA tests corroborate rheology and solvent resistance, displaying a change in the thermomechanical behavior in comparison to neat EVA, where a further 5 or 30 mins cure at 180° C. and 50 bar was able to suppress the storage modulus drop upon EVA melting after ~75° C., showing instead a rubbery plateau, up to ~100° C., as shown in FIG. 11). This is a typical behavior of crosslinked polymers, following the example displayed in FIG. 10 of EVA crosslinked with 0.8 phr dicumyl peroxide, in a compression molding cycle of 15 minutes at 175° C., after dispersion in mixing chamber with set temperature of 80° C., 50 rpm. The same type of behavior in terms of rubbery plateau was observed, with an even higher storage modulus in the rubbery plateau compared to the peroxide cured sample, while maintaining low temperature (~30° C.) values for modulus. Results are shown in in FIG. 11.

In terms of crosslinking in presence of atmospheric oxygen (oven), upon the evaluation in the previously described tissue paper test, samples Boron 3 and 5 have not presented surface tackiness. Sample 4, which was intentionally not crosslinked in the mixing chamber demonstrated tackiness upon oven cure because a substantial melting of the sample was observed, indicating that the crosslinking efficiency is much higher when processing happens upon flow vs only in the oven, possibly related to catalyst constant distribution along the polymeric matrix. Rheological data back up this difference in crosslinking capability, being much larger in frequency sweep, but most importantly, time sweep for samples Boron 3 and 5, crosslinked (even if partially) in mixing chamber, as seen in FIGS. 4 to 10. The results are displayed in FIG. 12.

Figure 13:
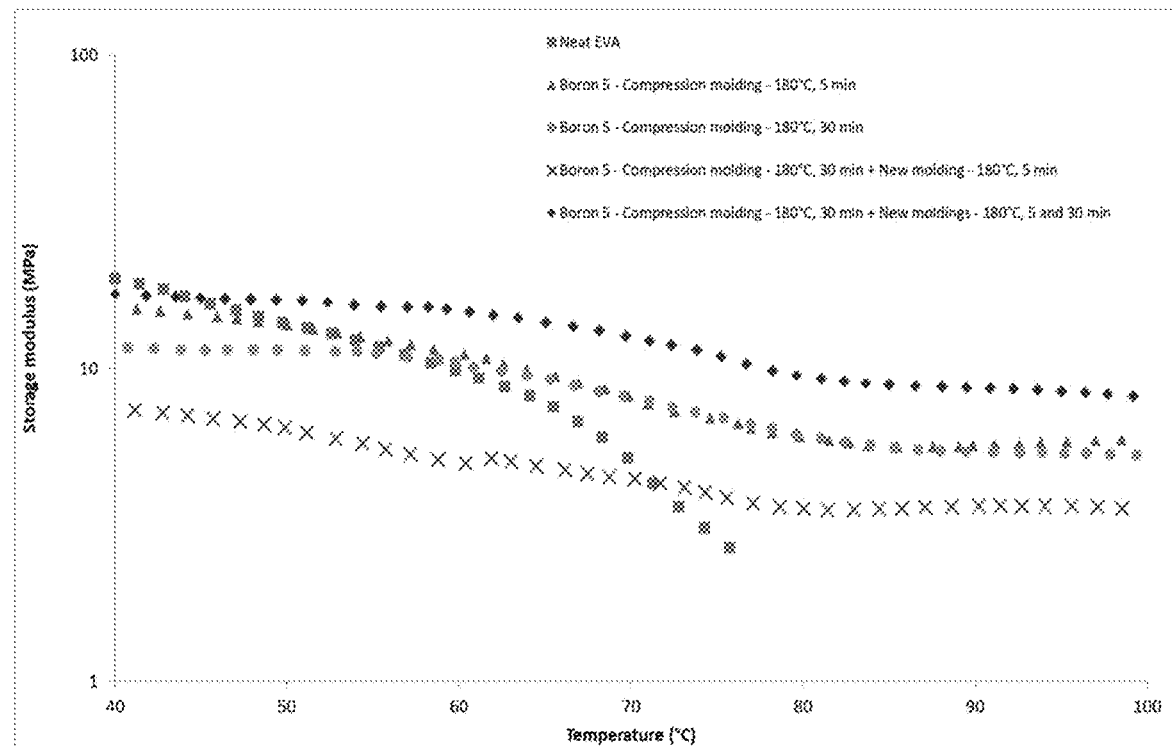
FIG. 13 shows DMA testing results after a second molding cycle of a crosslinked sample.

Example 2: Boron Centered Chemistry Crosslinking-Effect of Curing Time in Hot Press after Cure in Mixing Chamber and Remolding An initial evaluation of molding time and reversibility of reaction was made through new compression molding and DMA testing as seen in FIG. 13. Samples were compression molded for 5 and 30 minutes for the sake of comparison. Then, the sample molded for 30 minutes was cut, molded again (for 5 minutes at 180° C.), and had a new DMA measurement. The same sample, was once again cut, molded for another 30 minutes at 180° C., and a new DMA measurement was performed, being that an indicative of possible recyclability. For all samples, the rubbery plateau was maintained, indicative of crosslinking. Samples with 5 and 30 minutes of molding presented very similar thermomechanical behavior, and the sample molded for 30 minutes, when cut and remolded, presented an initial drop when molded for 5 minutes (which presented some difficulties when pressing), and even an increase in modulus for 30 minutes of compression molding.

Example 3: Boron Centered Chemistry Crosslinking-Effect of Recycling Operations (Compression Molding)

Figure 14:
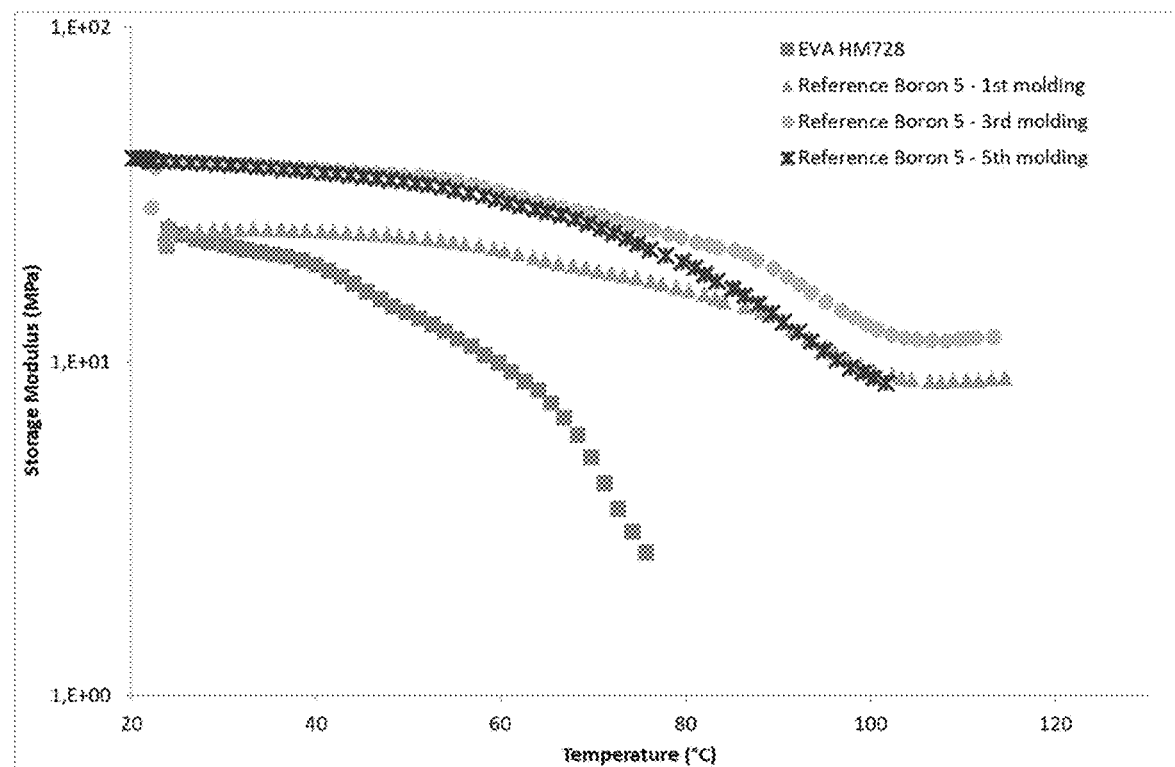
FIG. 14 shows DMA data of multiple curing cycles of sample Boron 5.

Multiple recycling operation via compression molding were performed in the reference sample—Boron 5, where 5 cycles of compression molding (180° C., 5 minutes, 32 bar, cooling rate of 15° C./min to 80° C.) were performed, samples were cut and tested via DMA (temperature sweep from 25 to 120° C.). No significant changes were detected for the first and third molding cycle (FIG. 14 and table 3). There was not a well-formed rubbery plateau at high temperatures (>105° C.) for the 5$^{th}$ molding cycle, although modulus was at similar levels of the 1$^{st}$ and 3$^{rd}$ cycle up to 100° C. (see Table 3), with much higher values of storage modulus at temperatures >70° C. compared to neat EVA. These differences could be related to sample preparation issues (especially dimensional precision and its effects over deformation levels on the sample or thermal degradation (or eventual issues with sample preparation)), since controlled cooling should have made sample preparation more homogeneous in terms of crystallization/reaction.

TABLE 3

| Molding # | Modulus (Pa) | T(° C.) | Ratio |
|---|---|---|---|
| 1 | 9.37E+06 | 100.35 | 1.00 |
| 3 | 1.25E+07 | 100.80 | 1.33 |
| 5 | 8.95E+06 | 100.35 | 0.95 |

Example 4: Boron Centered Chemistry Crosslinking-Effect of Crosslinking System Content, Catalyst Content and Type Changes in catalyst content and type and crosslinking system content were made in order to assess the behavior of reversibly crosslinked compositions. The compositions are displayed in Table 4.

TABLE 4

| | Reference-Boron 5 | | DBTO | | 2× Crosslinking system | | ½ Catalyst | |
|---|---|---|---|---|---|---|---|---|
| Materials | phr | wt % | phr | wt % | phr | wt % | phr | wt % |
| EVA HM728 | 100.00 | 94.80 | 100.00 | 94.80 | 100.00 | 90.05 | 100.00 | 94.90 |
| Molybdenum Catalyst | 0.24 | 0.23 | — | — | 0.48 | 0.43 | 0.12 | 0.11 |
| DBTO | — | — | 0.24 | 0.23 | — | — | — | — |
| TEB | 5.25 | 4.98 | 5.25 | 4.98 | 10.57 | 9.52 | 5.25 | 4.98 |
| Total | 105.49 | 100.00 | 105.49 | 100.00 | 111.05 | 100.00 | 105.40 | 100.00 |

Compositions with the replacement of Molybdenum based catalyst with DBTO (dibutyltin oxide—CAS 818-08-6—TIB KAT 248 by TIB Chemicals, gently provided by AODRAN DO BRASIL COMÉRCIO DE PRODUTOS QUÍMICOS LTDA., Tin content >47t %), with twice the content of the dynamic crosslinking system (TEB and catalyst), and half the content of the Molybdenum based catalyst were compounded following the procedure aforementioned. A different processing behavior was observed for DBTO, where a lower temperature was reached upon viscous dissipation, possibly due to the embrittlement of the melt upon crosslinking. A much more "standard" behavior, good aspect of the sample and similar processing characteristics compared to the reference Boron 5 were observed for 2× the dynamic crosslinking system and ½ Catalyst. Processing outputs (approximate values) are displayed in Table 5.

TABLE 5

| Formulation | Final time (min) | Maximum temperature (° C.) | Maximum Torque (N.m) |
|---|---|---|---|
| DBTO | 64 | 184 | 115 |
| 2× Crosslinking system | 55 | 210 | 167 |
| ½ Catalyst | 53 | 215 | 200 |

Figure 15:
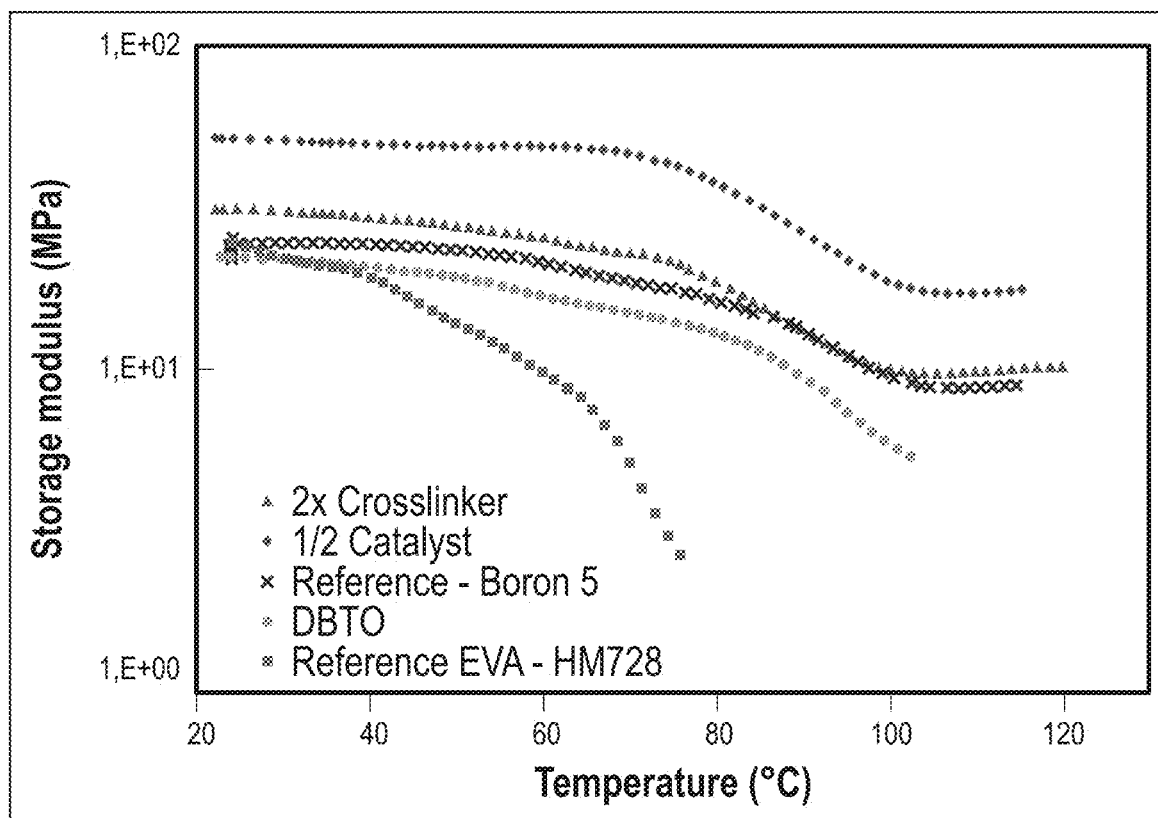
FIG. 15 shows DMA data of tested samples (DBTO catalyst, 2× crosslinker, ½ catalyst, Reference—Boron 5 and Neat EVA).

Samples with different contents of dynamic crosslinking system, catalyst and catalyst type were compression molded with the same previously used conditions (180° C., 32 bar, 5 minutes, cooling rate of 15° C./min until 80° C.) and tested via DMA (compression mode, temperature sweep from 25 to 135° C., parameters already described. Results are available in FIG. 15. DMA results display similarities among samples, with higher modulus for all temperatures for sample with half of the Mo based catalyst, a very similar behavior between the reference Boron 5 and 2× crosslinking system, and a slightly lower modulus for all temperatures for DBTO. All samples presented well-formed rubbery plateaus, up to almost 120° C., while DBTO sample did not, stopping the measurement after ~100° C. Still, DBTO presented much higher storage modulus compared to neat EVA in temperatures >40° C., up to 100° C., which is an indicative of crosslinking.

It is possible that the processing characteristics observed for DBTO means either lower crosslinking density and/or a lower efficiency of the DBTO catalyst in order to perform the transesterification compared to the other crosslinking systems. Reaction temperature was overall lower, since melt embrittlement was observed upon reaction, which led to decrease in torque and therefore viscous dissipation. However, an upside was the coloration of the sample, which now is white, much easier to be colored/dyed.

Example 5: Making a Composition with Previously Dynamically Crosslinked Polymer

Compounds with the aforementioned crosslinked compositions were produced via mixing chamber (Haake™, roller rotors), followed by roll mill lamination. The compound formulation tested is displayed in Table 6.

The compound based on the already crosslinked composition Boron 5 (base EVA HM728) was processed with a fill factor of 70%, where a first mixing step with set temperature of 80° C., 30 rpm, for 10 minutes was performed. The premixture was laminated in a roll mill at 40° C., then re-fed in the mixing chamber and reprocessed for improved dispersion with a set temperature of 160° C., 30 rpm for 5 minutes. After that, the compound was laminated at 40° C. in a roll mill. The mixing conditions, feeding sequence and temperature are displayed in Table 7.

TABLE 6

| Material | Amount, phr | wt % |
| --- | --- | --- |
| EVA + Crosslinking System-Already crosslinked-Boron 5 | 100.0 | 45.5 |
| TOTM (Tris (2-Ethylhexyl) Trimellitate) | 20.0 | 9.1 |
| Calcium Carbonate | 80.0 | 36.4 |
| Carbon black N550 | 20.0 | 9.1 |
| Total | 220.0 | 100.0 |

TABLE 7

| Step | Mixing chamber setting | Time (cumulative) (min) | Melt temperature (° C.) | Feeding order/action |
| --- | --- | --- | --- | --- |
| 1 | 80° C. 30 rpm | 0.0 | 79.9 | Feed-⅗ of crosslinked composition |
| | | 0.9 | 71.0 | Feed-⅖ of crosslinked composition |
| | | 1.7 | 70.0 | Carbon black |
| | | 2.6 | 73.0 | ⅓ CaCO3 + ½ TOTM |
| | | 4.2 | 80.8 | ⅓ CaCO3 |
| | | 5.9 | 85.2 | ⅓ CaCO3 + ½ TOTM |

TABLE 7-continued

| Step | Mixing chamber setting | Time (cumulative) (min) | Melt temperature (° C.) | Feeding order/action |
| --- | --- | --- | --- | --- |
| | | 6.8 | 98.0 | Cleaning step |
| | | 8.5 | 103.6 | Cleaning step |
| | | 10.0 | 107.4 | Discharge |
| 2 | 160° C. 3 rpm | 0.0 | 162.1 | ⅓ of compound |
| | | 1.3 | 125.8 | ⅓ of compound |
| | | 2.1 | 131.9 | ⅓ of compound |
| | | 5.0 | 163.9 | Discharge |

Figure 16:
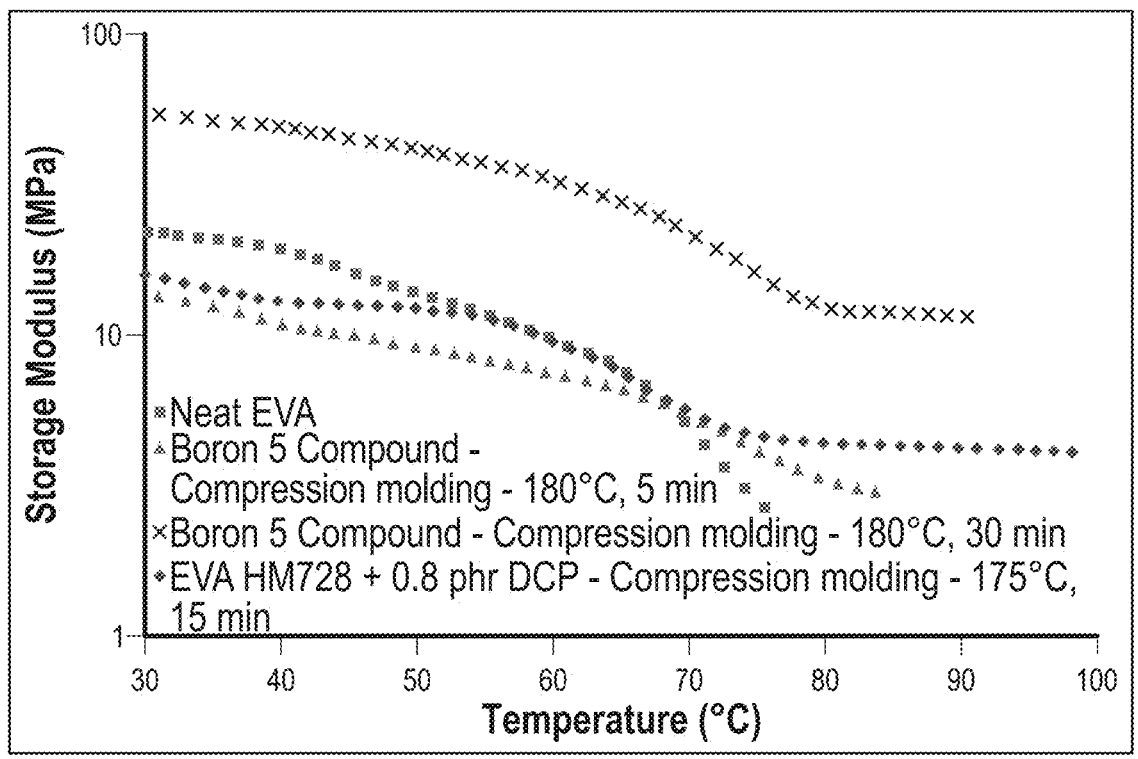
FIGS. 16-18 DMA data of the compound made with crosslinked composition Boron 5.
Figure 17:
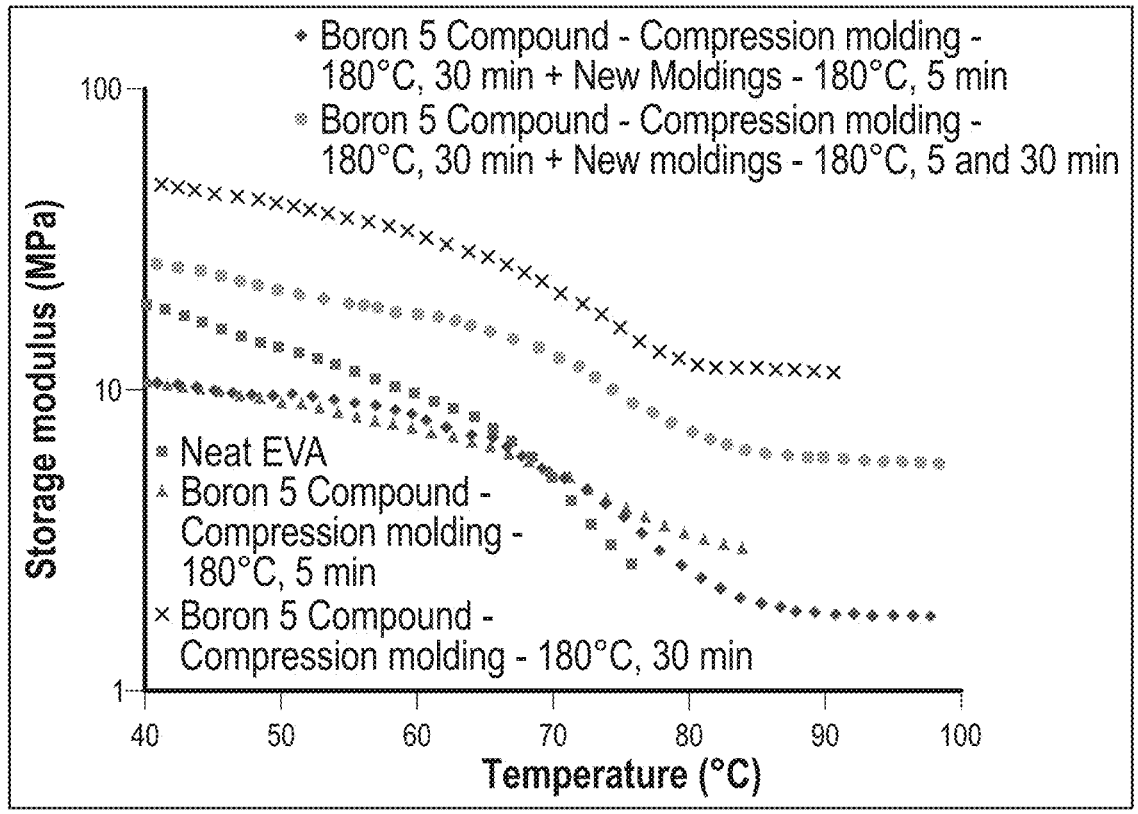

Via DMA, one can see that, compared to the sample molded at 180° C. for 5 minutes, the sample molded for ~30 minutes displayed an overall increase in modulus even for lower temperatures, followed by a rubbery plateau up to 90° C., as seen in FIG. 16. On the other hand, the sample molded for ~5 minutes at 180° C. showed an intermediate behavior when compared to neat EVA, where only the beginning of the plateau is seen. Similar to what was seen for the crosslinked compositions (when only EVA+crosslinking system), retesting via DMA was possible following the same protocol (chopping up and molding the samples again, molding with air cooling), as shown in FIG. 17, with a decrease in modulus, however, the rubbery plateau was perfectly maintained. Sample preparation might have affected the overall values of this test, especially the 5 minutes molded sample, where the absence of controlled cooling makes molding removal more challenging.

Figure 18:
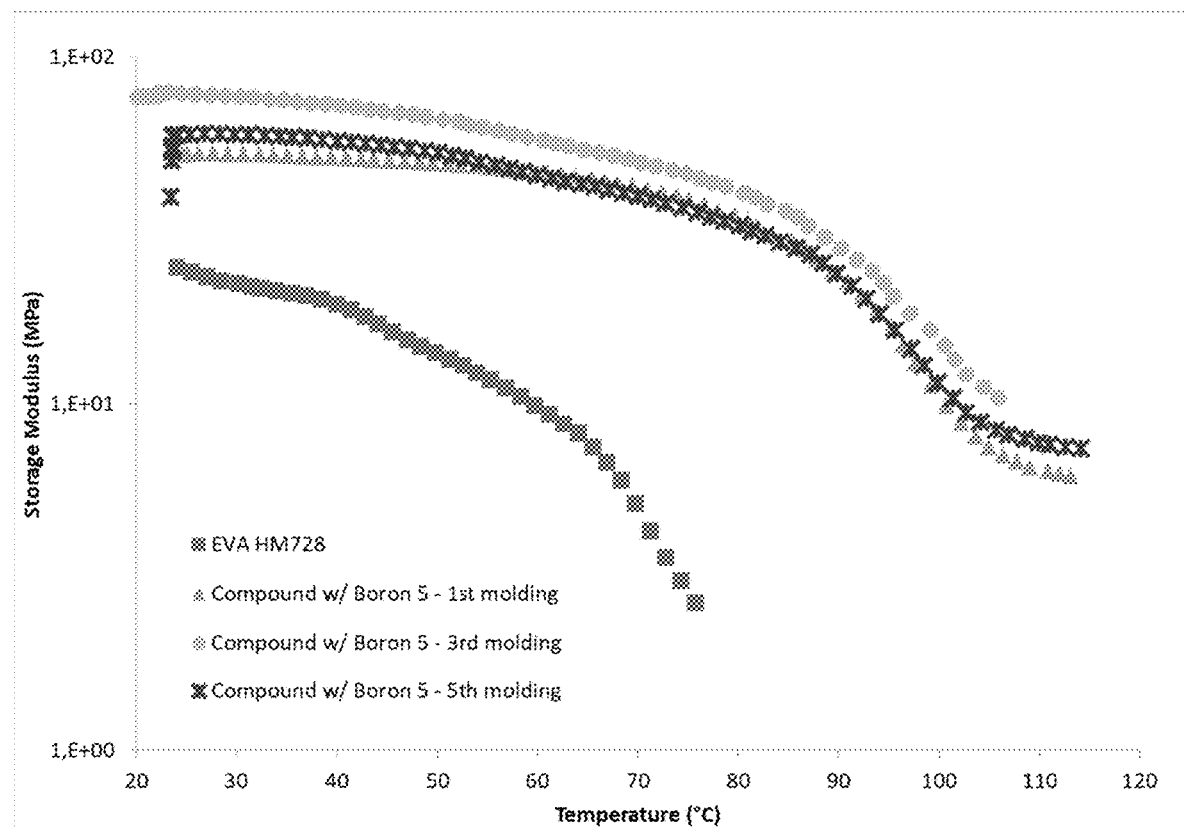

The compound was, similarly to what was done to the crosslinked composition Boron 5, tested for 5 cycles of recycling via compression molding/cutting cycles, following the same compression molding and testing protocol (with controlled cooling—15° C./min). Results are displayed in FIG. 18 and Table 8. It is possible to notice a small variation in terms of storage modulus—with increase in modulus related to the first molding—lower than 50%. There was a well-formed rubbery plateau for $1^{st}$ and $5^{th}$ molding cycles, up to ~115° C., meanwhile the $3^{rd}$, did not presented it for some reason, which could be for example, due to thickness variation in the sample.

TABLE 8

| Molding # | Modulus (Pa) | T (° C.) | Ratio |
| --- | --- | --- | --- |
| 1 | 7.51E+06 | 104.95 | 1.00 |
| 3 | 1.12E+07 | 104.45 | 1.49 |
| 5 | 8.86E+06 | 104.15 | 1.18 |

Figure 19:
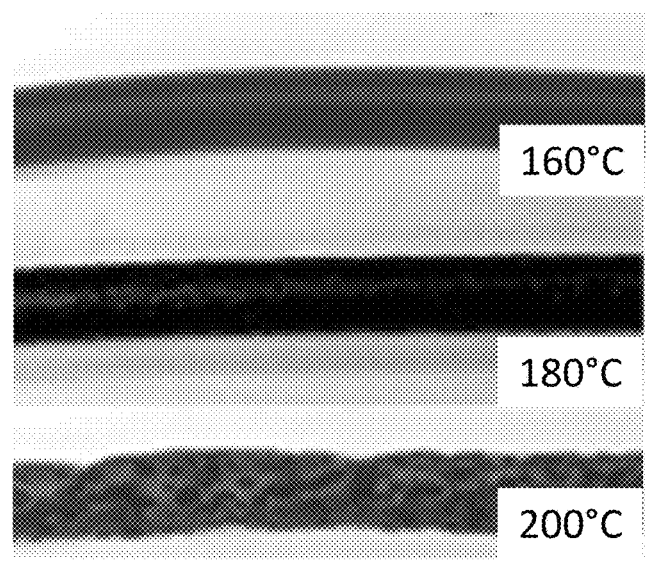
FIG. 19 shows the comparison of different temperatures of a melt flow rate test of the aforementioned compound.

Extrudability/processability of the compound was initially assessed using a plastometer Melt Flow from Ceast at 160, 180 and 200° C., with 10 kg, for 30-60 seconds, according to ASTM D1238:2013 Method A, purge time of 300 seconds. The goal was to understand the effect of temperature on flowability of the material through a die, as well as the aspect of the extruded strand. Parameters and the aspect of resulting samples of the melt flow index analysis for each sample are available in Table 9 and in FIG. 19. One can see that 160° C. was the best temperature, where a smooth surface was obtained. Especially for 200° C., several number of bubbles and defects were observed

TABLE 9

| Temperature (° C.) | Time for the cut (s) | MFI (g/10 min) | Extruded length (cm) | Extruded thickness (mm) |
|---|---|---|---|---|
| 160 | 60 | 4.2 ± 0.37 | 6.5 | 2.4 |
| 180 | 60 | 8.1 ± 0.78 | 15.1 | 2.3 |
| 200 | 30 | 18.5 ± 0.43 | 15.6 | 2.6 |

Figure 20:
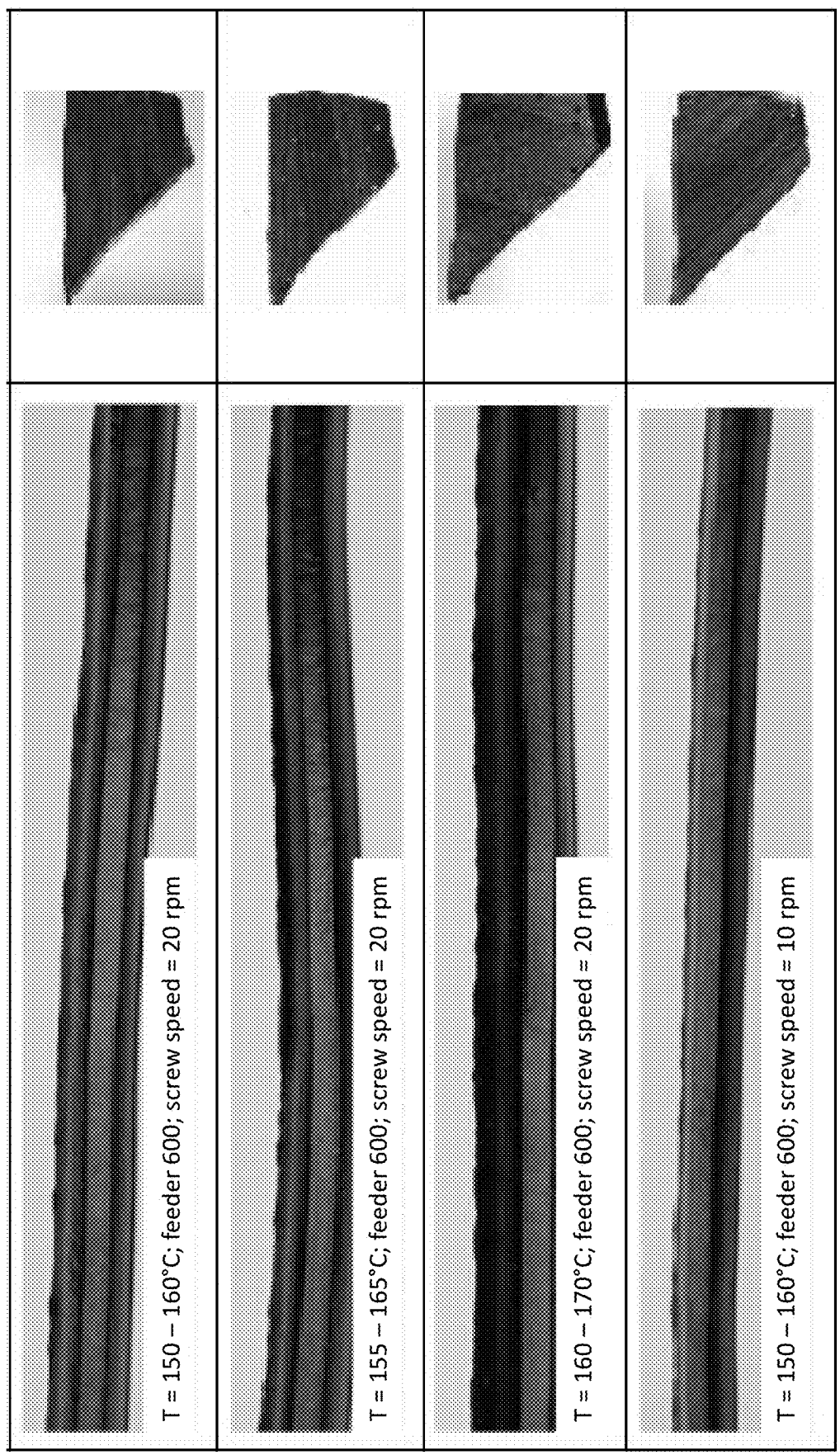
FIG. 20-21 show the effect of extrusion conditions over the dimensional stability and part quality of extruded profiles (Garvey die).
Figure 21:
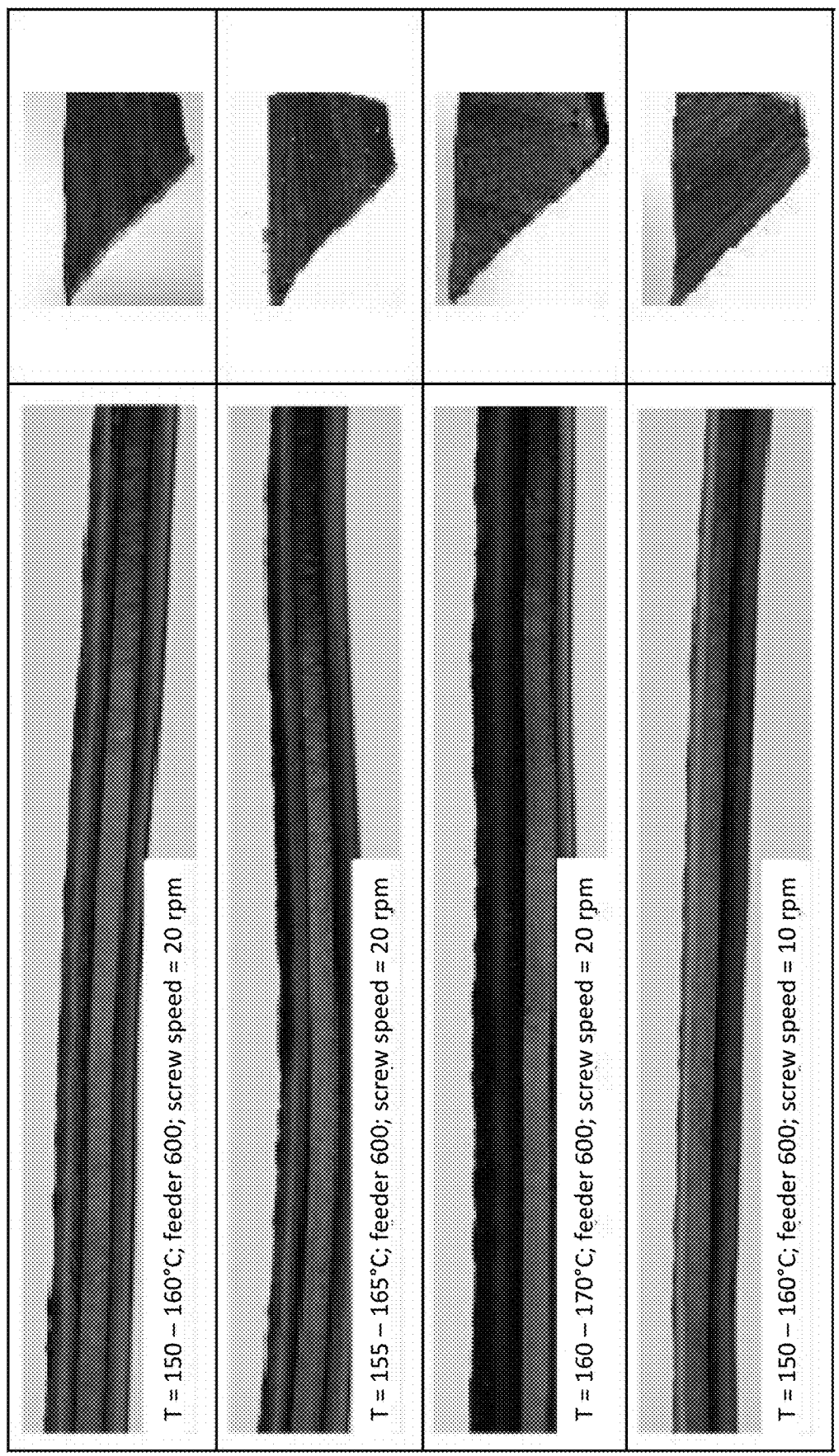

Extrusion of the compounds were carried in an extruder Rheomex 203p with a single-screw design based on convey elements, coupled to the main unit of the Haake Polylab System. Two types of die were used—flat and Garvey (according to ASTM D2230-17). The latter determine a rubber compound extrudability, combining flat surfaces, sharp corners and thin cross sections, meanwhile the flat die produces a tape that can conveniently tested under tensile. For the Garvey die, temperatures ranging from 150 to 170° C. were tested, screw speeds from 20 to 40 rpm, and the rotational feeder speed from 400 to 600 were evaluated as displayed in FIGS. 20 and 21. Overall, lower screw speeds (20 rpm), average temperatures (155-165° C.) and the higher feeder speed (600) led to the best profiles.

Figure 22:
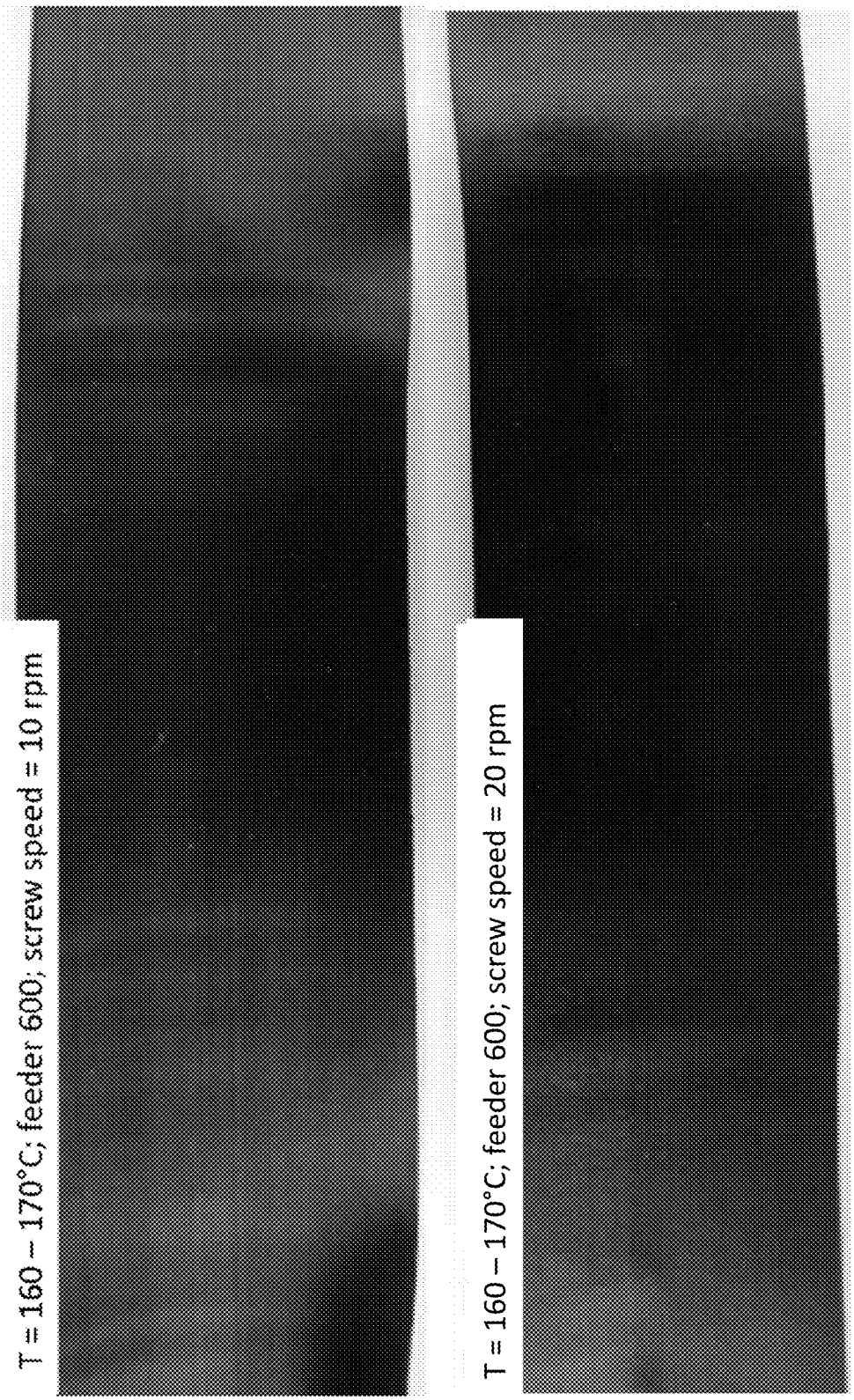
FIG. 22 shows the effect of extrusion conditions over part quality of extruded profiles (flat die).
Figure 23:
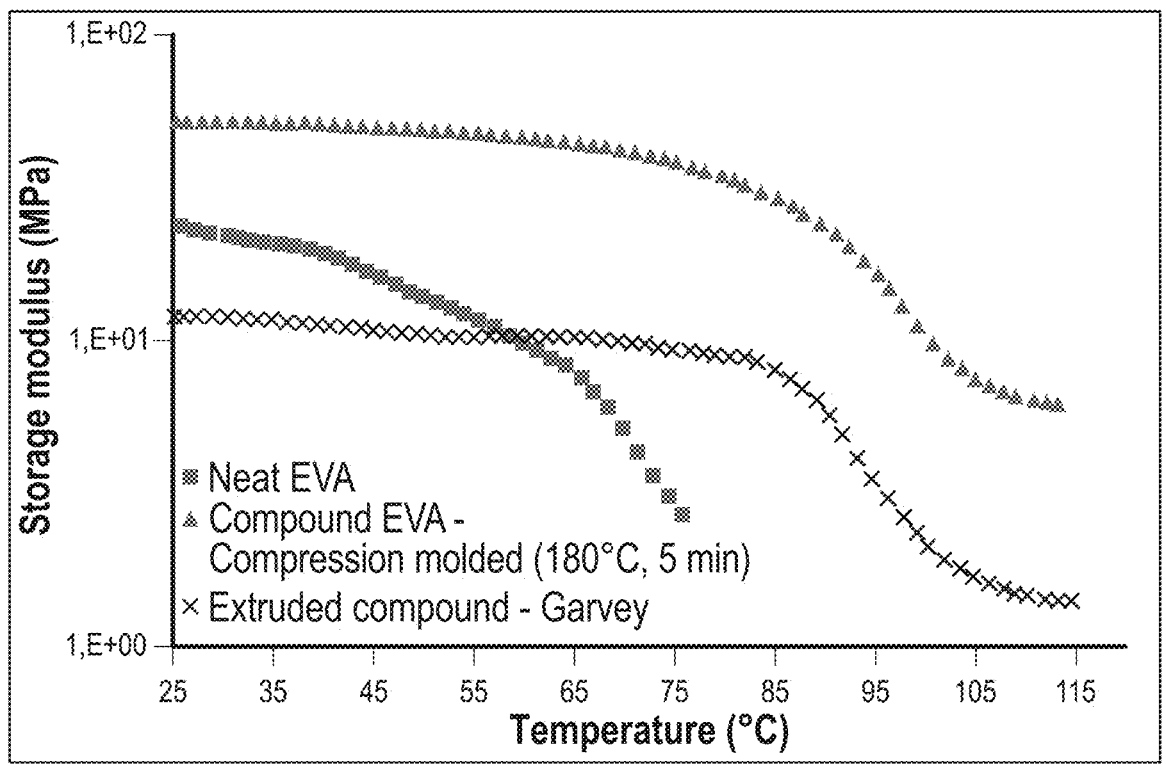
FIG. 23 shows comparing DMA data of extruded profile, crosslinked compound (compression molded) and neat EVA.

After that, good tapes were produced with the flat die with a thickness of approximately 1 mm, using a temperature profile ranging from 160 to 170° C., feeder speed of 600 and screw speeds of 10 and 20 rpm, both with good performance, but the aspect was better for 10 rpm—FIG. 22. The extruded tapes were evaluated through hardness (Shore A) and tensile. Hardness was evaluated with the parameters already described, meanwhile, for tensile tests were die cut and tested according to ASTM D412-16, type D. An EMIC universal testing machine was used, with crosshead speed of 500±50 mm/min, performing 5 tests in order to obtain an average and standard deviation. Results are displayed in Table 10, with values very comparable in terms of hardness. In addition, DMA was used to evaluate a sample cut from the Garvey die extruded sample—FIG. 23. One can see a very similar profile to what was observed from the compression molded sample of the compound, with the rubbery plateau, thus confirming that the sample was in fact crosslinked. The modulus values themselves were lower, however, it could be related to the precision of cutting with a razorblade a piece of the extruded part, where changes on thickness within the sample might have affected those values.

TABLE 10

| Properties | Tape-10 rpm | Tape-20 rpm |
|---|---|---|
| Hardness (Shore A) | 84.0 | 81.2 |
| Standard deviation | 0.4 | 0.5 |
| Stress at break (MPa) | 9.41 | 8.76 |
| Standard deviation | 0.14 | 0.51 |
| Strain at break (MPa) | 478 | 468 |
| Standard deviation | 18 | 14 |

Example 6: Effect of Crosslinker Type and Polymeric Composition

Crosslinked compositions (without fillers, oils, etc.) with the incremental replacement of the borate based crosslinker by a silane based crosslinker (TPOS—Tetrapropyl orthosilicate, Dynasilan P, 99.7 wt %, gently provided by Evonik Brasil Ltda.), being the replacement proportional to molecular weight and maintaining the ratio of 1 Si—O bond for ⅓ of the VA of an approximately 28 wt % VA polymer. The replacement was performed by making each of the crosslinkers ⅓, ⅔ and 3/3 of the system, while maintaining the Mo based catalyst at the same content. In addition, a lower VA EVA was tested (Braskem grade TN2005, nominal MFR of 0.5 g/10 min and VA % content of 13.5 wt %), with the same crosslinking system as in the reference Boron 5, and also, the combination of ⅔ Borate+⅓ Silane w/the Mo based catalyst. Formulations are displayed in Table 11. The processing parameters were the same as the applied for the other systems, and the processing outputs (approximate values) are displayed in Table 12.

The aspect of the compounds with silane crosslinking was increasingly worsened during processing, with embrittlement of the melt upon reaction (possibly due to the nature of the crosslinking), leading to lower reaction torques and temperatures (no temperature build-up by viscous dissipation for ⅔ Silane+⅓ Borate and only silane), and also, coloration of the melt changed (yellow stains). The behavior of the samples compounded with the base EVA TN2005 as very similar to what was observed for HM728.

TABLE 11

| Materials | ⅔ Borate + ⅓ Silane | | ⅓ Borate + ⅔ Silane | | Silane | | Borate X-Link system-Base EVA TN2005 | | ⅔ Borate + ⅓ Silane- Base EVA TN2005 | |
|---|---|---|---|---|---|---|---|---|---|---|
| | phr | wt % | phr | wt % | phr | wt % | phr | wt % | phr | wt % |
| EVA HM728 | 100.00 | 94.30 | 100.00 | 93.84 | 100.00 | 93.40 | — | — | — | — |
| EVA TN2005 | — | — | — | — | — | — | 100.00 | 94.80 | 100.00 | 94.30 |
| Molybdenum Catalyst | 0.24 | 0.23 | 0.24 | 0.23 | 0.24 | 0.22 | 0.24 | 0.23 | 0.24 | 0.23 |
| TEB | 3.52 | 3.32 | 1.76 | 1.65 | — | — | 5.25 | 4.98 | 3.52 | 3.32 |
| TPOS | 2.28 | 2.15 | 4.56 | 4.28 | 6.83 | 6.38 | — | — | 2.28 | 2.15 |
| Total | 106.04 | 100.00 | 106.56 | 100.00 | 107.07 | 100.00 | 105.49 | 100.00 | 106.04 | 100.00 |

TABLE 12

| Formulation | Final time (min) | Maximum temperature (° C.) | Maximum Torque (N · m) |
|---|---|---|---|
| ⅔ Borate + ⅓ Silane | 52.3 | 210 | 183 |
| ⅓ Borate + ⅔ Silane | 52 | 167 | 118 |
| Silane | 52 | 167 | 110 |
| Borate X-Link system-Base EVA TN2005 | 51.6 | 211 | 200 |
| ⅔ Borate + ⅓ Silane-Base EVA TN2005 | 50.8 | 215 | 225 |

Samples with mixed crosslinking system (borate and silane) and matrix characteristics (lower VA and lower MFR) were compression molded with the previously used conditions (180° C., 32 bar, 5 minutes, cooling rate of 15° C./min until 80° C.) and tested via DMA (compression mode, parameters already described) and stress relaxation in a rotational rheometer (oscillatory rheometer Anton Paar Model MCR 102, with parallel plates accessory of diameter of 25 mm, gap of 1-2.2 mm, constant temperature (120 and 180° C.) with a soak time of 20 minutes prior to testing, constant deformation of 1%, for a total time of ~10000 s, with a logarithmic capture of points—for normalized relaxation modulus, the selected relaxation modulus for $G_0$ was when deformation reached 1% (and measured stress reached maximum, so after this point it starts to decrease), which was around 0.05-0.2 seconds, depending on the sample and temperature)) and gel content upon exposure to boiling xylene (according to ASTM D2765-16, where the material is exposed to boiling xylene for 12 hours, followed by drying in vacuum oven until constant weight, where the ratio of residual material over the initial mass is determined as the gel, insoluble content—average reported from a duplicate).

Examples of compounds (addition of fillers and oil) made with the crosslinked system Boron 5 and other permanent crosslinking systems, using organic peroxides and sulfur, and blending with EPDM (Keltan® 6950, by Arlanxeo-Mooney Viscosity ML (1+4) @ 125° C. of 65 (ISO 289/ASTM D 1646), ethylene content of 46 wt % (ASTM D 3900), ENB content of 9 wt % (ASTM D 6047), according to manufacturer technical datasheet) can be seen in table 13 and 14. EPDM was mixed with specific crosslinking systems—based on both peroxide and sulfur, sulfur donors and accelerators (Table 13)—in dispersion step in a roll mill at 50° C., and then, it was fed to the mixing chamber for compounding the final formulation (Table 14), which also happened in two steps, with the feeding sequence protocols and screw speed as for the compound of example 4. The first step on the mixing chamber was performed with a set temperature of 100-150° C. for 13-15 minutes at 30 rpm. After that, it was re-fed in the mixing chamber for improved dispersion, mixing from 5-8 minutes, with a set temperature of 60-120° C. Torque increase could be observed only on the sample EPDM Blend (Peroxide), in the second processing, at temperatures higher than 120° C., possibly due to crosslinking promoted by the organic peroxide. Other than that, for the samples "Mixed system (Peroxide)" and "EPDM Blend (Sulfur)" processing went smoothly, similar to what was observed for the compound in example 4, where a sheet could be laminated at 80° C. after the second processing operation. This could be attributed to the fact that sulfur should selectively crosslink the EPDM (which should be the dispersed phase in an EVA matrix) and the sample "Mixed system (Peroxide)" has a much lower amount of peroxide compared to "EPDM Blend (Peroxide)".

TABLE 13

| Materials | EPDM pre-mixture (Sulfur) | | EPDM pre-mixture (Peroxide) | |
|---|---|---|---|---|
| | phr | wt % | phr | wt % |
| EPDM-Keltan 6950 | 100.00 | 90.99 | 100.00 | 85.84 |
| Zinc oxide | 5.00 | 4.55 | — | — |
| Stearic acid | 1.00 | 0.91 | — | — |
| Sulfur | 0.50 | 0.45 | — | — |
| TMTD (80 wt %) | 1.90 | 1.73 | — | — |
| DTDM | 1.50 | 1.36 | — | — |
| Luperox 802G | — | — | 11.00 | 9.44 |
| Rhenofit TAC (70 wt %) | — | — | 5.50 | 4.72 |
| Total | 109.90 | 100.00 | 116.50 | 100.00 |

TABLE 14

| Materials | Mixed system (Peroxide) | | EPDM Blend (Sulfur) | | EPDM Blend (Peroxide) | |
|---|---|---|---|---|---|---|
| | phr | wt % | phr | wt % | phr | wt % |
| Crosslinked composition (Boron 5) | 100.00 | 46.29 | 75.00 | 34.88 | 75.00 | 34.88 |
| EPDM pre-mixture (Sulfur) | — | — | 25.00 | 11.63 | — | — |
| EPDM pre-mixture (Peroxide) | — | — | — | — | 25.00 | 11.63 |
| TOTM | 25.00 | 11.57 | 25.00 | 11.63 | 25.00 | 11.63 |
| Calcium Carbonate | 70.00 | 32.40 | 70.00 | 32.56 | 70.00 | 32.56 |
| Carbon black (N550) | 20.00 | 9.26 | 20.00 | 9.30 | 20.00 | 9.30 |
| Luperox 802G | 0.70 | 0.32 | — | — | — | — |
| TAC 70 | 0.35 | 0.16 | — | — | — | — |
| Total | 216.05 | 100.00 | 215.00 | 100.00 | 215.00 | 100.00 |

Those compositions were then compression molded at 180° C., with controlled cooling (15° C./min) until 80° C., for two different times—5 minutes and t90+2 min. In order determine a guideline curing time for the compound (t90), the pre-dispersed the EPDM compositions were evaluated through RPA (rubber process analyzer), Alpha 2, at 180° C. for 15 minutes, according to ASTM D5289-17. For the system with sulfur, t90=5.22 minutes, with a maximum torque of ~14 dN·m. Meanwhile, for peroxide, t90=6.03 min, with maximum torque ~45 dN·m. Thus, molding times of ~7'12" and 8' respectively, were used. The sample with the compound based in the composition Boron 5 (Reference) and peroxide was compression molded for 5 minutes.

The compression molded samples were then tested for DMA (temperature sweep, 20-135° C., conditions already described), stress relaxation at 120 and 180° C. (conditions already described).

Figure 24:
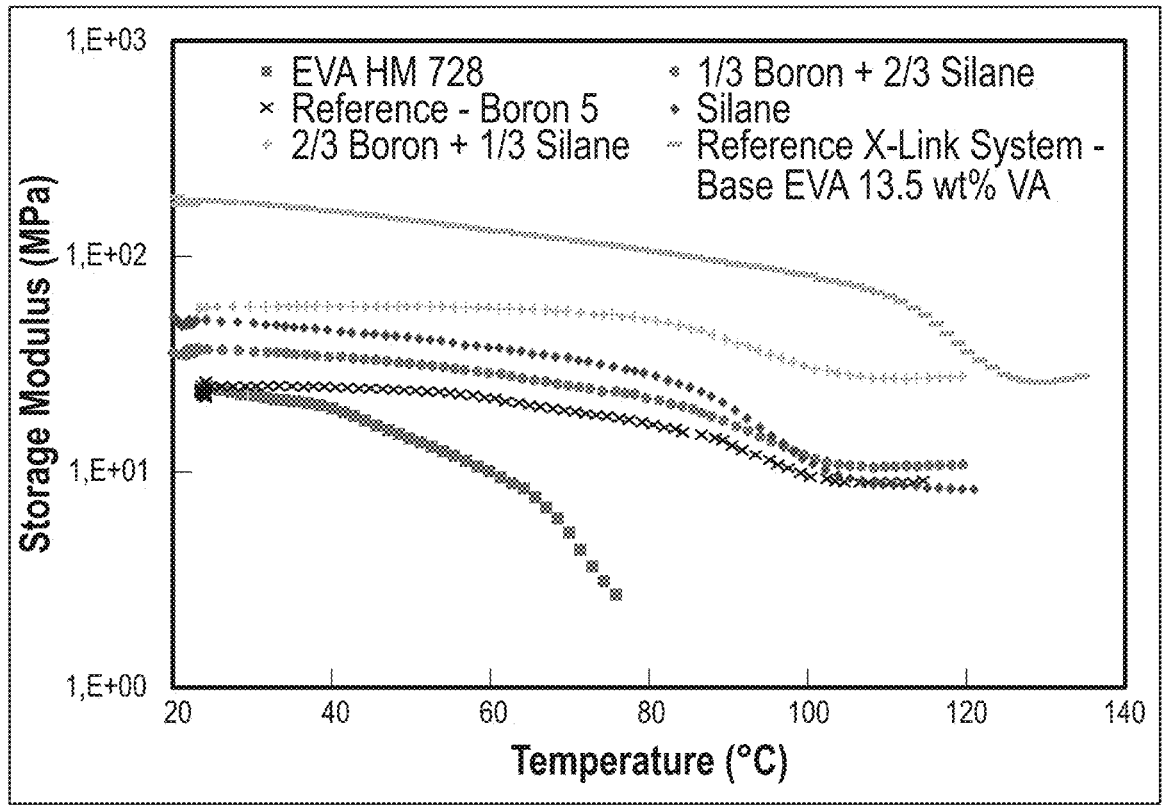
FIG. 24 shows DMA data of mixed curing systems (borate and silane) and with a different matrix (lower VA content).

For samples using Silane as a crosslinker (without fillers and oils), the DMA plot (FIG. 24) displays similar behavior in terms of the shape of the curve, however, with higher storage modulus compared to the reference sample (Boron 5), where the sample with ⅔ Boron+⅓ Silane presented the highest modulus. As expected, the sample with the matrix of TN2005 presented much higher storage modulus, a higher softening point (steep decrease on DMA, possible related to crystalline fraction softening/melting) compared to samples based on EVA HM728. In addition the use of a ⅓ of Silane+⅔ Borate was enough to get over 70% gel content for the formulation, with a slightly increase for the sample with only Silane, as seen in Table 15. Samples with only Borate crosslinking led to 0% gel content on boiling xylene.

TABLE 15

| Gel content | ⅔ Borate + ⅓ Silane | Silane |
|---|---|---|
| wt % | 71.4 | 73.5 |
| Standard deviation | 2.6 | 0.2 |

Figure 25:
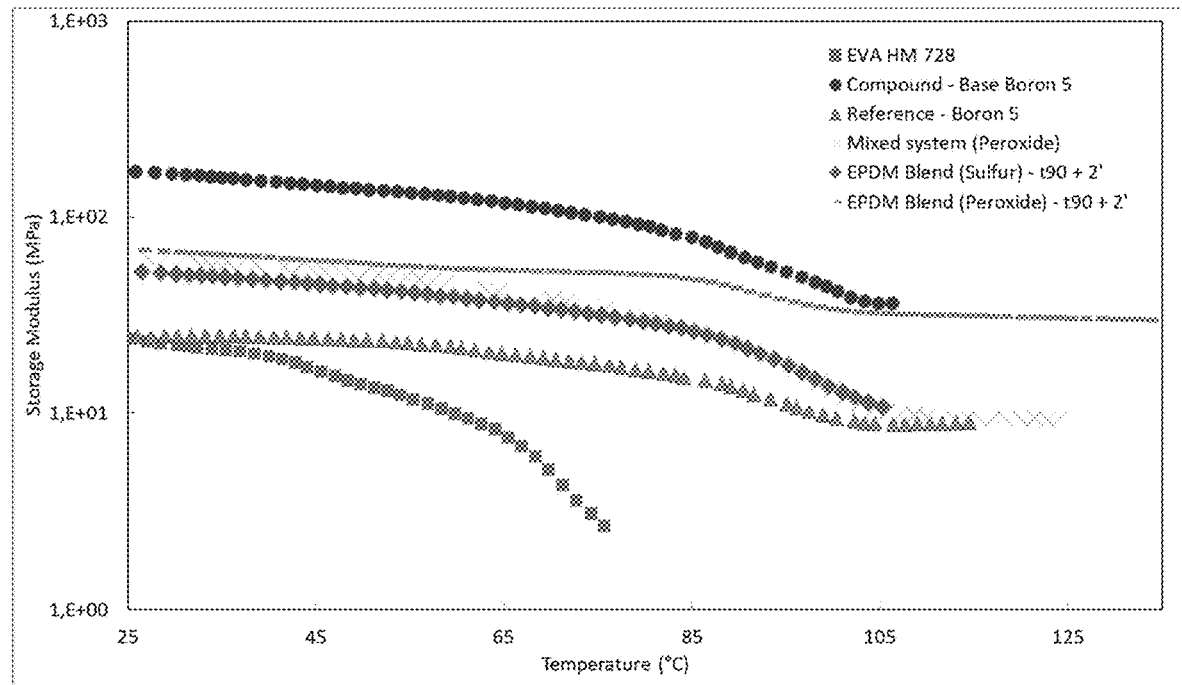
FIG. 25 shows DMA data of samples containing a mixed curing system (Crosslinked compound Boron 5+Peroxide), blending with EPDM and other curing systems (sulfur and peroxide).

All compounds blended with EPDM and permanent crosslinking system displayed improved thermomechanical stability compared to neat EVA (FIG. 25), with much higher storage at temperatures up to 100° C. and well-formed rubbery plateaus (except for EPDM Blend (Sulfur)) and lower storage modulus than the compound based on Boron 5, which was expected, especially due to the addition of EPDM.

Figure 26:
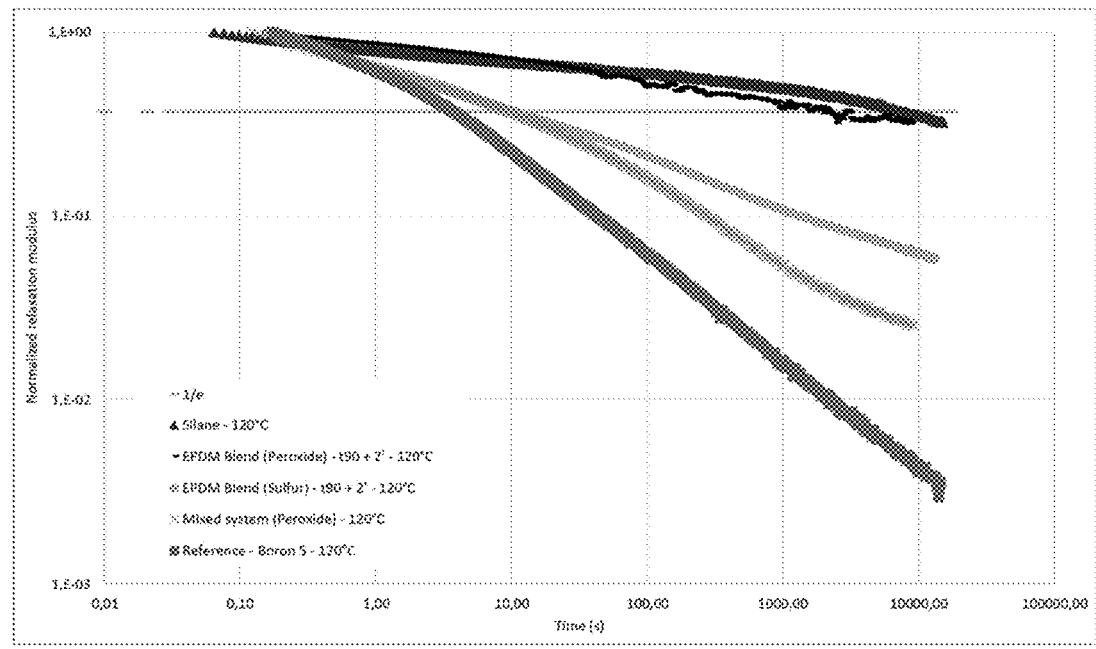
FIGS. 26-27 show stress relaxation plots of the aforementioned samples.
Figure 27:
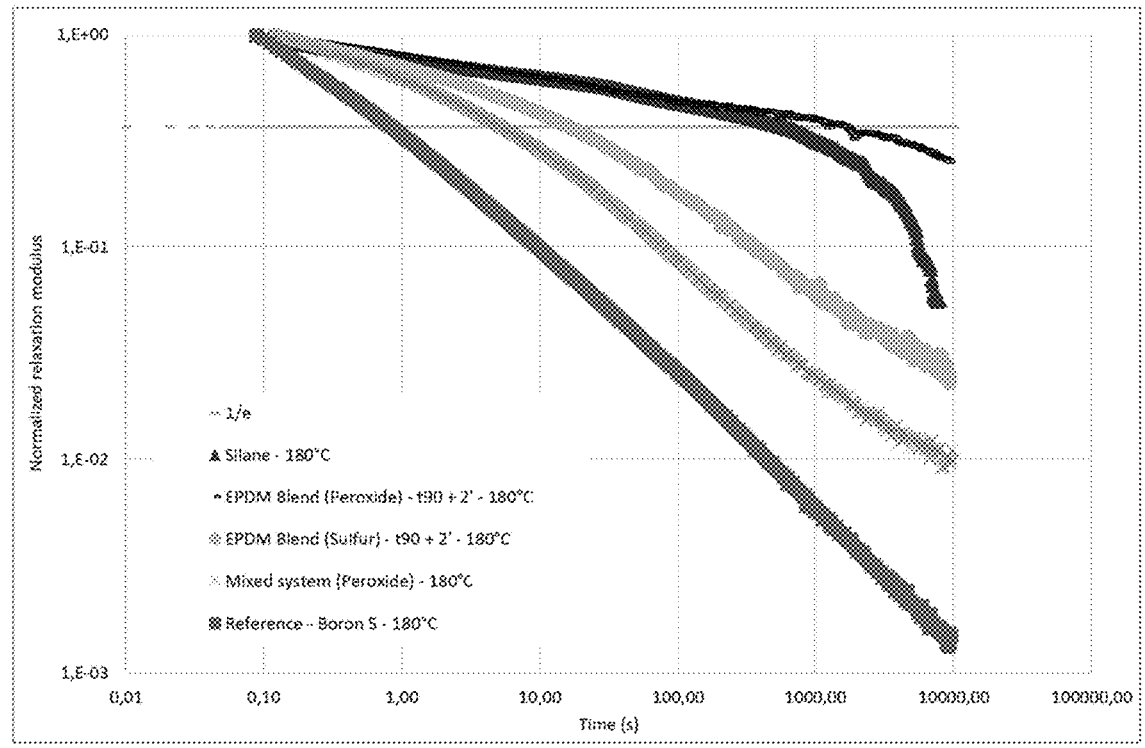
Figure 28:
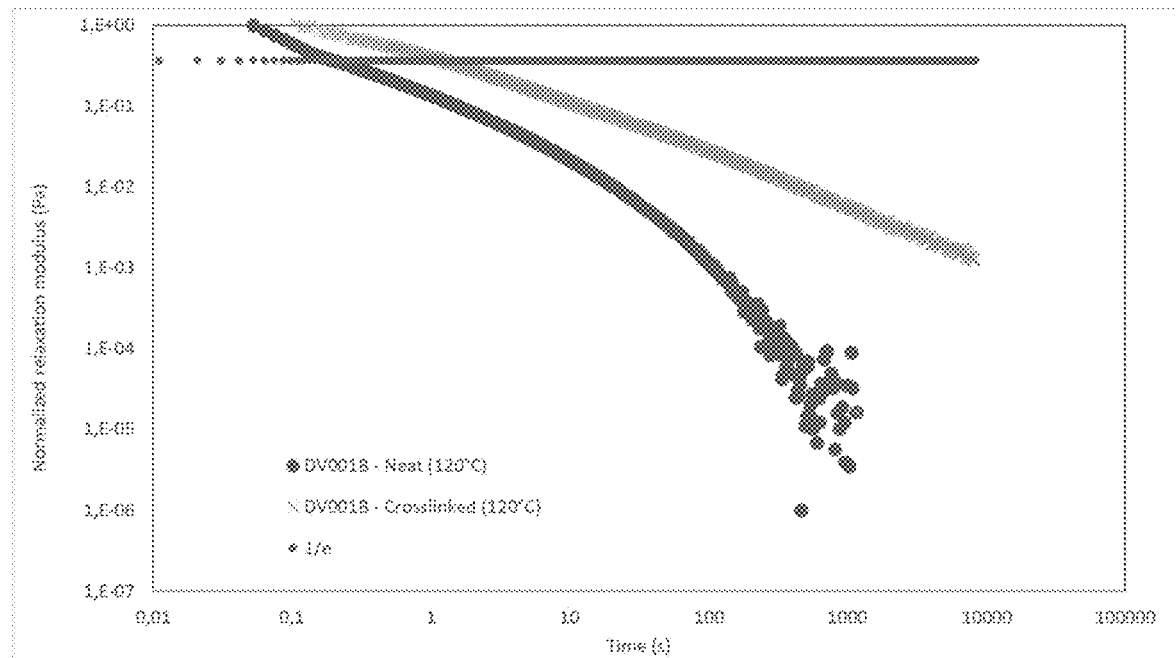
FIGS. 28-29 show stress relaxation plots of neat DV001B and dynamically crosslinked DVOO1B.
Figure 29:
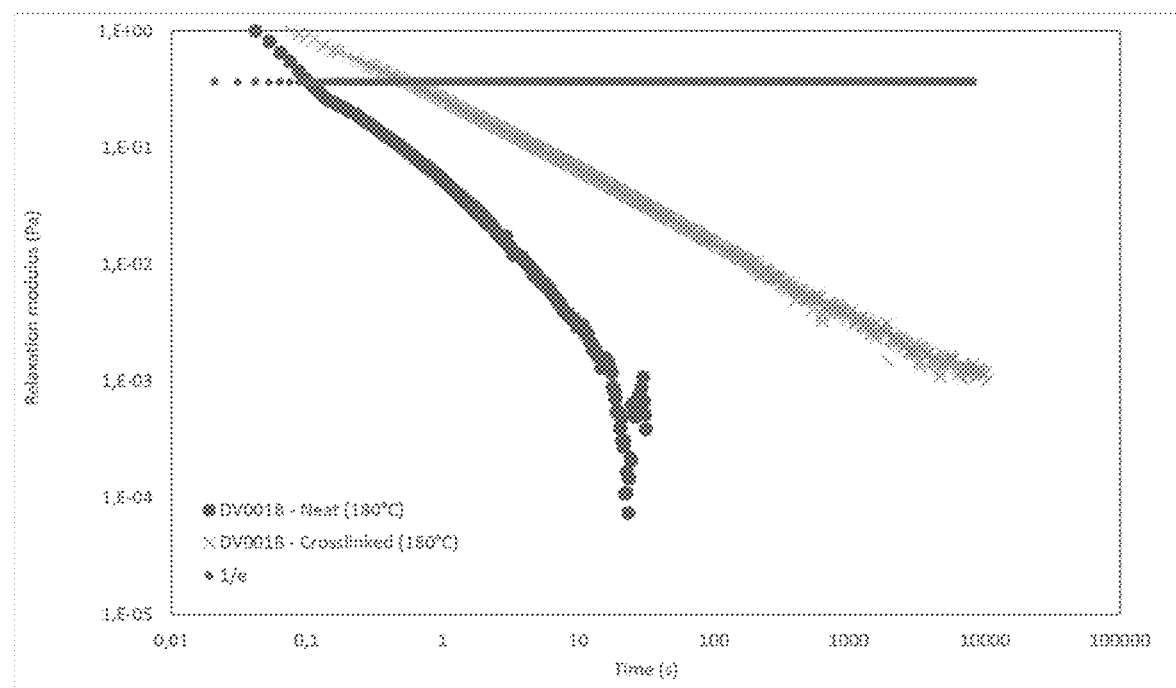
Figure 30:
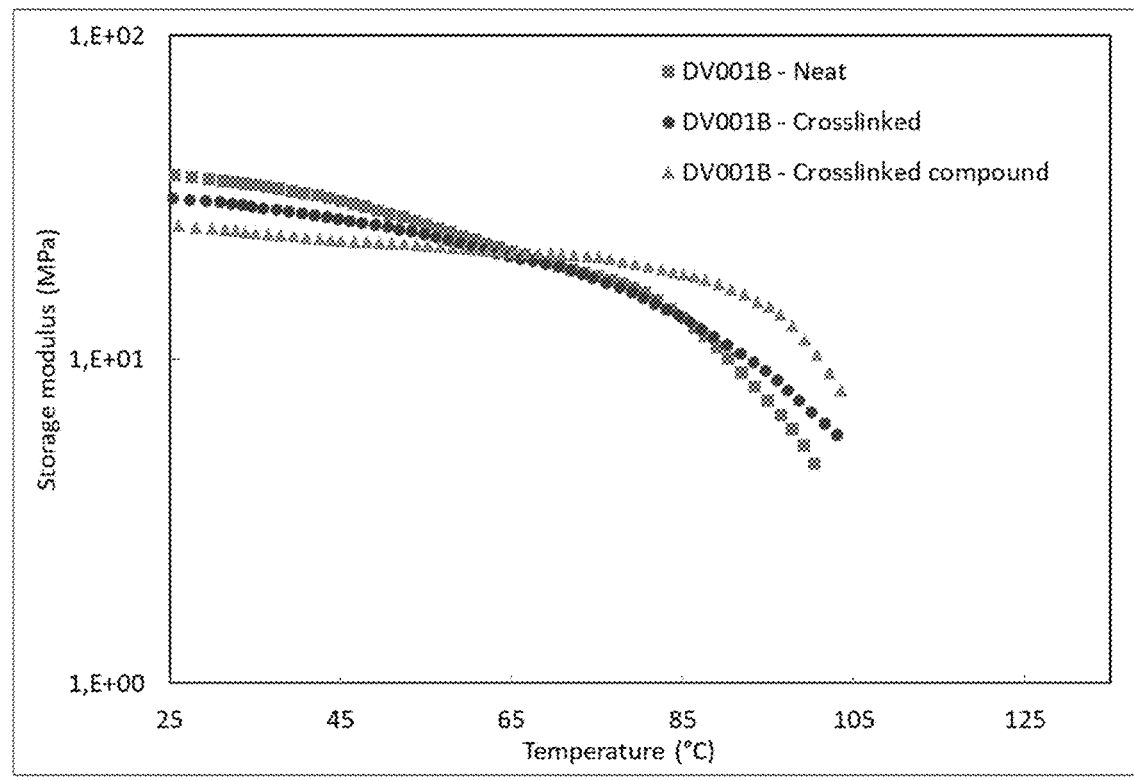
FIG. 30 shows DMA data of the aforementioned samples and a compound made of crosslinked DVOO1B.
Figure 31:
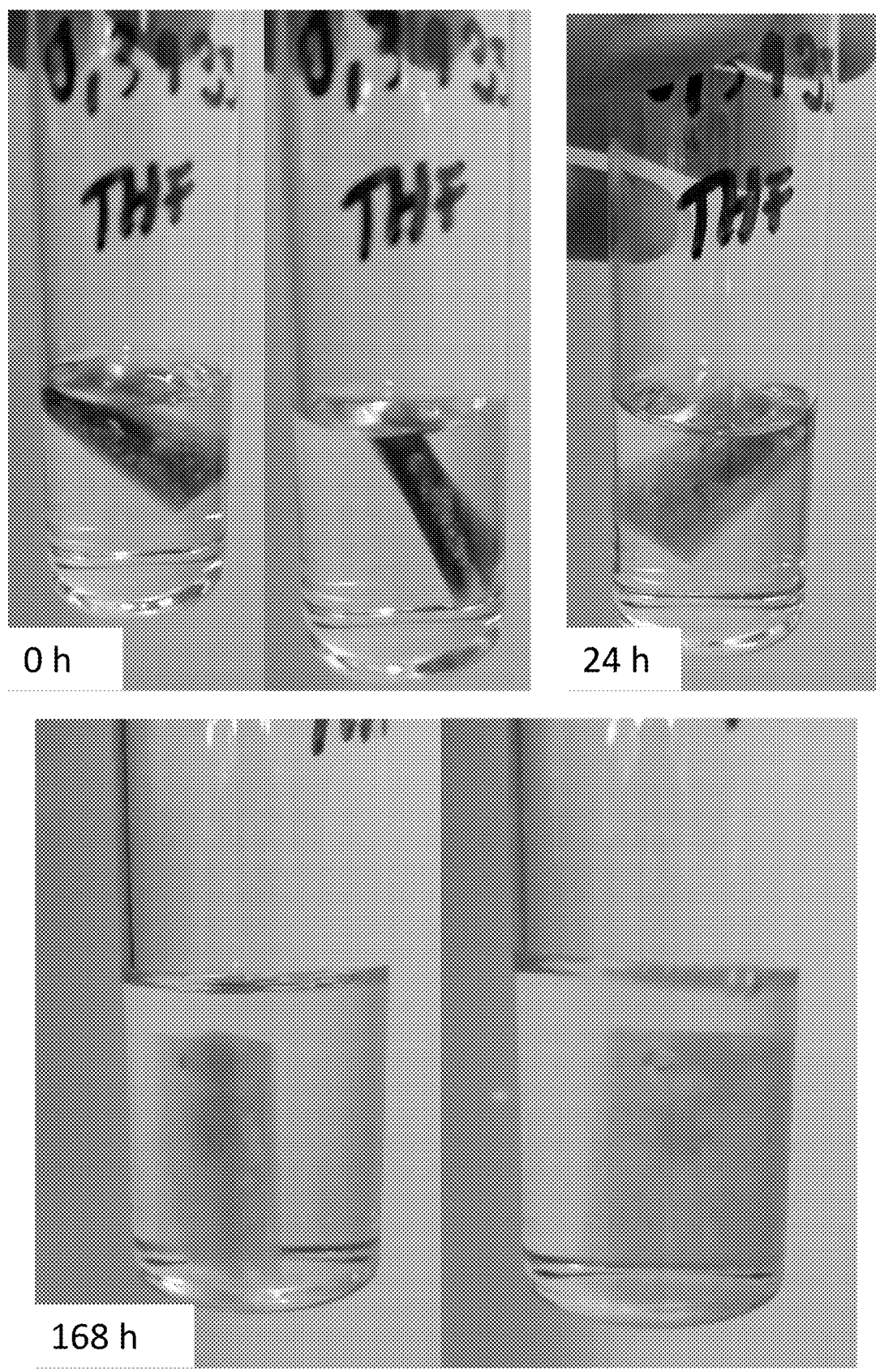
FIG. 31 shows solvent resistance (room temperature THF) of the crosslinked compound made with DVOO1B.

As expected, and despite the difference of samples with and without fillers and oil, it is possible to notice an intense slowing down of overall relaxation kinetics for all samples containing permanent crosslinking agents for 120 and 180° C., as seen in FIGS. 26 and 27, where the silane led to the larger relaxation times at 120° C., and the system with EPDM and peroxide to the larger relaxation times at 180° C. This is mainly attributed to the nature of the crosslinking reaction.

Example 7: Ethylene—VA—VeoVA Terpolymer as Matrix

A composition using an ethylene—vinyl acetate and vinyl neodecanoate (VeoVA™10) was tested, using the same formulation (in terms of content of polymer, crosslinker and catalyst—TEB and Mo Catalyst—, fillers, oil, etc.) as for the samples Boron 5 and compound based on Boron 5.

Terpolymer samples coded as DV001B was produced in a high-pressure industrial asset that normally operates producing EVA copolymers. DV001B is a terpolymer comprising 9.3 wt. % VeoVA™10 and 24.1 wt. % of vinyl acetate (the remainder being ethylene) and a MFR of 5.2 g/10 min. The general reactor conditions to the production of the terpolymers are described in Table 16.

TABLE 16

| Parameter | DV001A | DV001B |
|---|---|---|
| Pressure reactor 1 (kgf/cm$^2$) | 1820-1840 | 1820-1840 |
| Temperatures reactor 1 (average) (° C.) | 164.5 | 164.5 |
| Pressure reactor 2 (kgf/cm$^2$) | 1780-1800 | 1770-1790 |
| Temperatures reactor 2 (average) (° C.) | 161.7 | 163.7 |
| Production rate (kg/h)* | 6000 | 6000 |
| VA feed rate (kg/h) | 2850-3200 | 2400 |
| Ethylene feed rate (kg/h) | 4270 | 4300 |
| VeoVa feed rate (kg/h) | 800-900 | 1650 |

*Difference in feed rate sum and production rate due to condensation of the comonomers and their low pressure recycle gas/liquid compressor separator. The condensed VeoVa was not reinjected. Part of unreacted VeoVa remains soluble in the polymer, being removed in a further step of air purge at the sylos.

Evidence of incorporation of the branched vinyl ester and vinyl acetate is seen in both the carbonyl(170-180 ppm) and alkyl regions (0-50 ppm) of the 13C NMR spectra (TCE-D2, 393.1 K, 125 MHz). 1 H NMR spectra (TCE-D2, 393.2 K, 500 MHz) exhibit peaks for vinyl acetate and branched vinyl ester (4.7-5.2 ppm) and ethylene (1.2-1.5 ppm) as well as additional peaks in the alkyl region (0.5-1.5 ppm) indicative of the long alkyl chains on the branched vinyl ester monomers. Relative intensity of the peaks found in 1 H NMR and 13C NMR spectra are used to calculate monomer incorporation of branched vinyl ester and vinyl acetate in the co-/terpolymers DV001B was mixed with the components displayed in Table 17 in a mixing chamber (Haake™, roller rotors), with a fill factor of 80%, initial set temperature of 80° C., rotor speed of 40 rpm, where the DV001B and catalyst were first fed and mixed. After complete melt/mixing (~15 minutes), TEB was added. After ~10 minutes of mixture of TEB with the other components, set temperature was raised to the desired temperature (145-155° C.)—overall, almost identical protocol and composition compared to Boron 5. The same amount of TEB was used, and considering that DV001B contains 24.1 wt % of VA, one could expect the same (or at least a similar) crosslinking density as Boron 5 (made with HM728) or the sample made with TN2005. In addition, as VeoVA™10 is a vinyl ester, one could also expect that it would participate in the exchange reactions—even though steric hindrance might play a role in terms of changing reaction kinetics compared to vinyl acetate. Reaction temperature reached 211.8° C. at 65.5 minutes, a very similar condition to what happened during the processing of the sample Boron 5. However, max torque was slightly lower (150 N·m vs ~190 N·m for Boron 5).

TABLE 17

| Component | phr | Wt % |
|---|---|---|
| DV001B | 100.00 | 94.79 |
| TEB | 5.25 | 4.98 |
| Molybdenum catalyst | 0.24 | 0.23 |
| Total | 105.49 | 100 |

Compounds with the aforementioned crosslinked compositions were produced via mixing chamber (Haake™, roller rotors), followed by roll mill lamination. The compound formulation tested is displayed in Table 18.

The compound was processed with a fill factor of 70%, where a first mixing step with set temperature of 80° C., 30 rpm, for ~18 minutes was performed. The premixture was laminated in a roll mill at 60° C., then re-fed in the mixing chamber and reprocessed for improved dispersion with a set temperature of 160° C., 30 rpm for ~5 minutes. After that, the compound was laminated at 60° C. in a roll mill (thickness ~2 mm). The mixing conditions, feeding sequence, torque and temperature graphs are displayed in table 19. Overall, good processability and aspect of compound was obtained, and a sheet could be easily laminated.

TABLE 18

| Material | Amount, phr | Wt % |
|---|---|---|
| DV001B-Crosslinked | 100.0 | 45.5 |
| TOTM (Tris (2-Ethylhexyl) Trimellitate) | 20.0 | 9.1 |
| Calcium Carbonate | 80.0 | 36.4 |
| Carbon black N550 | 20.0 | 9.1 |
| Total | 220.0 | 100.0 |

TABLE 19

| Step | Mixing chamber setting | Time (cumulative) (min) | Feeding order/action |
|---|---|---|---|
| 1 | 80° C. 30 rpm | 0.3 | Feed-⅓ of crosslinked composition |
| | | 1.5 | Feed-⅓ of crosslinked composition |
| | | 3.5 | Feed-⅓ of crosslinked composition |
| | | 6.2 | Carbon black |
| | | 8.6 | ⅓ CaCO₃ + ½ TOTM |
| | | 10.1 | ⅓ CaCO3 |
| | | 12.8 | ⅓ CaCO3 + ½ de TOTM |
| | | 14.5 | Cleaning step |
| | | 16.2 | Cleaning step |
| | | 17.9 | Discharge |
| 2 | 160° C. 30 rpm | 0.31 | ⅓ of compound |
| | | 1.2 | ⅓ of compound |
| | | 1.7 | ⅓ of compound |
| | | 5.2 | Discharge |

The neat polymer (DV001B—Neat), the crosslinked composition—w/o fillers and oil (DV001B—Crosslinked), and the compound (DV001B—Compound) were characterized via Hardness (Shore A), DSC (based on ASTM D3418-21-1st heating from 25 to 200° C., cooling from 200 to −90° C., and 2nd heating from −90 to 200° C., both cooling and heating rates of 10° C./min)), SAGS rheometry (stress relaxation—conditions already described, and characteristic relaxation time ($\tau$–time to $G=G_0/e$) were calculated with data extrapolation around Normalized G close to 0,3679), DMA (temperature sweep —25-140° C.—conditions already described), solvent resistance (THF—room temperature) and tensile test, following the same conditions and using the same equipment previously reported in the examples (2 mm thickness, ASTM D412-16, type D, using a EMIC universal testing machine was used, with crosshead speed of 500±50 mm/min, performing 5 tests in order to obtain an average and standard deviation). Results in Tables 20-22 and FIGS. 28-31.

It is possible to notice that processing conditions and outputs, thermal properties (decreasing Tc, Tm2 and fusion enthalpy, and increasing Tg), tensile properties, Hardness and solvent resistance are very comparable to what was observed to Boron 5. On the other hand, DV001B crosslinked composition presented faster characteristic relaxation time (T), and it could not withstand higher temperatures w/o losing mechanical integrity, thus, not forming a proper rubbery plateau on DMA analysis. This could be related to slower reaction kinetics/steric hindrance due to the larger VeoVA™10, which might affect crosslinking density and/or relaxation kinetics.

TABLE 20

| | DV001B-Neat | | | DV001B-Crosslinked | | |
|---|---|---|---|---|---|---|
| Properties | 1st heating | Cooling | 2nd heating | 1st heating | Cooling | 2nd heating |
| $T_m$ (° C.) | 56 and 73 | — | 75.0 | 44 and 73 | — | 66.0 |
| $\Delta H_m$ (J/g) | 44.5 | — | 26.1 | 45.3 | — | 21.2 |
| Xc (%) | 15.5 | — | 9.1 | 15.83 | — | 7.42 |
| $T_c$ (° C.) | — | 50.0 | 50.0 | — | 42.0 | 42.0 |
| $\Delta H_m$ (J/g) | — | 27.3 | 27.3 | — | 32.5 | 34.3 |
| $T_g$ (° C.) | — | — | −36.0 | — | — | −30.0 |

TABLE 21

| Properties | DV001B-Neat | DV001B-Crosslinked | DV001B-Compound |
|---|---|---|---|
| Hardness (Shore A) | 77.1 | 81.2 | 88.1 |
| Hardness (Shore A)-SD | 0.5 | 0.3 | 0.3 |
| Stress at break (MPa) | — | — | 7.33 |
| Stress at break (MPa)-SD | — | — | 0.22 |
| Strain at break (%) | — | — | 570.5 |
| Strain at break (%)-SD | — | — | 57.6 |

TABLE 22

| Sample | $\tau$ (120° C.) (s) | $\tau$ (180° C.) (s) |
|---|---|---|
| DV001B-Neat | 0.20 | 0.11 |
| DV001B-Crosslinked | 1.21 | 0.54 |

Example 8: Epoxy Chemistry Crosslinking

The investigation of a crosslinking route with the potential of being reversible, was performed using a model polymer containing the epoxy function (Lotader AX8900—ethylene, methyl acrylate (MA), glycidyl methacrylate (GMA) terpolymer) using diethylene glycol (DEG) as a crosslinker and 1,5,7-Triazabicyclo[4.4.0]dec-5-ene (TBD) as a catalyst, where diethylene glycol undergoes transesterification reaction with the epoxide moieties.

Lotader AX8900 (MA—24 wt %, GMA—8 wt %, 6 MFR) was mixed with the aforementioned components in a mixing chamber (Haake™, roller rotors), with the formulation disclosed in Table 23. For samples 2 and 3, an initial set temperature of 130° C. was used, where Lotader was initially fed and melted. After complete melting (~3 minutes), DEG was added. After ~5 minutes of mixture of Lotader and DEG, TBD was added to the system. For Epoxy 2, shear increased temperature of the system up to 152° C., where reaction was performed for an extra 10 minutes. For Epoxy 3, the same feeding protocol, mixing time and set temperature was used, however, final temperature due to shear, was ~143° C. A noticeable increase in torque was observed during processing for both samples.

Alternatively, a sample with identical formulation as Epoxy 3, named Epoxy 6 was produced, however, the thermal cycle was less intense, with a set temperature of 120° C. and 50 rpm, and a shorter mixing time, resulting in a final temperature of 127° C. at 12 minutes. Lastly, a sample with an alternative cure system (m-xylylenediamine) was used, without any catalyst. For this sample (Epoxy 7), with a set temperature of 100° C. and 40 rpm, after complete melting of Lotader (~4 mins), m-xylylenediamine was fed and mixed for approximately 5 minutes, and the temperature raised up to 110° C. For samples Epoxy 6 and 7, the torque in the mixing chamber did not change after stabilization during mixing, indicating the absence of reaction.

TABLE 23

| Component | Epoxy 2 (phr) | Epoxy 3 (phr) | Epoxy 6 (phr) | Epoxy 7 (phr) |
|---|---|---|---|---|
| Lotader ® AX 8900 | 100.00 | 100.00 | 100.00 | 100 |
| DEG | 2.96 | 5.93 | 5.93 | — |
| TBD | 0.15 | 0.30 | 0.30 | — |
| m-xylylenediamine | — | — | — | 3.81 |
| Total | 103.11 | 106.23 | 106.23 | 103.81 |

Characterizations to evaluate crosslinking were performed in a Rubber Process Analyzer (RPA) RPA 2000 from Alpha Technologies according to ASTM D 5289-17—arc 0,5°, 180 and 200° C., frequency of 100 cpm, 60 minutes), and in a parallel plate oscillatory rheometer Anton Paar Model MCR 102 (frequency sweep: diameter of 25 mm, gap from 1-3.7 mm—thickness of the laminated sheet, 200° C., amplitude of 7%, 1 to 100 rad/s; time sweep: diameter of 25 mm, gap up to 2.6 mm—thickness of the laminated sheet, 60 minutes, 200° C., frequency of 1.67 Hz, amplitude of 7%), solvent resistance experiment (THF, room temperature, up to 168 h; and boiling xylene following ASTM D2765-16, 12 hours, remaining weight after vacuum oven drying determine the gel content) and dynamic mechanical analysis (DMA—compression mode, temperature sweep—from 30 to 100° C., heating rate of 5° C./min, static load of −8N, frequency of 1 Hz, deformation of 10 microns). These are compared to "Neat EVA". In solvent resistance, samples after different thermal cycles were evaluated (note: lamination performed at low temperatures (50° C.)).

RPA demonstrate crosslinking in all samples. Crosslinking for Epoxy 2 and 3 (200° C., as seen in FIG. 32), demonstrate that the torque increase (and therefore, crosslinking density) was proportional to the amount of crosslinker (Epoxy 3>Epoxy 2).

Figure 32:
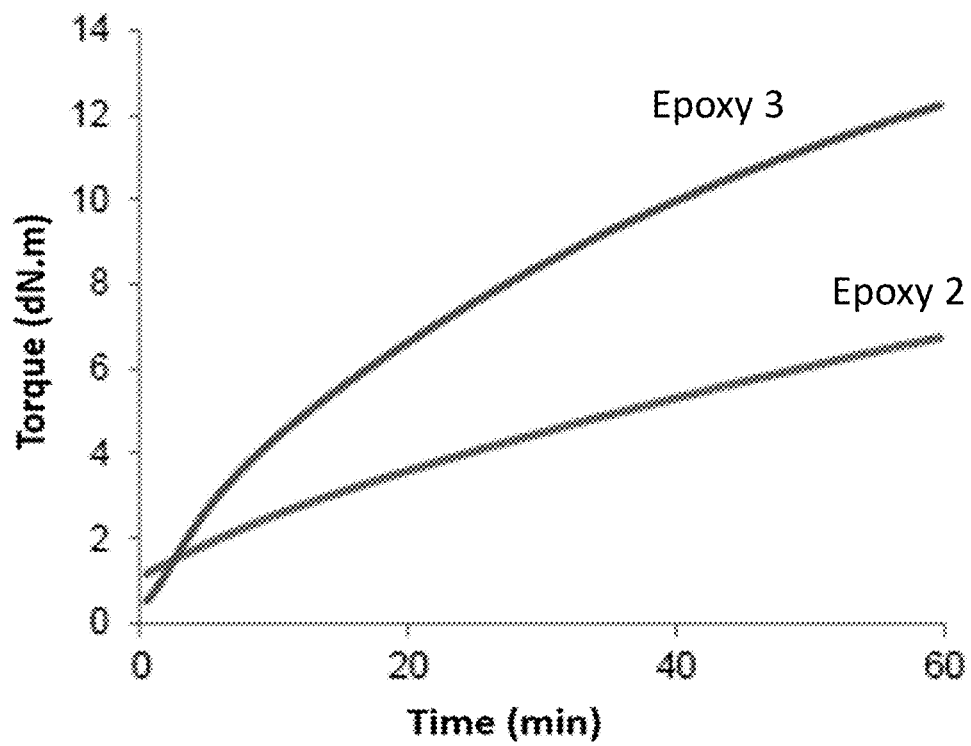
FIGS. 32-34 show rubber process analyzer results.
Figure 33:
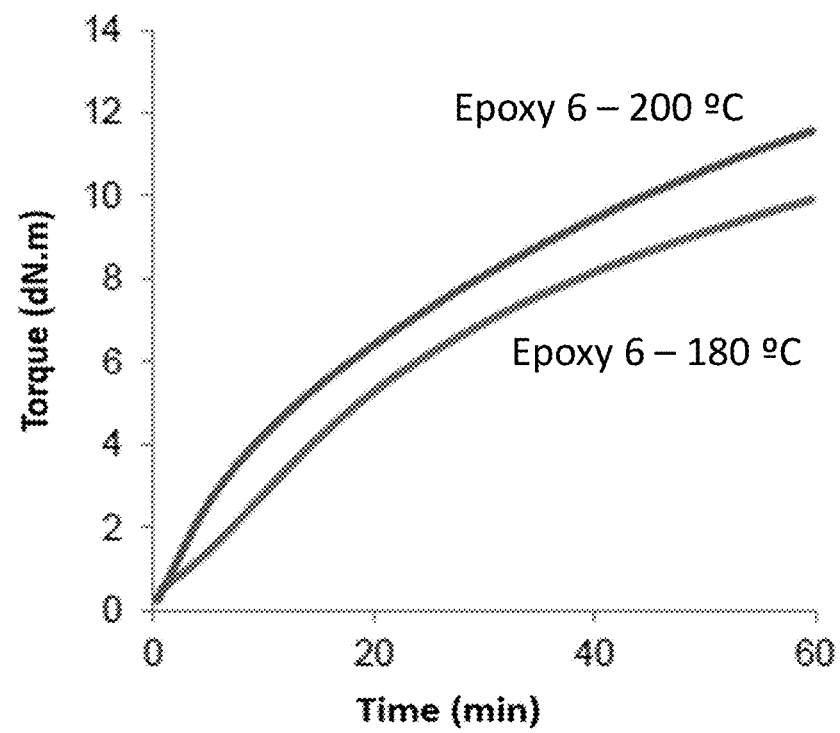
Figure 34:
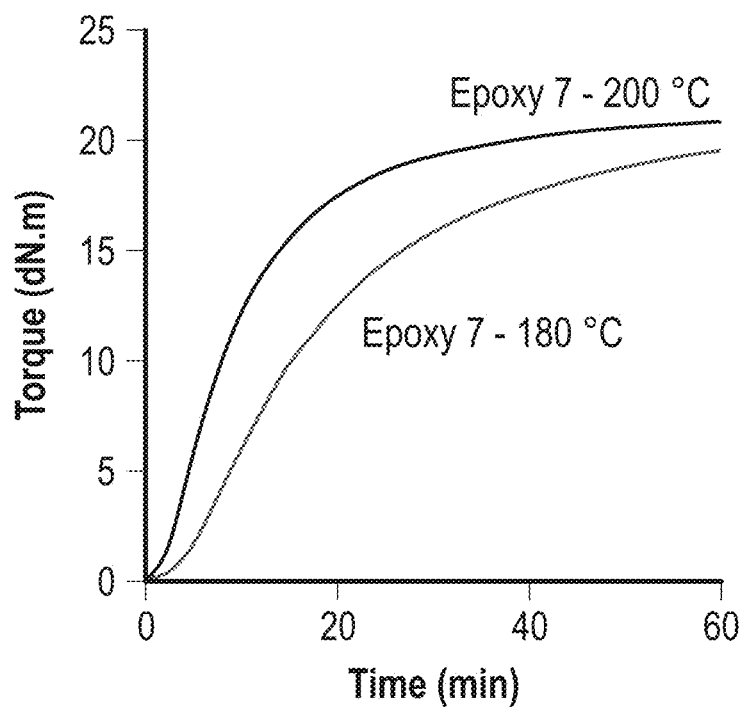
Figure 35:
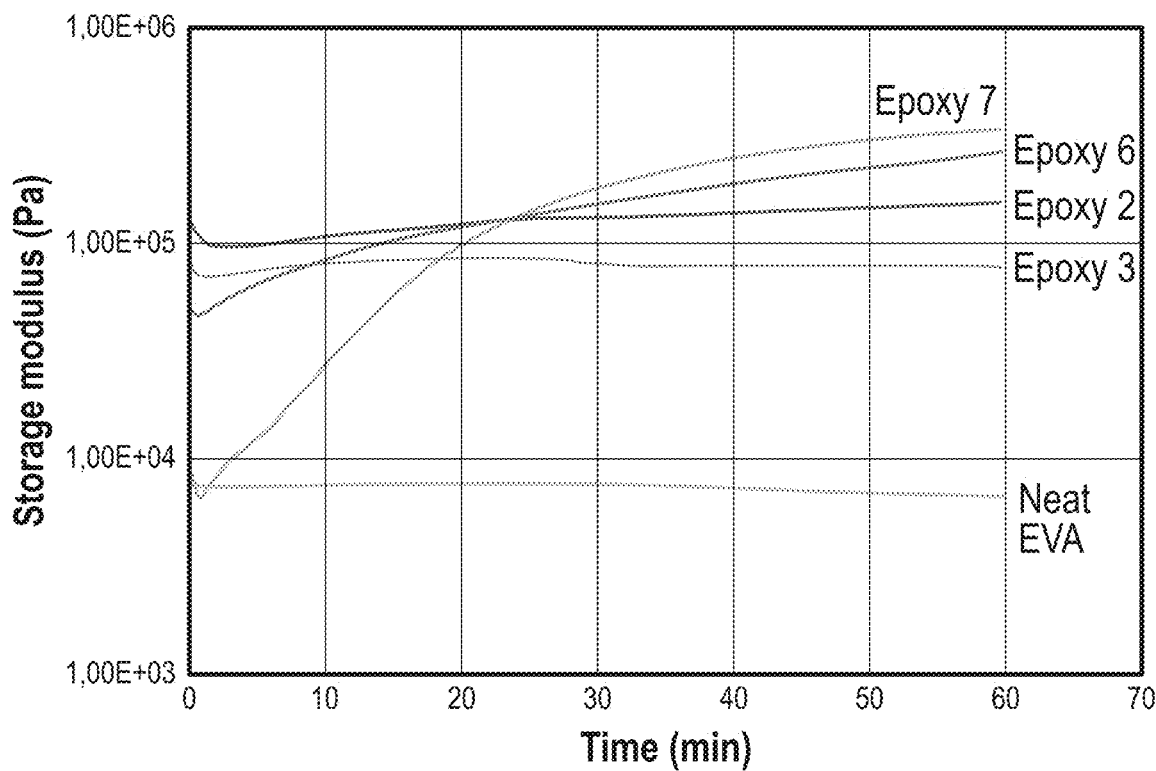
FIGS. 35-41 show a comparison of tested samples for time and frequency sweep in parallel plate shear rheometry.
Figure 36:
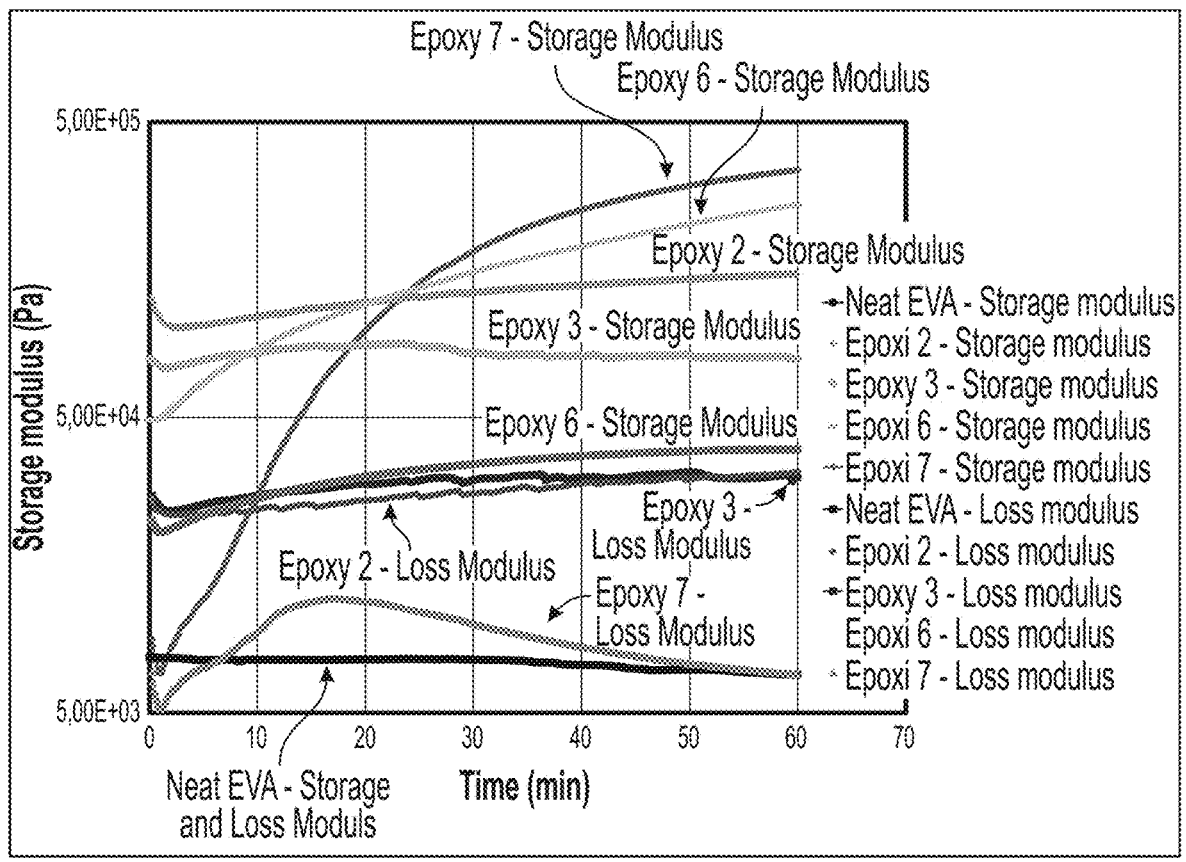
Figure 37:
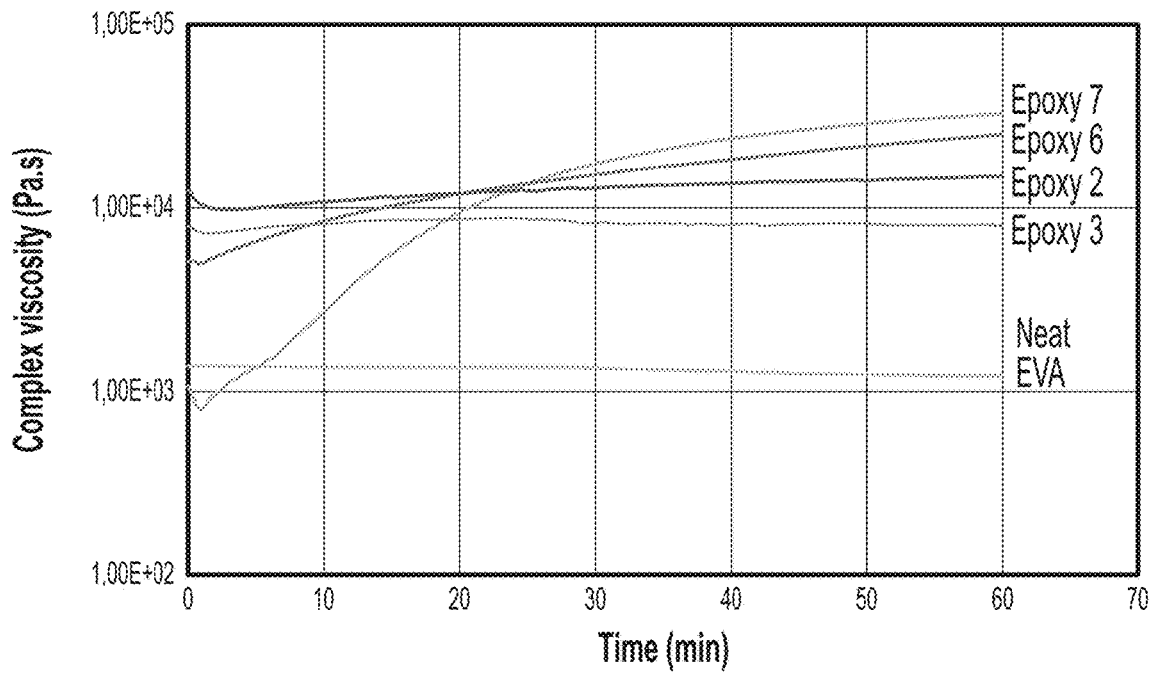
Figure 38:
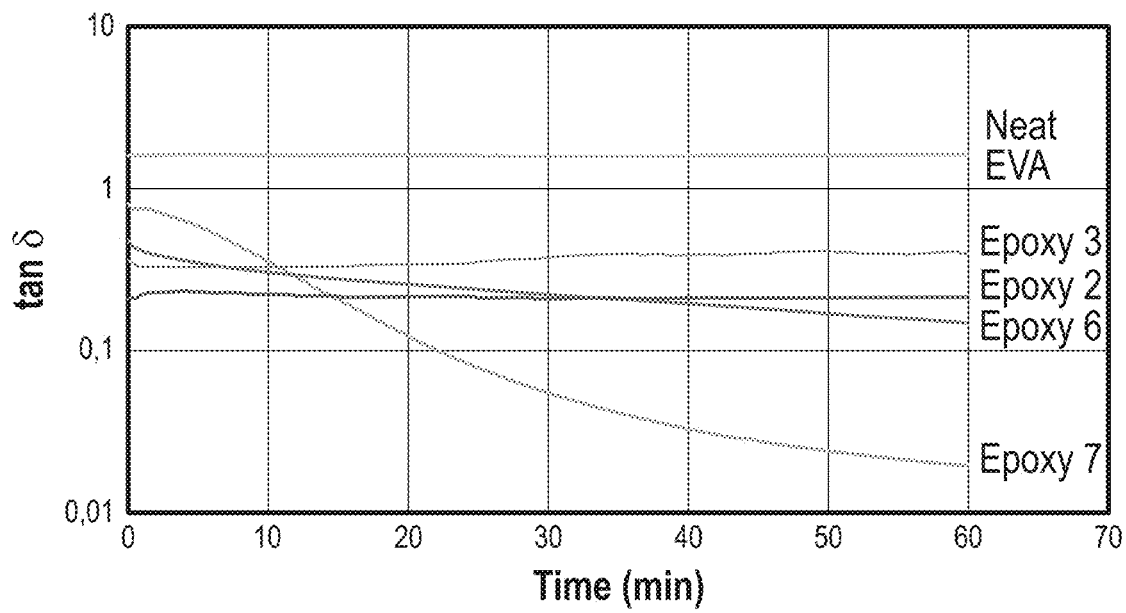

In addition, despite "only mixing" materials, with no torque increase during mixing operation for Epoxy 6, shown in FIG. 33, when compared to Epoxy 2 and 3 in FIG. 32, the reaction kinetics seem similar when evaluating through RPA, with a similar Delta Torque, both for 180° C. and 200° C. Lastly, the crosslinking system containing diamine and no catalyst, which was basically unreacted in the mixing chamber—Epoxy 7—displayed an even faster crosslinking kinetics and intensity (by delta torque) when compared to Epoxy 6, as seen in FIG. 34.

FIGS. 36-41 demonstrate the comparison of all tested samples for time and frequency sweep in parallel plate shear rheometry. Time sweeps (shown in FIGS. 35-38) demonstrate that samples Epoxy 2, 3 and 6 start in a much higher viscosity, storage modulus and elasticity levels then a non-crosslinked polymer (compared with neat EVA). Besides, all crosslinked samples start the test after gel point (G'>G", or tan δ<1). Possibly, this happened to samples not previously crosslinked was the soak time in the equipment at a high temperature, which could start the reaction prior to the test. Unreacted samples displayed the more intense chance in modulus, while epoxy 7, with the most intense cure capability as seen through RPA, also displayed the highest increase in modulus, viscosity and elasticity (i.e. decreasing tan δ).

Figure 39:
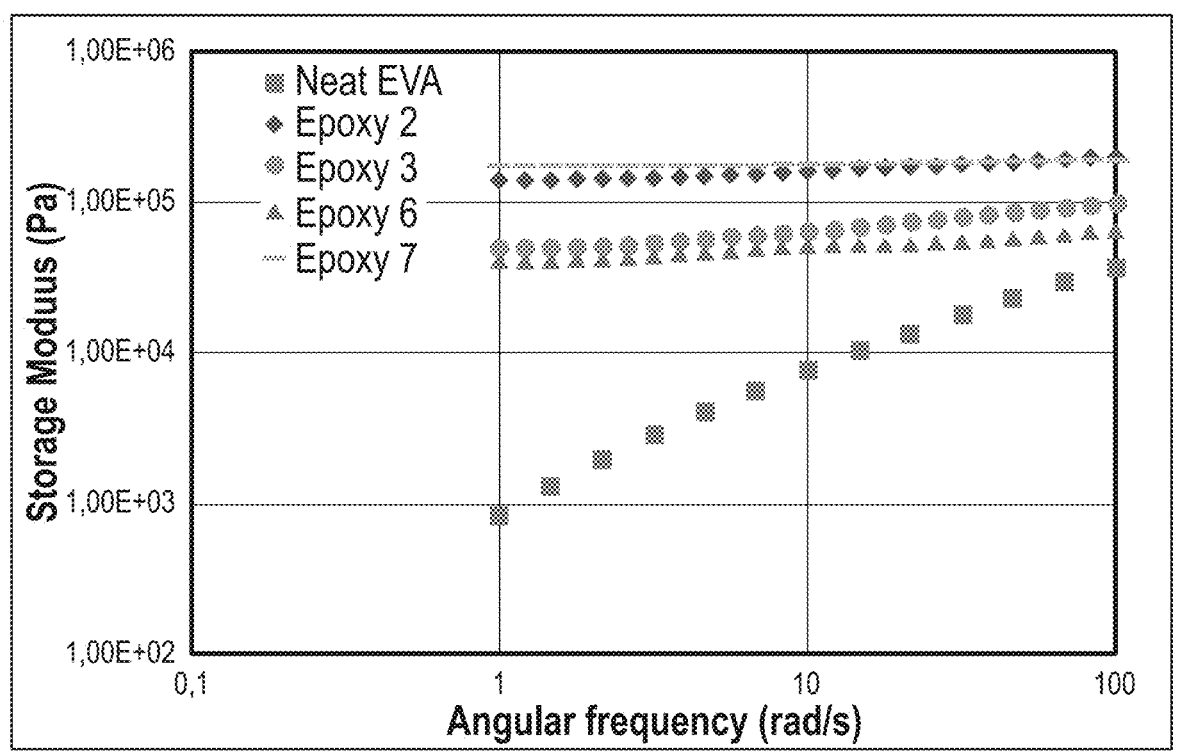
Figure 40:
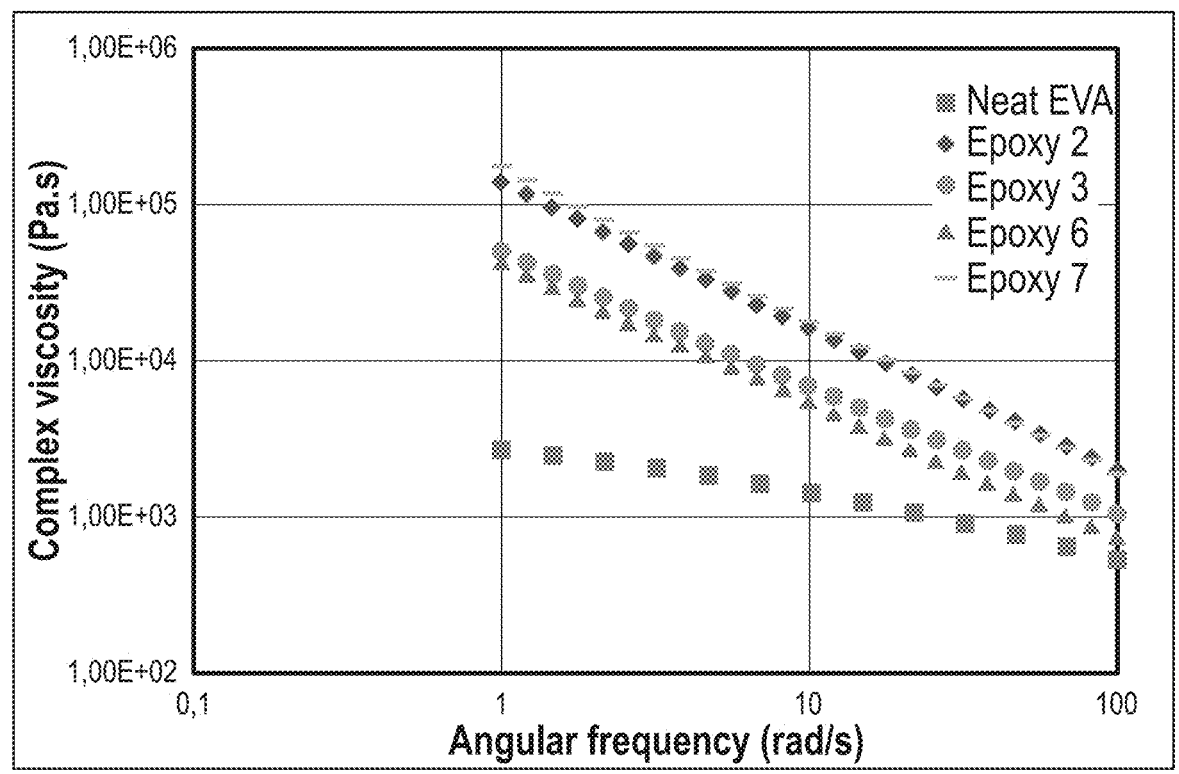
Figure 41:
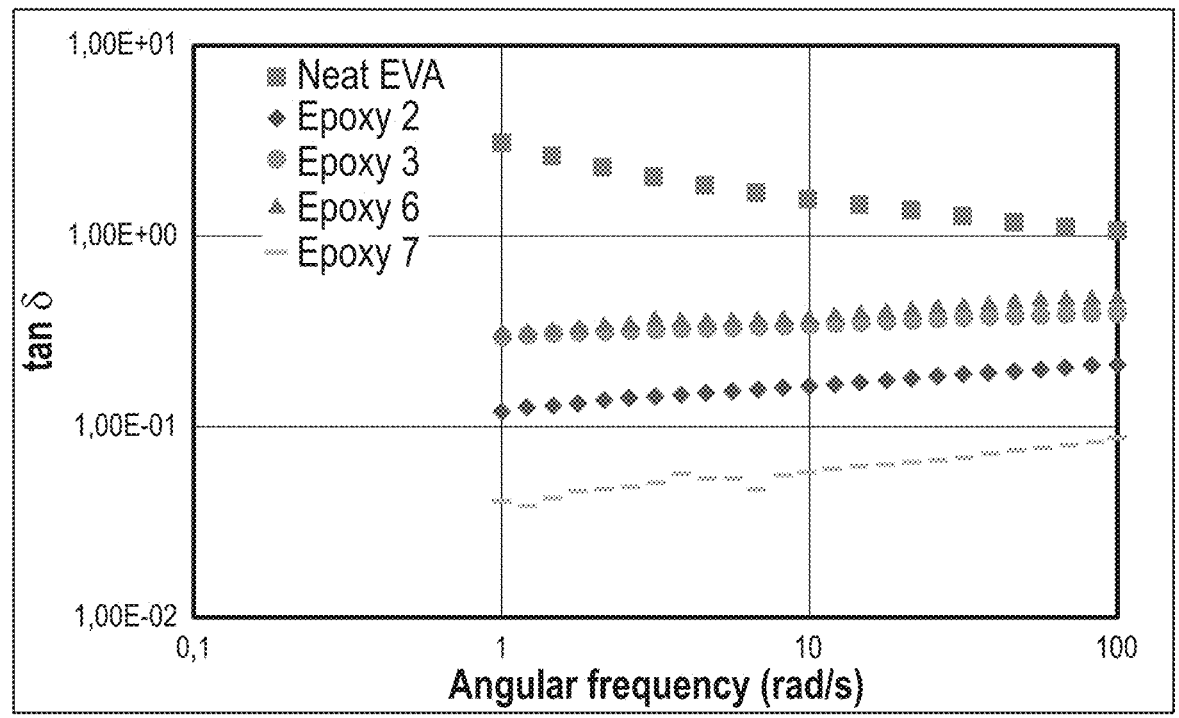

Similar behavior was observed in the frequency sweep, shown in FIGS. 39-41. A strong increase for storage modulus and complex viscosity (and decrease for tan δ) for the whole frequency range was detected for all samples, indicating an increase in molecular weight (crosslinking). Possibly, because of previous thermal cycle—and efficiency of the crosslinking system—the observed trend indicates the higher increase for Epoxy 7 (diamine)>Epoxy 2>Epoxy 3>Epoxy 2.

The gel content results after boiling xylene exposure are displayed in Table 24. Higher crosslinker content upon similar thermal cycles (e.g. Epoxy 2 vs Epoxy 3 and 6) generally led to higher gel content, and more severe thermal cycle in the press also led to higher gel contents (see sample names—time and temperature of compression molding). Besides, the most efficient crosslinking system, as seen through rheology—Epoxy 7—displayed the highest gel contents. The gel content found for the samples are all comparable (if not higher) than typical peroxide crosslinked EVAs (measured—95%). Similarly, THF resistance (room temperature) for all samples led to only swelling in the 168 hours timeframe, as seen for the previous example.

TABLE 24

| Sample-Preparation | Gel content (wt %) |
|---|---|
| EVA + Peroxide reference (HM728 + 0.8 phr DCP-Compression molding-175° C., 15 minutes) | 95 |
| EPOXY 2-after lamination | 75 |
| EPOXY 2-compression molding-120° C., 15 minutes | 80 |
| EPOXY 2-compression molding-200° C., 5 minutes | 85 |
| EPOXY 2-compression molding-200° C., 5 minutes + Oven (200° C., 1 hour) | 93 |
| EPOXY 3-after lamination | 70 |
| EPOXY 3-compression molding-200° C., 5 minutes | 91 |
| EPOXY 6-compression molding-200° C., 5 minutes | 90 |
| EPOXY 6-compression molding-200° C., 30 minutes | 97 |
| EPOXY 6-compression molding-110° C., 5 minutes + Oven (200° C., 1 hour) | 97 |
| EPOXY 7-compression molding-200° C., 5 minutes | 98 |
| EPOXY 7-compression molding-200° C., 30 minutes | 99 |
| EPOXY 7-compression molding-110° C., 5 minutes + Oven (200° C., 1 hour) | 98 |

Figure 42:
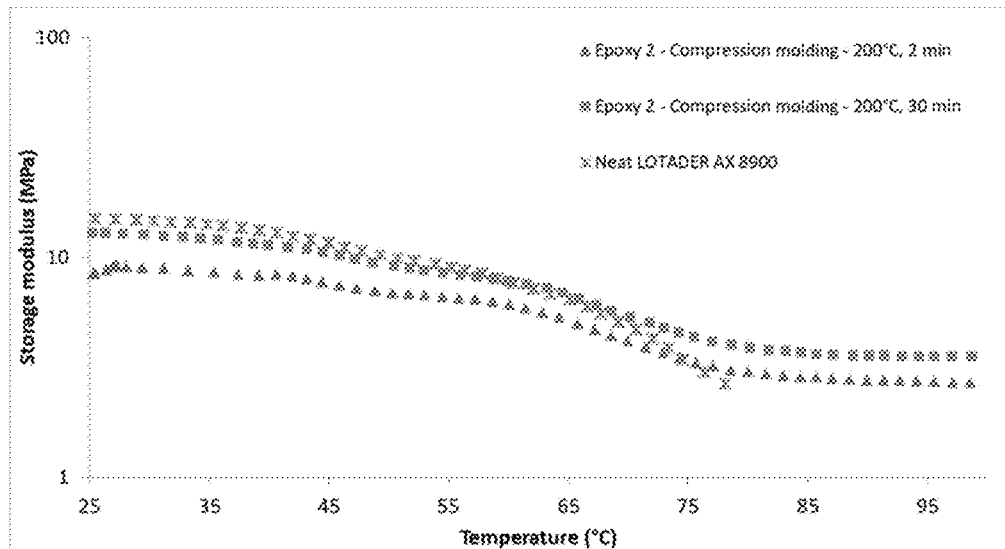
FIGS. 42-43 show DMA testing results.
Figure 43:
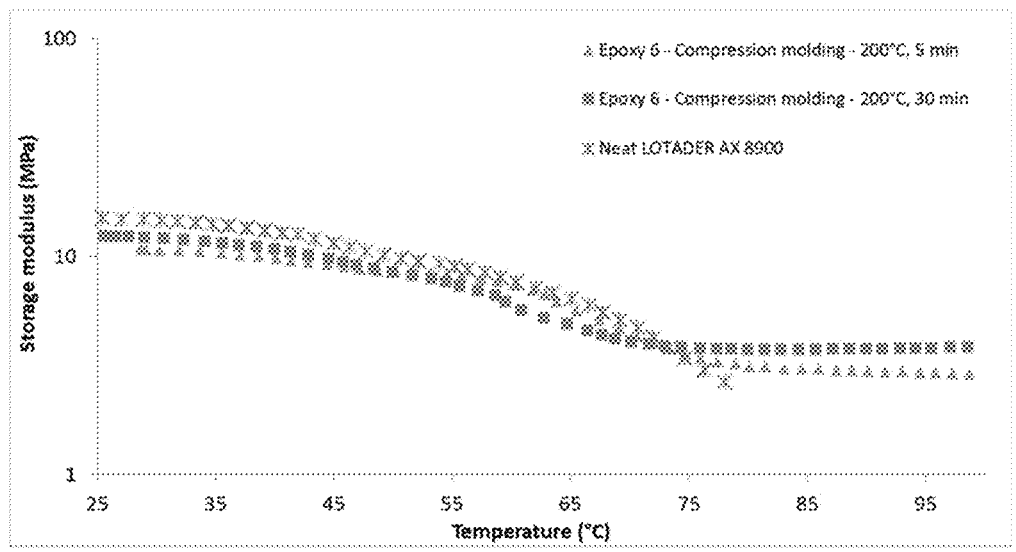

DMA results, shown in FIGS. 42 and 43, display a behavior which is very similar to what is seen in peroxide cure (in FIG. 11), with a well-defined rubbery plateau, up to 100° C. (maximum temperature in which the equipment could reliably measure deformation prior to softening) for samples (Epoxy 2 and 6) at both short (2 and 5, respectively) and longer (30 minutes) molding times (at 200° C.). The trend in terms of plateau modulus follow the same trend as the gel content (the higher the gel content, the higher the plateau modulus).

Figure 44:
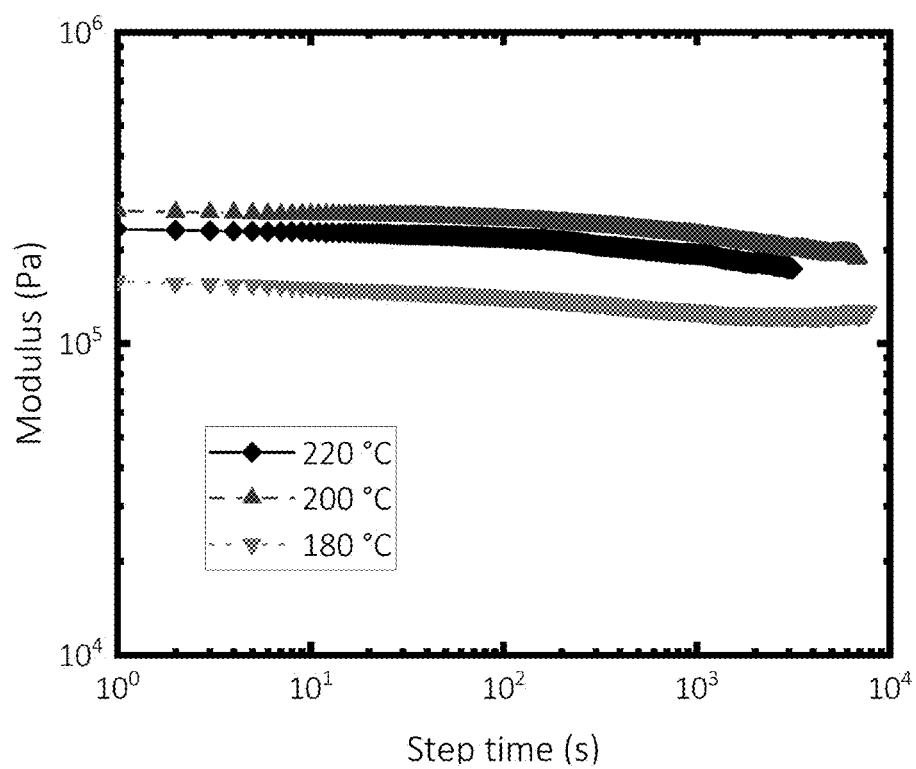
FIGS. 44-45 show the results of stress relaxation experiments.
Figure 45:
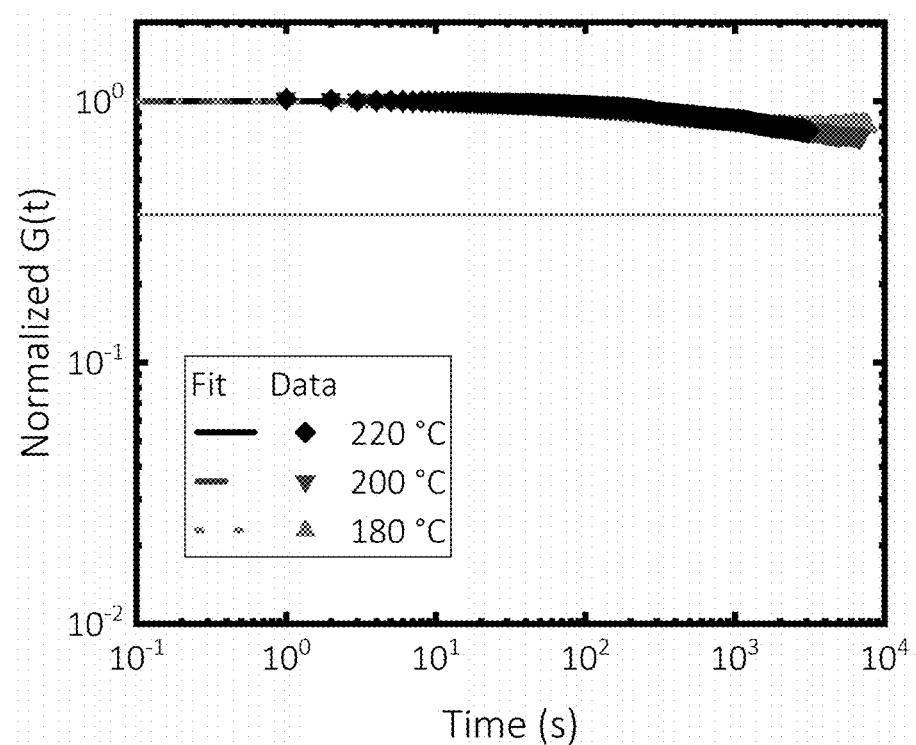

In addition, a stress relaxation experiment in the sample Epoxy 2 was performed in an oscillatory shear rheometer Ares G2, with a parallel plate accessory, diameter of 25 mm, gap of 1.3-1.9 mm, Axial force of 10 N, soak time of 10 minutes, deformation of 1%, and temperatures of 180, 200 and 220° C. The samples were prepared via compression molding, at 180° C., for 2-3 minutes. The results are shown in FIGS. 44 and 45. A full relaxation was not observed in the time frame of the test (10000 s) for all temperatures. The value for calculating normalized relaxation modulus was obtained via exponential decay fits to the data. The relaxation modulus corresponds to the fit at t=0 s, which is also referred to as $G_0$. A normalized relaxation modulus of 70-80% was reached for 180, 200 and 220° C., without a clear differentiation for relaxation for the tested temperatures, with a similar decrease kinetics.

In terms of crosslinking in presence of atmospheric oxygen (oven), upon the evaluation in the previously described tissue paper test, samples Epoxy 2, 3, 6 and 7 have not presented surface tackiness, as shown in FIGS. 46A and B. Besides, no melting was observed after oven crosslinking, indicating an efficient crosslinking degree. DMA and rheology results corroborate this result. Unlike the Boron example, for the Epoxy samples, the difference in cure capacity/intensity was not so pronounced comparing samples with and without crosslinking in the mixing chamber.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A polymeric composition comprising:
    a thermoplastic polymer comprising:
        monomer units of a vinyl ester and a $C_2$-$C_{12}$ olefin, wherein the thermoplastic polymer comprises not more than 40 wt % of monomer units of the vinyl ester; and
        a dynamic crosslinking group; and
    a dynamic crosslinking system comprising a crosslinking agent and a catalyst, to dynamically crosslink the thermoplastic polymer,
    wherein the dynamic crosslinking agent comprises a boron-comprising compound,
    wherein the dynamic catalyst comprises molybdenum or tin, and
    wherein the polymeric composition is non-foamed composition.

2. The polymeric composition of claim 1, wherein the dynamic crosslinking group is selected from the group consisting of esters, epoxides, organic acids, alcohols, anhydrides, amines, amides, cyanates, unsaturated hydrocarbons and combinations thereof.

3. The polymeric composition of claim 1, wherein monomer units of the vinyl ester comprise the dynamic crosslinking group.

4. The polymeric composition of claim 1, wherein the thermoplastic polymer comprises not more than 30 wt % of monomer units of the vinyl ester.

5. The polymeric composition of claim 1, wherein the dynamic crosslinking agent further comprises at least one member selected from the group consisting of silanes, diamines, diols, diacids, dianhydrides, diepoxides, diisocyanates, and combinations thereof.

6. The polymeric composition of claim 1, wherein the catalyst further comprises at least one member selected from the group consisting of Zinc, Copper, Magnesium, Sodium, Potassium, Calcium, Nickel, Lithium, Titanium, Zirconium, Aluminum, Lead, Iron, and Vanadium.

7. The polymeric composition of claim 1, wherein the catalyst comprises at least one member selected from the group consisting of
    Bis(acetylacetonato)dioxomolybdenum (VI),
    Triazabicyclodecene (TBD),
    1,8-Diazabicyclo[5.4.0]undec-7-ene,
    7-methyl-1,5,7-triazabicyclo[4.4.0]dec-5-ene (MTBD),
    Triphenylphosphine,
    4-Dimethylaminopyridine (DMAP),
    double metal cyanaide (DMC),
    diphenylcarbonate (DPC), and
    methylphenylcarbonate (MPC).

8. The polymeric composition of claim 1, wherein the composition further comprises a permanent crosslinking system.

9. The polymeric composition of claim 8, wherein the permanent crosslinking system comprises a permanent crosslinking agent and optionally a crosslinking co-agent.

10. The polymeric composition of claim 9, wherein the permanent crosslinking agent is selected from the group consisting of organic peroxides, azo/azide compounds, sulfur, silanes, cyanates, radiation curable systems; and the co-agent is selected from Triallyl isocyanurate (TAIC), trimethylolpropane-tris-methacrylate (TRIM), triallyl cyanurate (TAC), trifunctional(meth)acrylate ester (TMA), N,N'-m-phenylene dimaleimide (PDM), poly(butadiene)diacrylate (PBDDA), high vinyl poly(butadiene) (HVPBD), and poly-transoctenamer rubber (TOR).

11. The polymeric composition of claim 1, wherein the thermoplastic polymer comprises a dynamic crosslink.

12. The polymeric composition of claim 11, wherein the dynamic crosslink comprises a covalent bond.

13. The polymeric composition of claim 11, wherein the composition exhibits a plateau elastic storage modulus within a temperature range of 20 to 150° C. in a DMA analysis.

14. The polymeric composition of claim 11, wherein the composition exhibits an elastic storage modulus that is time-dependent at temperatures above 120° C. such that it decreases by at least 50% relative to its initial value ($G_0$, plateau modulus) within 10,000 seconds at a temperature less than 230° C. in a stress relaxation rheometry analysis.

15. An article comprising the polymeric composition of claim 11.

16. The article of claim 15, wherein the article is non-foamed.

17. The article of claim 15, wherein the article is foamed.

18. The polymeric composition of claim 1, wherein the thermoplastic polymer comprises a dynamic crosslink that is a thermally-formed bond, the thermally-formed bond being a bond formed by crosslinking at a temperature of from 100 to 250° C.

19. The polymeric composition of claim 18, wherein the thermally-formed bond is a covalent bond.

20. The polymeric composition of claim 1, wherein the thermoplastic polymer comprises a dynamic crosslink that is a thermally-formed bond, the thermally-formed bond being a bond formed by crosslinking at a temperature of from 150 to 230° C.

21. The polymeric composition of claim 1, wherein the thermoplastic polymer comprises a dynamic crosslink that is a thermally-formed bond, the thermally-formed bond being a bond formed by crosslinking at a temperature of from 151 to 212° C.

* * * * *